US011012123B2

(12) United States Patent
Yan et al.

(10) Patent No.: US 11,012,123 B2
(45) Date of Patent: May 18, 2021

(54) BEAMFORMING TRAINING METHOD, INITIATING DEVICE, AND RESPONDING DEVICE

(71) Applicant: HUAWEI TECHNOLOGIES CO., LTD., Guangdong (CN)

(72) Inventors: Li Yan, Chengdu (CN); Yan Long, Chengdu (CN); Ji Wu, Shanghai (CN); Yingpei Lin, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/278,404

(22) Filed: Feb. 18, 2019

(65) Prior Publication Data

US 2019/0190570 A1 Jun. 20, 2019

Related U.S. Application Data

(63) Continuation of application No. PCT/CN2017/097537, filed on Aug. 15, 2017.

(30) Foreign Application Priority Data

Aug. 24, 2016 (CN) .......................... 201610718185.9

(51) Int. Cl.
*H04B 7/06* (2006.01)
*H04B 7/0452* (2017.01)
*H04B 7/08* (2006.01)

(52) U.S. Cl.
CPC .......... *H04B 7/0452* (2013.01); *H04B 7/063* (2013.01); *H04B 7/0617* (2013.01);
(Continued)

(58) Field of Classification Search
None
See application file for complete search history.

(56) References Cited

U.S. PATENT DOCUMENTS

2005/0286663 A1   12/2005   Poon
2012/0057575 A1*   3/2012   Taghavi Nasrabadi ...................... H04B 17/12
                                                                            370/338
(Continued)

FOREIGN PATENT DOCUMENTS

CN   1973473 A   5/2007
CN   101636929 A   1/2010
(Continued)

OTHER PUBLICATIONS

ISO/IEC/IEEE 8802-11:2012/Amd.3:2014E, Information technology—Telecommunications and information exchange between systems—Local and metropolitan area networks—Specific requirements—Part 11:Wireless LAN medium access control(MAC) and physical layer (PHY) specifications, Amendment 3: Enhancements for very high throughput in the 60 GHz band (adoption of IEEE Std 802.11ad-2012), Mar. 15, 2014, 634 pages.

*Primary Examiner* — Jenkey Van
(74) *Attorney, Agent, or Firm* — Womble Bond Dickinson (US) LLP

(57) ABSTRACT

Embodiments of this application provide a beamforming training method, an initiating device, and a responding device. The method includes: transmitting, by an initiating device, codeword indication information to each responding device in a plurality of responding devices, where codeword indication information received by a first responding device in the plurality of responding devices is used to indicate a first codeword assigned by the initiating device to the first responding device, the first codeword is used to encode a beamforming training signal transmitted between the initiating device and the first responding device, and codewords assigned to different responding devices in the plurality of responding devices are orthogonal to each other; and performing, by the initiating device, beamforming training (Continued)

simultaneously with the plurality of responding devices based on a plurality of codewords assigned to the plurality of responding devices.

16 Claims, 27 Drawing Sheets

(52) U.S. Cl.
CPC ......... *H04B 7/0619* (2013.01); *H04B 7/0695* (2013.01); *H04B 7/088* (2013.01)

(56) References Cited

U.S. PATENT DOCUMENTS

| | | | |
|---|---|---|---|
| 2014/0050274 | A1 | 2/2014 | Kotecha et al. |
| 2015/0071272 | A1 | 3/2015 | Vermani et al. |
| 2016/0119043 | A1* | 4/2016 | Rajagopal ............ H04B 7/0695 370/329 |
| 2017/0079031 | A1* | 3/2017 | Maltsev, Jr. ......... H04B 7/0452 |
| 2017/0352954 | A1* | 12/2017 | Abdallah ............... H04B 7/088 |
| 2019/0052327 | A1* | 2/2019 | Motozuka .............. H04B 7/088 |
| 2019/0081674 | A1* | 3/2019 | Oteri ...................... H04B 7/061 |
| 2019/0200388 | A1* | 6/2019 | Park ...................... H04W 72/04 |
| 2020/0411982 | A1* | 12/2020 | Abdallah ............... H04B 7/088 |

FOREIGN PATENT DOCUMENTS

| | | |
|---|---|---|
| CN | 102811491 A | 12/2012 |
| CN | 105519027 A | 4/2016 |

\* cited by examiner

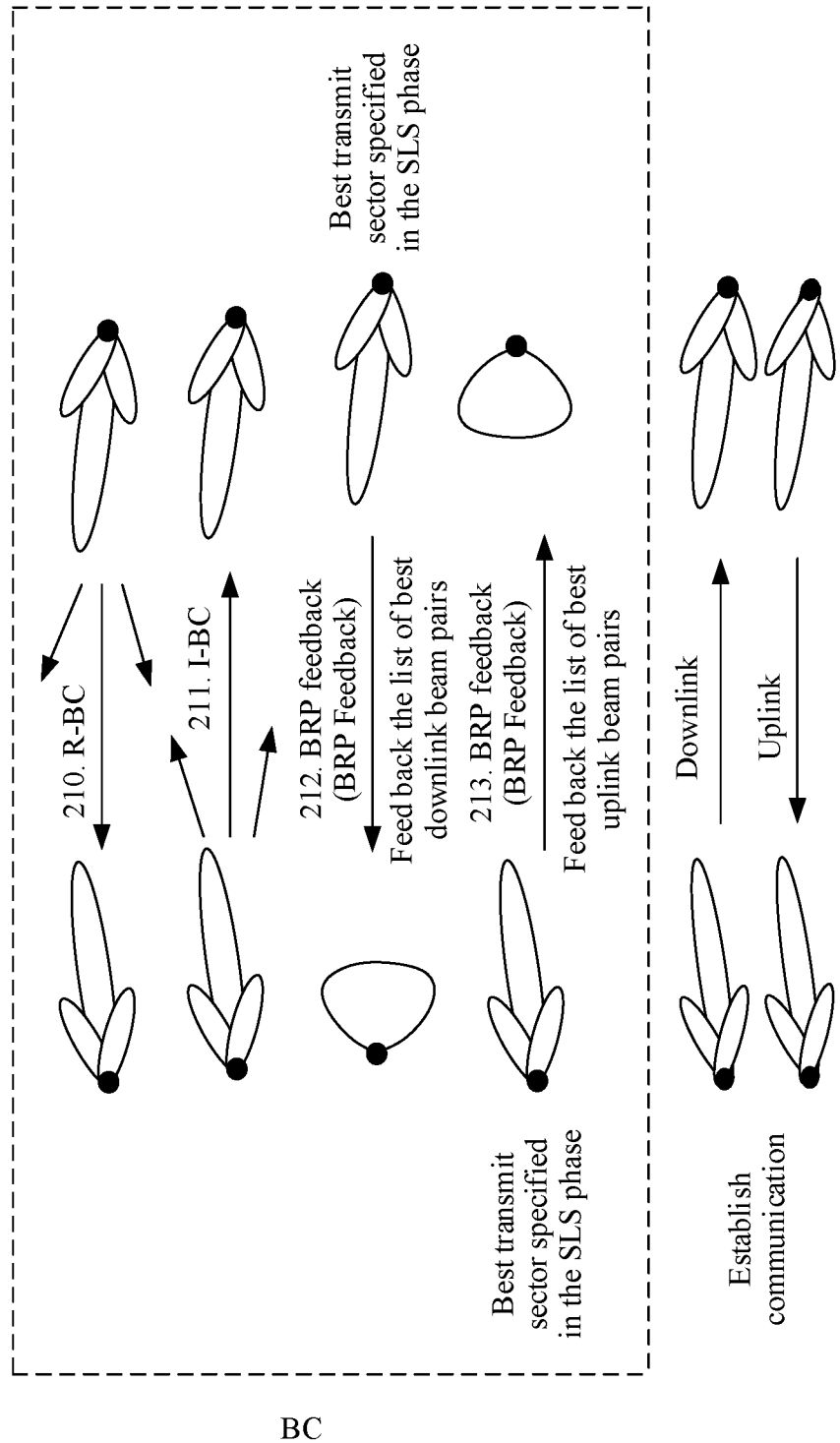

BEAMFORMING TRAINING METHOD, INITIATING DEVICE, AND RESPONDING DEVICE

CROSS-REFERENCE TO RELATED APPLICATIONS

This application is a continuation of International Application No. PCT/CN2017/097537, filed on Aug. 15, 2017, which claims priority to Chinese Patent Application No. 201610718185.9, filed on Aug. 24, 2016. The disclosures of the aforementioned applications are hereby incorporated by reference in their entireties.

STATEMENT OF JOINT RESEARCH AGREEMENT

The subject matter and the claimed invention were made by or on behalf of Southwest Jiaotong University, of Second Ring Road, Chengdu, Sichuang, P.R. China and Huawei Technologies Co., Ltd., of Shenzhen, Guangdong Province, P.R. China, under a joint research agreement titled "Research Project on Next Generation 60 GHz WiFi MAC Technology". The joint research agreement was in effect on or before the claimed invention was made, and that the claimed invention was made as a result of activities undertaken within the scope of the joint research agreement.

TECHNICAL FIELD

This application relates to the communications field, and in particular, to a beamforming training method and a device.

BACKGROUND 802.11ad is a wireless communications standard that works in a 60 GHz frequency band, but the 60 GHz high frequency band brings about a problem of a great path loss. Therefore, in 60 GHz communication, beamforming (Beamforming, BF) in a directional antenna is mainly used to increase antenna gains. Different from a conventional omnidirectional antenna, the directional antenna can concentrate transmitted electromagnetic wave energy on a relatively narrow azimuth, and a receive direction of a receive antenna can also be aligned with a relatively narrow azimuth. In this way, gains of the transmit antenna and the receive antenna can be increased, and a path loss can be prevented effectively. However, a transmitter and a receiver of data can match their best transmit beams and best receive beams only after performing a series of operations, to obtain maximum gains. The process is referred to as beamforming training (Beamforming Training, BFT). The process is implemented by the receiver and the transmitter by transmitting bidirectional sector sweep frames (Sector Sweep Frames, SSW Frames). The BFT process mainly includes two phases. A first phase is sector-level sweep (Sector-Level Sweep, SLS). In this phase, a responder and an initiator determine best transmit beams of the two parties through interaction by using sector sweep frames of the two parties. A second phase is beam refinement protocol (Beam Refinement Protocol, BRP) process. In this process, the two parties determine best transmit and receive beams of the two parties by using BRP frames.

802.11ad supports only beamforming training of a single user, but 802.11ay is required to support multi-user multiple-input multiple-output (Multi-User Multiple-Input Multiple-Output, MU-MIMO). According to a beamforming training mechanism of 802.11ad, in a multi-user scenario of 802.11ay, an initiator needs to perform beamforming training with responders one by one. Consequently, duration of beamforming training is very long, and efficiency of beamforming training is relatively low. Therefore, how to improve efficiency of beamforming training of multiple users becomes a problem urgently to be resolved.

SUMMARY

Embodiments of this application provide a beamforming training method, an initiating device, and a responding device. The method can improve efficiency of beamforming training of multiple users.

According to a first aspect, a beamforming training method is provided, where the method includes:

transmitting, by an initiating device, codeword indication information to each responding device in a plurality of responding devices, where codeword indication information received by a first responding device in the plurality of responding devices is used to indicate a first codeword assigned by the initiating device to the first responding device, the first responding device is any responding device in the plurality of responding devices, the first codeword is used to encode a beamforming training signal transmitted between the initiating device and the first responding device, and codewords assigned to different responding devices in the plurality of responding devices are orthogonal to each other; and performing, by the initiating device, beamforming training simultaneously with the plurality of responding devices based on a plurality of codewords assigned to the plurality of responding devices.

Therefore, in this embodiment of this application, the initiating device assigns an orthogonal codeword to each responding device, and when the initiating device performs beamforming training with different responding devices, different codewords may be used to encode beamforming training signals. In this way, beamforming training is skillfully implemented between the initiating device and different responding devices. Because codewords of signals corresponding to different responding devices are different, the initiating device can perform beamforming training signal transmission simultaneously with the plurality of responding devices to further shorten time of beamforming training and improve efficiency of beamforming training in a multi-user scenario. In addition, in this embodiment of this application, signal collision that occurs when the plurality of responding devices perform training with the initiating device can be avoided.

It should be understood that, the initiating device may transmit the codeword indication information in a plurality of manners. For example, the initiating device may transmit the codeword indication information to a terminal device in a phase of beamforming training. The following describes different cases separately by using examples.

A first case: In an SSW feedback phase of an SLS phase, the initiating device assigns an orthogonal codeword to each responding device.

In one embodiment, in the SSW feedback phase of the SLS phase, the initiating device transmits a sector sweep feedback (SSW Feedback) frame to each responding device in the plurality of responding devices, where the sector sweep feedback frame carries the codeword indication information, and a sector sweep feedback frame transmitted to the first responding device is used to indicate a best transmit sector of the first responding device.

In this embodiment of this application, a PCP/AP assigns an orthogonal codeword to each STA in the SSW feedback phase of the SLS phase. Therefore, in this embodiment of this application, the initiating device can perform beamforming training simultaneously with the plurality of responding devices. In one embodiment, in subsequent processes of SSW ACK phase, BRP setup phase, BRP feedback phase in MID, and BRP feedback phase in BC, a plurality of STAs may perform information transmission simultaneously with the PCP/AP. This shortens time of performing beamforming training between the PCP/AP and the plurality of STAs, and can avoid collision caused by frame transmission when the plurality of STAs perform training simultaneously with the PCP/AP.

It should be understood that, actually performed beamforming training may include a BRP phase, or may not include a BRP phase. This is not limited in this embodiment of this application.

In one embodiment, the codeword indication information is carried in a reserved bit of a sector sweep feedback field of the sector sweep feedback frame.

Therefore, in this embodiment of this application, an offline-designed orthogonal codeword can be assigned to each responder by using codeword indication information carried in a reserved bit, without changing an existing MAC frame structure, and compatibility with the prior art is maintained.

In the first case, the performing, by the initiating device, beamforming training simultaneously with the plurality of responding devices includes:

receiving, by the initiating device, sector sweep acknowledgement frames simultaneously transmitted by the plurality of responding devices, where the initiating device receives a sector sweep acknowledgement frame encoded by using the first codeword and transmitted by the first responding device by using the best transmit sector, and the sector sweep acknowledgement frame transmitted by the first responding device is used to indicate a best transmit sector that is of the initiating device and corresponds to the first responding device.

It should be noted that, if the initiating device does not receive, within a first preset time interval, the sector sweep acknowledgement frame transmitted by the first responding device, the initiating device retransmits the sector sweep feedback frame to the first responding device; or if the initiating device receives, within a first preset time interval, the sector sweep acknowledgement frame transmitted by the first responding device, the initiating device transmits a first frozen frame to the first responding device, where the first frozen frame is used to instruct the first responding device to wait for the initiating device to receive a sector sweep acknowledgement frame transmitted by a second responding device in the plurality of responding devices, or the first frozen frame is used to indicate time that the first responding device spends waiting for the initiating device to transmit the sector sweep feedback frame to the second responding device until a maximum quantity of retransmission times is reached, where the initiating device does not receive, within the first preset time interval, the sector sweep acknowledgement frame transmitted by the second responding device.

In one embodiment, values of four reserved bits in a frame control field of the first frozen frame are one of the following:

0000, 0001, 1011, 1100, 1101, 1110, and 1111.

Therefore, with respect to a possible packet loss in a MU-MIMO BFT process, in this embodiment of this application, a reserved field is used in the frame control field (Frame control field), and a new frozen frame type is designed to freeze a STA that has performed feedback. The PCP/AP transmits signaling only to a STA that has not performed feedback, without transmitting signaling to all STAs again. Therefore, resource overheads are reduced, and efficiency of beamforming training is improved.

In one embodiment, the beamforming training process in this embodiment of this application may further include a BRP phase; therefore, the performing, by the initiating device, beamforming training simultaneously with the plurality of responding devices further includes:

transmitting, by the initiating device, first beam refinement protocol (BRP) frames to the plurality of responding devices simultaneously, where the initiating device transmits, to the first responding device by using the best transmit sector that is of the initiating device and corresponds to the first responding device, a first beam refinement frame encoded by using the first codeword, and the first beam refinement frame transmitted to the first responding device is used by the first responding device to obtain beamforming training capability information of the initiating device; and receiving, by the initiating device, second beam refinement protocol (BRP) frames simultaneously transmitted by the plurality of responding devices, where the initiating device receives the second BRP frame encoded by using the first codeword and transmitted by the first responding device by using the best transmit sector of the first responding device, and the second BRP frame transmitted by the first responding device is used by the initiating device to obtain beamforming training capability information of the first responding device.

Therefore, in this embodiment of this application, the PCP/AP assigns an orthogonal codeword to each STA in the SSW feedback phase of the SLS phase. In the BRP setup phase, the PCP/AP may transmit BRP frames to multiple users in a plurality of directions simultaneously by using a multi-antenna array; and each user may also return a BRP frame to the PCP/AP by using an orthogonal code. Therefore, time of performing beamforming training between the PCP/AP and the plurality of STAs can be shortened, and signal collision that occurs when the plurality of responding devices perform training with the initiating device can be avoided.

It should be noted that, if the initiating device does not receive, within a second preset time interval, the second beam refinement protocol (BRP) frame transmitted by the first responding device, the initiating device retransmits the first beam refinement protocol (BRP) frame to the first responding device; or if the initiating device receives, within a second preset time interval, the second beam refinement protocol (BRP) frame transmitted by the first responding device, the initiating device transmits a second frozen frame to the first responding device, where the second frozen frame is used to instruct the first responding device to wait for the initiating device to receive a second beam protocol (BRP) refinement frame transmitted by a third responding device in the plurality of responding devices, or the second frozen frame is used to indicate time that the first responding device spends waiting for the initiating device to transmit a first beam refinement protocol (BRP) frame to the third responding device until a maximum quantity of retransmission times is reached, where the initiating device does not receive, within the second preset time interval, the second BRP frame transmitted by the third responding device.

In one embodiment, values of four reserved bits in a frame control field of the second frozen frame are one of the following:

0000, 0001, 1011, 1100, 1101, 1110, and 1111.

Therefore, with respect to a possible packet loss in a MU-MIMO BFT process, in this embodiment of this application, a reserved field is used in the frame control field (Frame control field), and a new frozen frame type is designed to freeze a STA that has performed feedback. The PCP/AP transmits signaling only to a STA that has not performed feedback, without transmitting signaling to all STAs again. Therefore, resource overheads are reduced, and efficiency of beamforming training is improved.

In one embodiment, in the first case, the beamforming training process in this embodiment of this application may further include a MID phase. Therefore, the performing, by the initiating device, beamforming training simultaneously with the plurality of responding devices further includes:

receiving, by the initiating device, first beam refinement protocol (BRP) feedback frames simultaneously transmitted by the plurality of responding devices, where the first responding device transmits, by using the best transmit sector of the first responding device, the first BRP feedback frame encoded by using the first codeword, and the first BRP feedback frame transmitted by the first responding device is used to indicate a best receive sector of the first responding device; and transmitting, by the initiating device, second BRP feedback frames to the plurality of responding devices simultaneously, where the initiating device transmits, to the first responding device by using the best transmit sector that is of the initiating device and corresponds to the first responding device, the second BRP feedback frame encoded by using the first codeword, where the second BRP feedback frame transmitted to the first responding device is used to indicate a best receive sector that is of the initiating device and corresponds to the first responding device.

Therefore, in this embodiment of this application, the PCP/AP assigns an orthogonal codeword to each STA in the SSW feedback phase of the SLS phase. In the BRP feedback phase of MID, the PCP/AP may transmit BRP feedback frames to the plurality of STAs simultaneously in a plurality of directions by using a multi-antenna array, to reduce transmission time and collision. Each STA may also return a BRP feedback frame to the PCP/AP by using an orthogonal code. This also greatly shortens transmission time and reduces collision. Therefore, in this embodiment of this application, time of performing beamforming training between the PCP/AP and the plurality of STAs can be shortened, and signal collision that occurs when the plurality of responding devices perform training with the initiating device can be avoided.

It should be noted that, if the initiating device does not receive, within a third preset time interval, an acknowledgement frame transmitted by the first responding device and used to indicate that the second BRP feedback frame has been received, the initiating device retransmits the second BRP feedback frame to the first responding device; or if the initiating device receives, within the third preset time interval, an acknowledgement frame transmitted by the first responding device and used to indicate that the second BRP feedback frame has been received, the initiating device transmits a third frozen frame to the first responding device, where the third frozen frame is used to instruct the first responding device to wait for the initiating device to receive an acknowledgement frame transmitted by a fourth responding device in the plurality of responding devices and used to indicate that the second BRP feedback frame has been received, or the third frozen frame is used to indicate time that the first responding device spends waiting for the initiating device to transmit the second BRP feedback frame to the fourth responding device until a maximum quantity of retransmission times is reached, where the initiating device does not receive, within the third preset time interval, the acknowledgement frame transmitted by the fourth responding device and used to indicate that the second BRP feedback frame has been received.

In one embodiment, values of four reserved bits in a frame control field of the third frozen frame are one of the following:

0000, 0001, 1011, 1100, 1101, 1110, and 1111.

Therefore, with respect to a possible packet loss in a MU-MIMO BFT process, in this embodiment of this application, a reserved field is used in the frame control field (Frame control field), and a new frozen frame type is designed to freeze a STA that has performed feedback. The PCP/AP transmits signaling only to a STA that has not performed feedback, without transmitting signaling to all STAs again. Therefore, resource overheads are reduced, and efficiency of beamforming training is improved.

In one embodiment, in the first case, the beamforming training process in this embodiment of this application may further include a BC phase. Therefore, the performing, by the initiating device, beamforming training simultaneously with the plurality of responding devices may further include:

receiving, by the initiating device, fourth BRP feedback frames simultaneously transmitted by the plurality of responding devices, where the first responding device transmits, by using the best transmit sector of the first responding device, the fourth BRP feedback frame encoded by using the first codeword, and the fourth BRP feedback frame transmitted by the first responding device is used to indicate a correspondence between a transmit sector of the initiating device and a receive sector of the first responding device; and transmitting, by the initiating device, fifth BRP feedback frames to the plurality of responding devices simultaneously, where the initiating device transmits, to the first responding device by using the best transmit sector that is of the initiating device and corresponds to the first responding device, the fifth BRP feedback frame encoded by using the first codeword, and the fifth BRP feedback frame transmitted to the first responding device is used to indicate a correspondence between a receive sector of the initiating device and a transmit sector of the first responding device.

Therefore, in this embodiment of this application, the PCP/AP assigns an orthogonal codeword to each STA in the SSW feedback phase of the SLS phase. In the BRP feedback phase of BC, the PCP/AP may transmit BRP feedback frames to the plurality of STAs simultaneously in a plurality of directions by using a multi-antenna array, to reduce transmission time and collision. Each STA may also return a BRP feedback frame to the PCP/AP simultaneously by using an orthogonal codeword. This also greatly shortens transmission time and reduces collision. Therefore, in this embodiment of this application, time of performing beamforming training between the PCP/AP and the plurality of STAs can be shortened, and signal collision that occurs when the plurality of responding devices perform training with the initiating device can be avoided.

It should be noted that, if the initiating device does not receive, within a fourth preset time interval, an acknowledgement frame transmitted by the first responding device and used to indicate that the fifth BRP feedback frame has been received, the initiating device retransmits the fifth BRP feedback frame to the first responding device; or if the initiating device receives, within the fourth preset time interval, an acknowledgement frame transmitted by the first responding device and used to indicate that the fifth BRP feedback frame has been received, the initiating device transmits a fourth frozen frame to the first responding device, where the fourth frozen frame is used to instruct the first responding device to wait for the initiating device to receive an acknowledgement frame transmitted by a fifth responding device in the plurality of responding devices and used to indicate that the fifth BRP feedback frame has been received, or the fourth frozen frame is used to indicate time that the first responding device spends waiting for the initiating device to transmit the fifth BRP feedback frame to the fifth responding device until a maximum quantity of retransmission times is reached, where the initiating device does not receive, within the fourth preset time interval, the acknowledgement frame transmitted by the fifth responding device and used to indicate that the fifth BRP feedback frame has been received.

In one embodiment, values of four reserved bits in a frame control field of the fourth frozen frame are one of the following:

0000, 0001, 1011, 1100, 1101, 1110, and 1111.

Therefore, with respect to a possible packet loss in a MU-MIMO BFT process, in this embodiment of this application, a reserved field is used in the frame control field (Frame control field), and a new frozen frame type is designed to freeze a STA that has performed feedback. The PCP/AP transmits signaling only to a STA that has not performed feedback, without transmitting signaling to all STAs again. Therefore, resource overheads are reduced, and efficiency of beamforming training is improved.

The foregoing describes the first case of transmitting the codeword indication information in this embodiment of this application. That is, in the SSW feedback phase of the SLS phase, the initiating device assigns an orthogonal codeword to each responding device.

The following describes a second case: In a BRP feedback phase after MID, the initiating device assigns an orthogonal codeword to each responding device.

In one embodiment, the transmitting, by an initiating device, codeword indication information to each responding device in a plurality of responding devices includes:

transmitting, by the initiating device, a third BRP feedback frame to each responding device by using a best transmit sector that is of the initiating device and corresponds to each responding device, where the third BRP feedback frame carries the codeword indication information, and a third BRP feedback frame transmitted to the first responding device is used to indicate a best receive sector that is of the initiating device and corresponds to the first responding device.

In one embodiment, the codeword indication information is carried in a reserved bit of a sector sweep feedback field of the third BRP feedback.

It should be noted that, a specific solution to carrying the codeword indication information in the second case is similar to the solution in the first case, and is not described again herein to avoid repetition.

An SLS phase and a BRP setup phase in the second case may correspond to corresponding phases of beamforming training in existing 802.11ad, and are not described again herein to avoid repetition.

In addition, a BC process in the second case is similar to the BC process in the first case. For the BC process in the second case, refer to the corresponding description of the BC process in the first case. Details are not described again herein to avoid repetition.

In this embodiment of this application, a PCP/AP assigns an orthogonal codeword to each STA in the BRP feedback phase in MID. Therefore, in this embodiment of this application, the initiating device can perform beamforming training simultaneously with the plurality of responding devices in subsequent beamforming training. In one embodiment, in subsequent processes of BRP feedback phase in MID and BRP feedback phase in BC, a plurality of STAs may perform information transmission simultaneously with the PCP/AP. This shortens time of performing beamforming training between the PCP/AP and the plurality of STAs, and can avoid collision caused by frame transmission when the plurality of STAs perform training simultaneously with the PCP/AP.

The following describes a third case: In I-BC phase, the initiating device assigns an orthogonal codeword to each responding device.

In one embodiment, the transmitting, by an initiating device, codeword indication information to each responding device in a plurality of responding devices includes:

transmitting, by the initiating device, a third beam refinement protocol (BRP) frame to each responding device in the plurality of responding devices by using at least one transmit sector, where the third BRP frame carries the codeword indication information, and the third BRP frame transmitted to the first responding device is used by the first responding device to determine at least one best receive sector of the first responding device, and a correspondence between the at least one best receive sector and the at least one transmit sector of the initiating device.

In one embodiment, the codeword indication information is carried in a reserved bit of a sector sweep feedback field of the third BRP frame.

It should be noted that, a specific solution to carrying the codeword indication information in the third case is similar to the solution in the first case, and is not described again herein to avoid repetition.

In the third case, an SLS phase, a BRP setup phase, and a MID phase may correspond to corresponding phases of beamforming training in existing 802.11ad; in addition, a feedback process in IBC is similar to the feedback process in IBC. Details are not described again herein to avoid repetition.

In this embodiment of this application, a PCP/AP assigns an orthogonal codeword to each STA in the I-BC phase. Therefore, in this embodiment of this application, the initiating device can perform beamforming training simultaneously with the plurality of responding devices in subsequent beamforming training. In one embodiment, in a subsequent BRP-feedback process in BC, a plurality of STAs may perform information transmission simultaneously with the PCP/AP. This shortens time of performing beamforming training between the PCP/AP and the plurality of STAs, and can avoid collision caused by frame transmission when the plurality of STAs perform training simultaneously with the PCP/AP.

The following describes a fourth case: In a feedback phase after I-BC phase, the initiating device assigns an orthogonal codeword to each responding device.

In one embodiment, the transmitting, by an initiating device, codeword indication information to each responding device in a plurality of responding devices includes:

transmitting, by the initiating device, a sixth BRP feedback frame to each responding device by using a best transmit sector that is of the initiating device and corresponds to each responding device in the plurality of responding devices, where the sixth BRP feedback frame carries the codeword indication information, and the sixth BRP feedback frame transmitted to the first responding device is used to indicate a correspondence between a receive sector of the initiating device and a transmit sector of the first responding device.

In one embodiment, the codeword indication information is carried in a reserved bit of a sector sweep feedback field of the seventh BRP feedback.

It should be noted that, a specific solution to carrying the codeword indication information in the fourth case is similar to the solution in the first case, and is not described again herein to avoid repetition.

In the fourth case, an SLS phase, a BRP setup phase, a MID phase, and a BC phase may correspond to corresponding phases of beamforming training in existing 802.11ad. Details are not described again herein to avoid repetition.

In one embodiment, in another embodiment, the performing, by the initiating device, beamforming training simultaneously with the plurality of responding devices may include: performing, by the initiating device, next beamforming training with each responding device by using a codeword of each responding device.

In one embodiment, a next beamforming training process in the fourth case is similar to the beamforming training process in the first case, and a difference lies in that, in an SSW feedback phase in the fourth case, the initiating device may transmit an SSW feedback frame simultaneously to the plurality of responding devices by using the best transmit sector corresponding to each responding device.

In this embodiment of this application, a PCP/AP assigns an orthogonal codeword to each STA in the feedback phase after I-BC phase. Therefore, in this embodiment of this application, the initiating device can perform beamforming training simultaneously with the plurality of responding devices in next beamforming training. This shortens time of performing beamforming training between the PCP/AP and the plurality of STAs, and can avoid collision caused by frame transmission when the plurality of STAs perform training simultaneously with the PCP/AP.

It should also be understood that, "first", "second", "third", and so on in this embodiment of this application are merely used to distinguish different responding devices or BRP frames transmitted between the initiating device and a responding device, but shall not be construed as a limitation to the protection scope of this application.

In this embodiment of this application, In one embodiment, the second responding device, the third responding device, and the fourth responding device may be a same responding device, or may be different responding devices. This is not limited in this embodiment of this application.

According to a second aspect, a beamforming training method is provided, where the method includes:

receiving, by a first responding device in a plurality of responding devices, codeword indication information transmitted by the initiating device, where the codeword indication information is used to indicate a first codeword assigned by the initiating device to the first responding device, the first responding device is any responding device in the plurality of responding devices, the first codeword is used to encode a beamforming training signal transmitted between the initiating device and the first responding device, and codewords assigned to different responding devices in the plurality of responding devices are orthogonal to each other; and performing, by the first responding device, beamforming training with the initiating device based on the codeword assigned to the first responding device, where when the first responding device performs beamforming training with the initiating device, responding devices except the first responding device in the plurality of responding devices also perform beamforming training with the initiating device simultaneously based on the assigned codewords.

Therefore, in this embodiment of this application, the initiating device assigns an orthogonal codeword to each responding device, and when the initiating device performs beamforming training with different responding devices, different codewords may be used to encode beamforming signals. In this way, beamforming training is skillfully implemented between the initiating device and different responding devices. Because codewords of signals corresponding to different responding devices are different, the initiating device can perform beamforming training signal transmission simultaneously with the plurality of responding devices to further shorten time of beamforming training and improve efficiency of beamforming training in a multi-user scenario. In addition, in this embodiment of this application, signal collision that occurs when the plurality of responding devices perform training with the initiating device can be avoided.

It should be understood that, the second aspect corresponds to the first aspect. The first aspect is performed by the initiating device, and the second aspect may be performed by a responding device. For a corresponding feature of the responder-side method, refer to a corresponding description of the initiating device side in the first aspect. Therefore, for brevity, detailed descriptions are omitted properly.

In one embodiment, the receiving, by a first responding device in a plurality of responding devices, codeword indication information transmitted by the initiating device includes:

receiving, by the first responding device, a sector sweep feedback frame transmitted by the initiating device, where the sector sweep feedback frame carries the codeword indication information, and the sector sweep feedback frame received by the first responding device is used to indicate a best transmit sector of the first responding device; and the performing, by the first responding device, beamforming training with the initiating device includes:

transmitting, by the first responding device to the initiating device by using the best transmit sector, a sector sweep acknowledgement frame encoded by using the first codeword, where the sector sweep acknowledgement frame transmitted by the first responding device is used to indicate a best transmit sector that is of the initiating device and corresponds to the first responding device.

In one embodiment, the codeword indication information is carried in a reserved bit of a sector sweep feedback field of the sector sweep feedback frame.

In one embodiment, the performing, by the first responding device, beamforming training with the initiating device further includes:

if the initiating device does not receive, within a first preset time interval, the sector sweep acknowledgement frame transmitted by the first responding device, receiving, by the first responding device, the sector sweep feedback frame retransmitted by the initiating device; or if the initiating device receives, within the first preset time interval, the sector sweep acknowledgement frame transmitted by the first responding device, receiving, by the first responding device, a first frozen frame transmitted by the initiating device, where the first frozen frame is used to instruct the first responding device to wait for the initiating device to receive a sector sweep acknowledgement frame transmitted by a second responding device in the plurality of responding devices, or the first frozen frame is used to indicate time that the first responding device spends waiting for the initiating device to transmit the sector sweep feedback frame to the second responding device until a maximum quantity of retransmission times is reached, where the initiating device does not receive, within the first preset time interval, the sector sweep acknowledgement frame transmitted by the second responding device.

In one embodiment, values of four reserved bits in a frame control field of the first frozen frame are one of the following:

0000, 0001, 1011, 1100, 1101, 1110, and 1111.

In one embodiment, the performing, by the first responding device, beamforming training with the initiating device further includes:

receiving, by the first responding device, a first BRP frame encoded by using the first codeword and transmitted by the initiating device by using the best transmit sector that is of the initiating device and corresponds to the first responding device, where the first BRP frame received by the first responding device is used by the first responding device to obtain beamforming training capability information of the initiating device; and transmitting, by the first responding device to the initiating device by using the best transmit sector of the first responding device, the second BRP frame encoded by using the first codeword, where the second BRP frame transmitted by the first responding device is used by the initiating device to obtain beamforming training capability information of the first responding device.

In one embodiment, the performing, by the first responding device, beamforming training with the initiating device further includes:

if the initiating device does not receive, within a second preset time interval, the second BRP frame transmitted by the first responding device, receiving, by the first responding device, the first beam refinement frame retransmitted by the initiating device; or if the initiating device receives, within the second preset time interval, the second BRP frame transmitted by the first responding device, receiving, by the first responding device, a second frozen frame transmitted by the initiating device, where the second frozen frame is used to instruct the first responding device to wait for the initiating device to receive a second BRP frame transmitted by a third responding device in the plurality of responding devices, or the second frozen frame is used to indicate time that the first responding device spends waiting for the initiating device to transmit a first BRP frame to the third responding device until a maximum quantity of retransmission times is reached, where the initiating device does not receive, within the second preset time interval, the second BRP frame transmitted by the third responding device.

In one embodiment, values of four reserved bits in a frame control field of the second frozen frame are one of the following:

0000, 0001, 1011, 1100, 1101, 1110, and 1111.

In one embodiment, the performing, by the first responding device, beamforming training with the initiating device further includes:

transmitting, by the first responding device to the initiating device by using the best transmit sector of the first responding device, a first BRP feedback frame encoded by using the first codeword, where the first BRP feedback frame is used to indicate a best receive sector of the first responding device; and receiving, by the first responding device, a second BRP feedback frame encoded by using the first codeword and transmitted by the initiating device by using the best transmit sector that is of the initiating device and corresponds to the first responding device, where the second BRP feedback frame received by the first responding device is used to indicate a best receive sector that is of the initiating device and corresponds to the first responding device.

In one embodiment, the performing, by the first responding device, beamforming training with the initiating device further includes:

if the initiating device does not receive, within a third preset time interval, an acknowledgement frame transmitted by the first responding device and used to indicate that the second BRP feedback frame has been received, receiving, by the first responding device, the second BRP feedback frame retransmitted by the initiating device; or if the initiating device receives, within the third preset time interval, an acknowledgement frame transmitted by the first responding device and used to indicate that the second BRP feedback frame has been received, receiving, by the first responding device, a third frozen frame transmitted by the initiating device, where the third frozen frame is used to instruct the first responding device to wait for the initiating device to receive an acknowledgement frame transmitted by a fourth responding device in the plurality of responding devices and used to indicate that the second BRP feedback frame has been received, or the third frozen frame is used to indicate time that the first responding device spends waiting for the initiating device to transmit the second BRP feedback frame to the fourth responding device until a maximum quantity of retransmission times is reached, where the initiating device does not receive, within the third preset time interval, the acknowledgement frame transmitted by the fourth responding device and used to indicate that the second BRP feedback frame has been received.

In one embodiment, values of four reserved bits in a frame control field of the third frozen frame are one of the following:

0000, 0001, 1011, 1100, 1101, 1110, and 1111.

Alternatively, the receiving, by a first responding device in a plurality of responding devices, codeword indication information transmitted by the initiating device includes:

receiving, by the first responding device, a third BRP feedback frame transmitted by the initiating device by using a best transmit sector that is of the initiating device and corresponds to the first responding device, where the third BRP feedback frame carries the codeword indication information, and the third BRP feedback frame received by the first responding device is used to indicate a best receive sector that is of the initiating device and corresponds to the first responding device.

In one embodiment, the codeword indication information is carried in a reserved bit of a sector sweep feedback field of the third BRP feedback.

Alternatively, the receiving, by a first responding device in a plurality of responding devices, codeword indication information transmitted by the initiating device includes:

receiving, by the first responding device, a third BRP frame transmitted by the initiating device by using at least one transmit sector, where the third BRP frame carries the codeword indication information, and the third BRP frame received by the first responding device is used by the first responding device to determine at least one best receive sector of the first responding device, and a correspondence between the at least one best receive sector and the at least one transmit sector of the initiating device.

In one embodiment, the codeword indication information is carried in a reserved bit of a sector sweep feedback field of the third BRP frame.

In one embodiment, the performing, by the first responding device, beamforming training with the initiating device includes:

transmitting, by the first responding device to the initiating device by using the best transmit sector of the first responding device, a fourth BRP feedback frame encoded by using the first codeword, where the fourth BRP feedback frame transmitted by the first responding device is used to indicate a correspondence between a transmit sector of the initiating device and a receive sector of the first responding device; and receiving, by the first responding device, a fifth BRP feedback frame encoded by using the first codeword and transmitted by the initiating device by using the best transmit sector that is of the initiating device and corresponds to the first responding device, where the fifth BRP feedback frame received by the first responding device is used to indicate a correspondence between a receive sector of the initiating device and a transmit sector of the first responding device.

In one embodiment, the performing, by the first responding device, beamforming training with the initiating device further includes:

if the initiating device does not receive, within a fourth preset time interval, an acknowledgement frame transmitted by the first responding device and used to indicate that the fifth BRP feedback frame has been received, receiving, by the first responding device, the fifth BRP feedback frame retransmitted by the initiating device; or if the initiating device receives, within the fourth preset time interval, an acknowledgement frame transmitted by the first responding device and used to indicate that the fifth BRP feedback frame has been received, receiving, by the first responding device, a fourth frozen frame transmitted by the initiating device, where the fourth frozen frame is used to instruct the first responding device to wait for the initiating device to receive an acknowledgement frame transmitted by a fifth responding device in the plurality of responding devices and used to indicate that the fifth BRP feedback frame has been received, or the fourth frozen frame is used to indicate time that the first responding device spends waiting for the initiating device to transmit the fifth BRP feedback frame to the fifth responding device until a maximum quantity of retransmission times is reached, where the initiating device does not receive, within the fourth preset time interval, the acknowledgement frame transmitted by the fifth responding device and used to indicate that the fifth BRP feedback frame has been received.

In one embodiment, values of four reserved bits in a frame control field of the fourth frozen frame are one of the following:

0000, 0001, 1011, 1100, 1101, 1110, and 1111.

Alternatively, the receiving, by a first responding device in a plurality of responding devices, codeword indication information transmitted by the initiating device includes:

receiving, by the first responding device, a sixth BRP feedback frame transmitted by the initiating device to the first responding device by using a best transmit sector that is of the initiating device and corresponds to the first responding device, where the sixth BRP feedback frame carries the codeword indication information, and the sixth BRP feedback frame received by the first responding device is used to indicate a correspondence between a receive sector of the initiating device and a transmit sector of the first responding device.

In one embodiment, the codeword indication information is carried in a reserved bit of a sector sweep feedback field of the seventh BRP feedback.

Therefore, in this embodiment of this application, the initiating device assigns an orthogonal codeword to each responding device, and when the initiating device performs beamforming training with different responding devices, different codewords may be used to encode beamforming signals. In one embodiment, in processes of SSW feedback phase, SSW ACK phase, BRP setup phase, BRP feedback phase in MID, and BRP feedback phase in BC, a plurality of STAs may perform information transmission simultaneously with a PCP/AP. In this way, beamforming training is skillfully implemented between the initiating device and different responding devices. Because codewords of signals corresponding to different responding devices are different, the initiating device can perform beamforming training signal transmission simultaneously with the plurality of responding devices to further shorten time of beamforming training and improve efficiency of beamforming training in a multi-user scenario. In addition, in this embodiment of this application, signal collision that occurs when the plurality of responding devices perform training with the initiating device can be avoided.

In addition, in this embodiment of this application, an offline-designed orthogonal codeword can be assigned to each responder by using a reserved bit of a BRP frame, without changing an existing MAC frame structure, and compatibility with the prior art is maintained.

Further, with respect to a possible packet loss in a MU-MIMO BFT process, in this embodiment of this application, a reserved field is used in the frame control field (Frame control field), and a new frozen frame type is designed to freeze a STA that has performed feedback. The PCP/AP transmits signaling only to a STA that has not performed feedback, without transmitting signaling to all STAs again. Therefore, resource overheads are reduced, and efficiency of beamforming training is improved.

According to a third aspect, an initiating device is provided, and is configured to perform the method in any one of the first aspect and the possible implementations of the first aspect. In one embodiment, the initiating device includes units configured to perform the foregoing method.

According to a fourth aspect, a responding device is provided, and is configured to perform the method in any one of the second aspect and the possible implementations of the second aspect. In one embodiment, the responding device includes units configured to perform the foregoing method.

According to a fifth aspect, an initiating device is provided, where the initiating device includes a processor and a memory; the memory is configured to store a computer program; and the processor is configured to execute the computer program stored in the memory to perform the method in any one of the first aspect and the possible implementations of the first aspect.

According to a sixth aspect, a responding device is provided, where the responding device includes a processor and a memory; the memory is configured to store a computer program; and the processor is configured to execute the computer program stored in the memory to perform the method in any one of the second aspect and the possible implementations of the second aspect.

According to a seventh aspect, a computer-readable medium is provided and is configured to store a computer program, where the computer program includes an instruction used to perform the method in any one of the first aspect and the possible implementations of the first aspect.

According to an eighth aspect, a computer-readable medium is provided and is configured to store a computer program, where the computer program includes an instruction used to perform the method in any one of the second aspect and the possible implementations of the second aspect.

BRIEF DESCRIPTION OF DRAWINGS

FIG. 2A, FIG. 2B, and FIG. 2C are a schematic block diagram of a beamforming training method;

DESCRIPTION OF EMBODIMENTS

The following describes technical solutions of this application with reference to accompanying drawings.

It should be understood that, the embodiments of this application may be applied to a wireless local area network (Wireless Local Area Network, WLAN), and the embodiments of this application may be applied to any one of Institute of Electrical and Electronics Engineers (Institute of Electrical and Electronics Engineers, IEEE) 802.11 series protocols currently used by the WLAN. The WLAN may include one or more basic service sets (Basic Service Set, BSS). Network nodes in the basic service set include an access point (Access Point, AP) and a station (station, STA). IEEE 802.11ad introduces a personal basic service set (Personal Basic Service Set, PBSS) and a personal basic service set control point (PBSS Control Point, PCP) on a basis of the original BSS. Each personal basic service set may include an AP/PCP and a plurality of stations associated with the AP/PCP.

It should be understood that, in the embodiments of this application, an initiator may also be referred to as an initiating device, and a responder may also be referred to as a responding device. This is not described again hereinafter.

In one embodiment, the initiating device and the responding device in the embodiments of this application may be a subscriber station (Station, STA) in the WLAN. The subscriber station may also be referred to as a system, a subscriber unit, an access terminal, a mobile station, a remote station, a remote terminal, mobile equipment, a user terminal, a terminal, a wireless communications terminal, a user agent, a user apparatus, or a user device. The STA may be a cellular phone, a cordless phone, a Session Initiation Protocol (Session Initiation Protocol, SIP) phone, a wireless local loop (Wireless Local Loop, WLL) station, a personal digital assistant (Personal Digital Assistant, PDA), a handheld device having a wireless local area network (for example, Wi-Fi) communication function, a computing device, or another processing device connected to a wireless modem.

In addition, the initiating device and the responding device in the embodiments of this application may also be an AP/PCP in the WLAN. The AP/PCP may be configured to communicate with station (STA) by using the wireless local area network, and transmit data of the access terminal to a network side, or transmit data from a network side to the access terminal.

For ease of understanding and description, execution processes and actions of a method and an apparatus for beamforming training in this application in a Wi-Fi system are described hereinafter as an example rather than a limitation.

Figure 1:
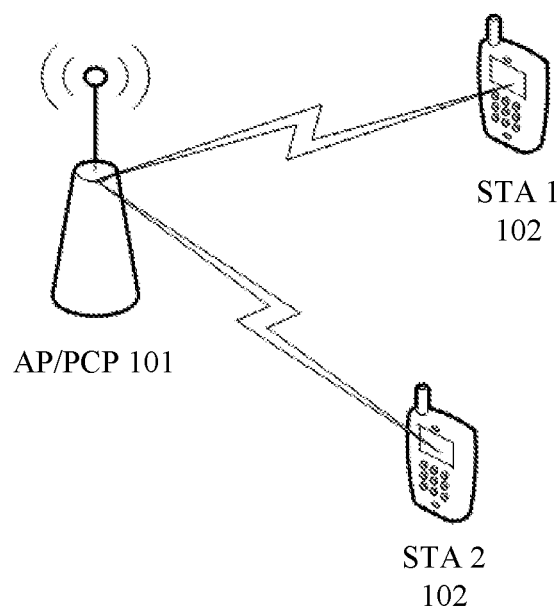
FIG. 1 is a scenario diagram of a communications system to which an embodiment of this application may be applied.

FIG. 1 is a schematic diagram of a data transmission scenario to which an embodiment of this application may be applied. A system in the scenario shown in FIG. 1 may be a WLAN system, and the system in FIG. 1 includes one or more APs/PCPs 101 and one or more STAs 102. In FIG. 1, one AP/PCP and two STAs are used as an example. Wireless communication may be performed between the AP/PCP 101 and the STA 102 by using various standards. Wireless communication may be performed between the AP/PCP 101 and the STA 102 by using a multi-user multiple-input multiple-output (Multi-User Multiple-Input Multiple-Output, MU-MIMO) technology.

In the specification, for ease of understanding the solutions of the embodiments of this application, before describing beamforming training in the embodiments of this application, the following first describes a beamforming training process in the existing 802.11 standard.

Figure 2A:
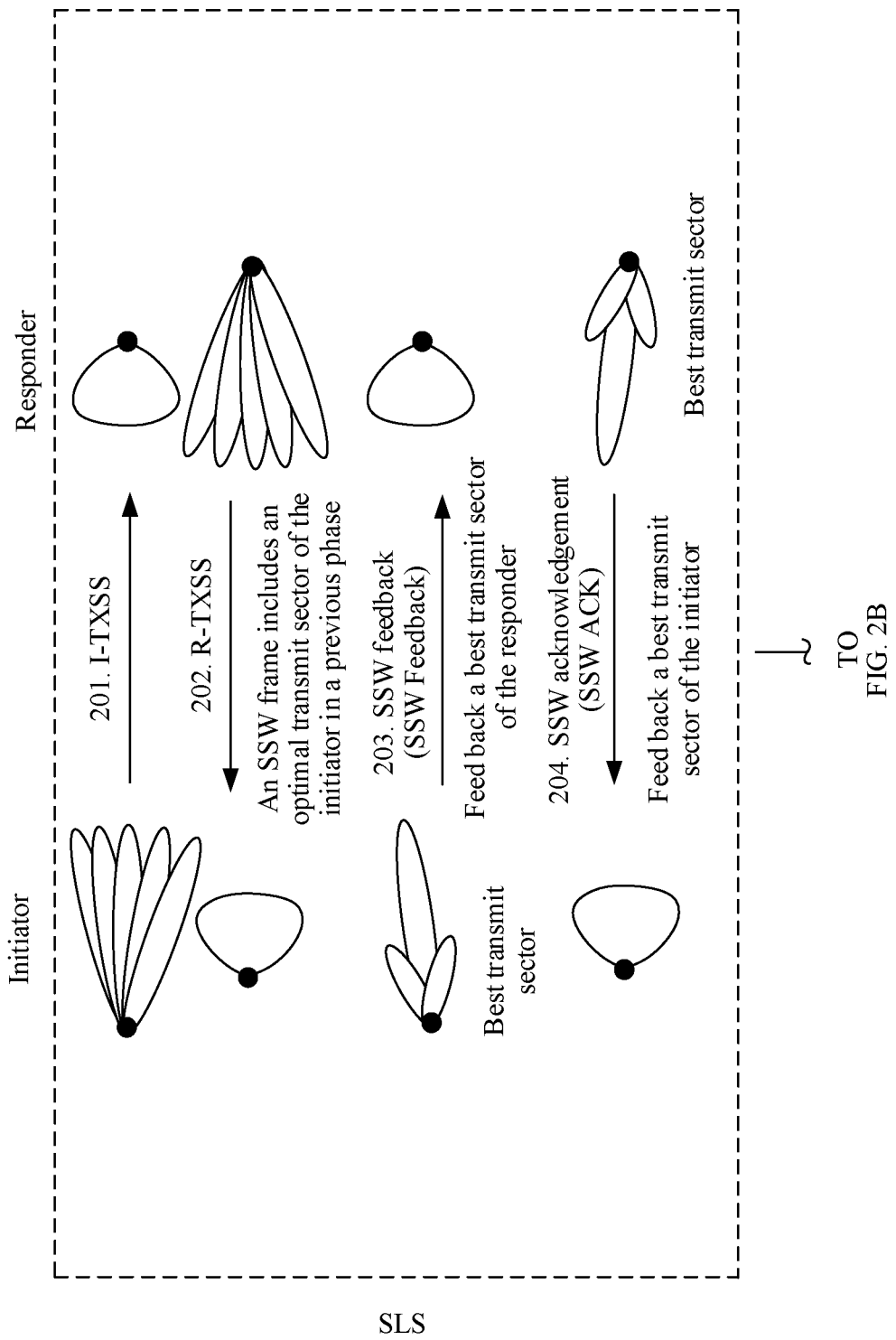
Figure 2B:
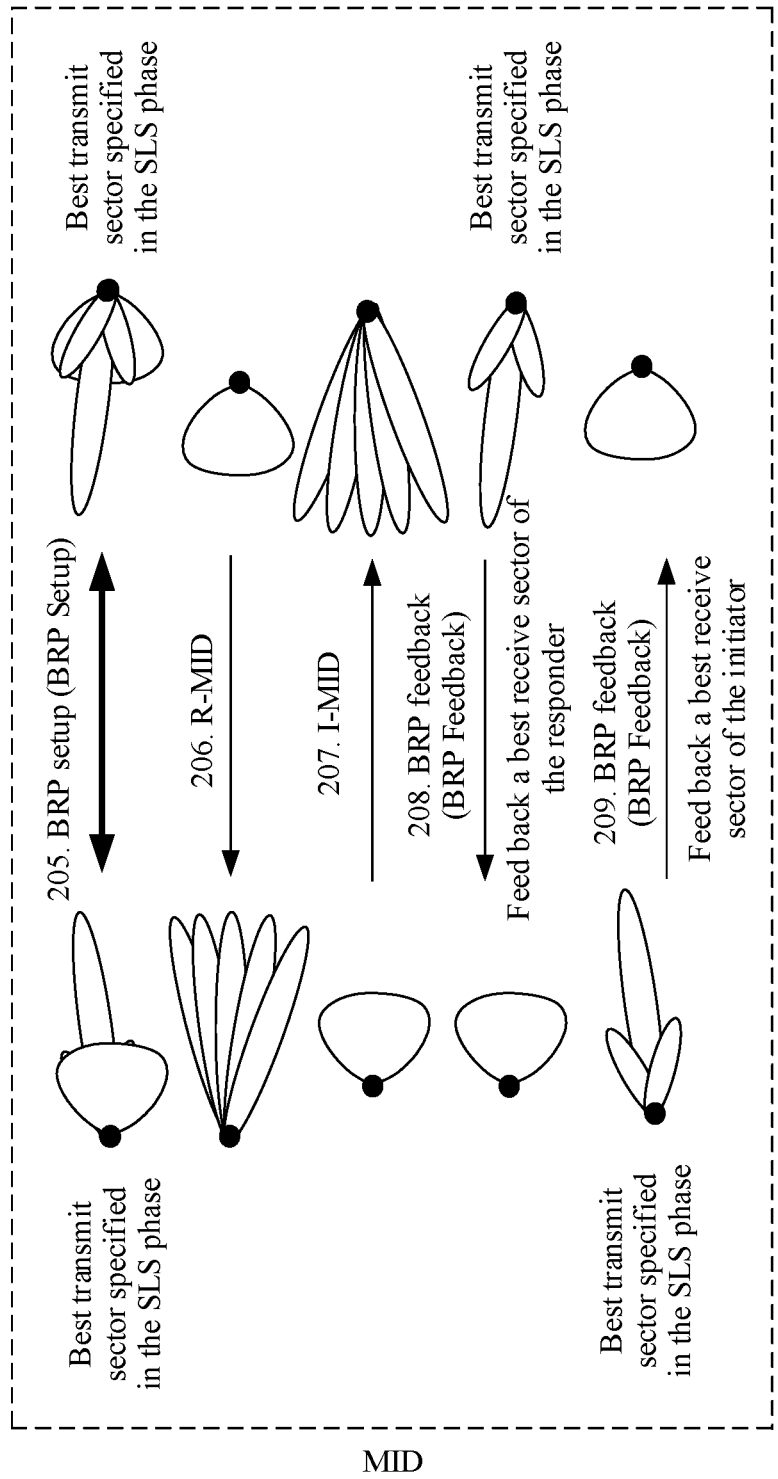

For example, as shown in FIG. 2A, FIG. 2B, and FIG. 2C, in beamforming training in the 802.11ad standard, a beamforming training process includes an SLS phase, and In one embodiment may further include a BRP phase.

In the SLS phase, transmit sectors of an initiator and a responder are mainly trained. The SLS phase includes four sub phases: initiator-transmit sector sweep (Initiator-Transmit Sector Sweep, I-TXSS), responder-transmit sector sweep (Responder-Transmit Sector Sweep, R-TXSS), sector sweep feedback (Sector Sweep Feedback, SSW Feedback), and sector sweep acknowledgement (Sector Sweep ACK, SSW ACK).

In one embodiment, the BRP phase mainly includes beam refinement protocol setup (BRP setup), multiple sector identifier (Multiple Sector Identifier, MID), and beam combining (Beam Combining, BC) sub phases. MID includes responder-multiple sector identifier (Responder-Multiple Sector Identifier, R-MID) and initiator-multiple sector identifier (Initiator-Multiple Sector Identifier, I-MID) sub phases. BC includes initiator-beam combining (Initiator-Beam Combining, I-BC) and responder-beam combining (Responder-Beam Combining, R-BC) phases.

It should be understood that, in the embodiments of this application, an initiator may also be referred to as an initiating device, and a responder may also be referred to as a responding device. This is not limited in the embodiments of this application.

The following describes a specific implementation process of beamforming training in the 802.11ad standard in detail with reference to FIG. 2A, FIG. 2B, and FIG. 2C. In one embodiment, as shown in FIG. 2A, FIG. 2B, and FIG. 2C, the beamforming training process in the 802.11ad standard includes:

Operation 201. I-TXSS phase.

In one embodiment, the I-TXSS phase is used to train a transmit sector of an initiator. For example, the initiator (Initiator) transmits a beacon (Beacon) frame in each sector (Sector) of the initiator to discover a responder (Responder); and in this case, the responder receives the beacon frame in quasi omnidirectional mode.

Operation 202. R-TXSS phase.

In one embodiment, the R-TXSS phase is used to train a transmit sector of the responder. For example, the responder transmits a sector sweep (Sector Sweep, SSW) frame in each sector of the responder, and feeds back a best transmit sector of the initiator in the previous phase; and the initiator receives the SSW frame in quasi omnidirectional mode.

Operation 203. SSW feedback phase.

In one embodiment, the SSW feedback phase is used by the initiator to feed back a best transmit sector of the responder. For example, the initiator transmits an SSW-feedback frame in the best transmit sector specified in the previous phase, where the SSW-feedback frame indicates the best transmit sector of the responder; and in this case, the responder receives the SSW-feedback frame in quasi omnidirectional mode.

Operation 204. SSW ACK phase.

In one embodiment, the SSW ACK phase is used by the responder to feed back the best transmit sector of the initiator. For example, the responder transmits an SSW-ACK frame in the best transmit sector specified in the previous phase, where the SSW-ACK frame indicates the best transmit sector of the initiator; and in this case, the initiator receives the SSW-ACK frame in quasi omnidirectional mode.

Operation 205. BRP setup phase.

In one embodiment, in the BRP setup phase, some required information may be exchanged for a next BRP phase or beam refinement protocol training (beam refinement training). For example, the initiator transmits a beam refinement protocol (BRP) frame by using the best transmit sector determined in the previous phase, and the responder transmits a BRP frame by using the best transmit sector determined in the previous phase. Correspondingly, the responder and the initiator respectively receive the BRP frames in omnidirectional mode, and obtain beamforming training capability information of their peers by using the BRP frames.

Operation 206. R-MID phase.

In one embodiment, the R-MID phase is used to train a receive sector of the initiator. For example, the responder transmits a BRP frame in quasi omnidirectional mode, and the initiator receives the BRP frame in each sector of the initiator.

Operation 207. I-MID phase.

In one embodiment, the I-MID phase is used to train a receive sector of the responder. For example, the initiator transmits a BRP frame in quasi omnidirectional mode, and feeds back a best receive sector of the initiator in the previous phase by using the BRP frame; and the responder receives the BRP frame in each sector of the responder.

Operation 208. Beam refinement protocol feedback (BRP Feedback/BRP Feedback) phase.

In one embodiment, the BRP feedback phase is used by the responder to feed back a best receive sector of the responder. For example, the responder transmits a BRP feedback frame in the best transmit sector that is specified previously, where the BRP feedback frame indicates the best receive sector of the responder; and in this case, the initiator receives the BRP feedback frame in quasi omnidirectional mode.

Operation 209. BRP feedback phase.

In one embodiment, the BRP feedback phase is used by the initiator to feed back the best receive sector of the initiator. For example, the initiator transmits a BRP feedback frame in the best transmit sector that is specified previously, where the BRP feedback frame indicates the best receive sector of the initiator; and in this case, the responder receives the BRP feedback frame in quasi omnidirectional mode.

Operation 210. R-BC phase.

In one embodiment, the R-BC phase is used to perform training to obtain a list of responder-to-initiator (that is, uplink) beam pairs sorted based on quality. For example, the responder transmits BRP frames one by one in a list of transmit sectors obtained in the SLS phase; and the initiator receives the BRP frames one by one in a list of receive sectors obtained in the MID phase.

Operation 211. I BC phase.

In one embodiment, the I-BC phase is used to perform training to obtain a list of initiator-to-responder (that is, downlink) beam pairs sorted based on quality. For example, the initiator transmits BRP frames one by one in a list of transmit sectors obtained in the SLS phase; and the responder receives the BRP frames one by one in a list of receive sectors obtained in the MID phase.

Operation 212. BRP feedback phase.

In one embodiment, the BRP feedback phase is used by the responder to feed back a list of best downlink beam pairs. The responder transmits a BRP feedback frame in the best sector that is specified previously, where the BRP feedback frame indicates the list of best downlink beam pairs; and in this case, the initiator receives the BRP-feedback in quasi omnidirectional mode.

Operation 213. BRP feedback phase.

In one embodiment, the BRP feedback phase is used by the initiator to feed back a list of best uplink beam pairs. The initiator transmits a BRP feedback frame in the best sector that is specified previously, where the BRP feedback frame indicates the list of best uplink beam pairs; and in this case, the responder receives the BRP feedback frame in quasi omnidirectional mode.

The foregoing operations are performed in 802.11ad to complete training of transmit beams and receive beams of the initiator and the responder.

It should be understood that the embodiment in FIG. 2A, FIG. 2B, and FIG. 2C is merely an example. For details about the beamforming training process in 802.11ad, refer to corresponding descriptions in the existing standard. Details are not described in this embodiment of this application.

It should be noted that, only beamforming training of a single user is supported in 802.11ad, and no beamforming training process of multiple users is provided in 802.11ad. When 802.11ad is evolved to 802.11ay that supports a multi-user scenario, if a training mechanism in FIG. 2A, FIG. 2B, and FIG. 2C is used, the beamforming training process lasts for a long time, and efficiency of beamforming training is very low in the multi-user scenario due to collision caused by concurrent training of multiple users.

In one embodiment, when a MU-MIMO scenario in 802.11ay is derived from a beamforming training technology in 802.11ad, because a PCP/AP needs to perform BFT with STAs one by one, when there are a large quantity of users, the beamforming training process consumes a long time and becomes inefficient. In one embodiment, in the MU-MIMO scenario, the following disadvantages mainly exist:

In the SSW ACK phase, each STA separately returns an SSW-ACK frame to the PCP/AP. Therefore, the SSW ACK phase lasts for a long time, and retransmission is required because collision tends to occur.

In the BRP setup phase, the PCP/AP transmits a BRP frame to each user separately. The process takes a long time as the quantity of users increases. In addition, during concurrent training of multiple users, collision tends to occur, causing retransmission.

In the BRP feedback phase in MID, as the quantity of users increases, the PCP/AP needs to perform a BRP feedback process with multiple users one by one. The process takes a long time, and collision tends to occur, causing retransmission.

In the BRP feedback phase in BC, as the quantity of users increases, the PCP/AP needs to perform a BRP-feedback process with multiple users one by one. The process takes a long time, and collision tends to occur, causing retransmission.

To resolve the foregoing problem and simplify the beamforming training process of multiple users in 802.11ay, in an embodiment of this application, an initiating device may assign an orthogonal codeword to each responding device, and different responding devices are distinguished by using different codewords. In this embodiment of this application, when the initiating device performs beamforming training with different responding devices, different codewords may be used to encode beamforming signals. In this way, beamforming training is skillfully implemented between the initiating device and different responding devices. Because codewords of signals corresponding to different responding devices are different, the initiating device can perform beamforming training signal transmission simultaneously with a plurality of responding devices to further shorten time of beamforming training and avoid signal collision that occurs when the plurality of responding devices perform training simultaneously with the initiating device. The following describes a beamforming training method in an embodiment of this application.

It should be understood that, in this embodiment of this application, for ease of description, an example in which an initiating device is an AP/PCP, and a responding device is a STA is used as an example in the following description; however, this embodiment of this application is not limited thereto.

Figure 3:
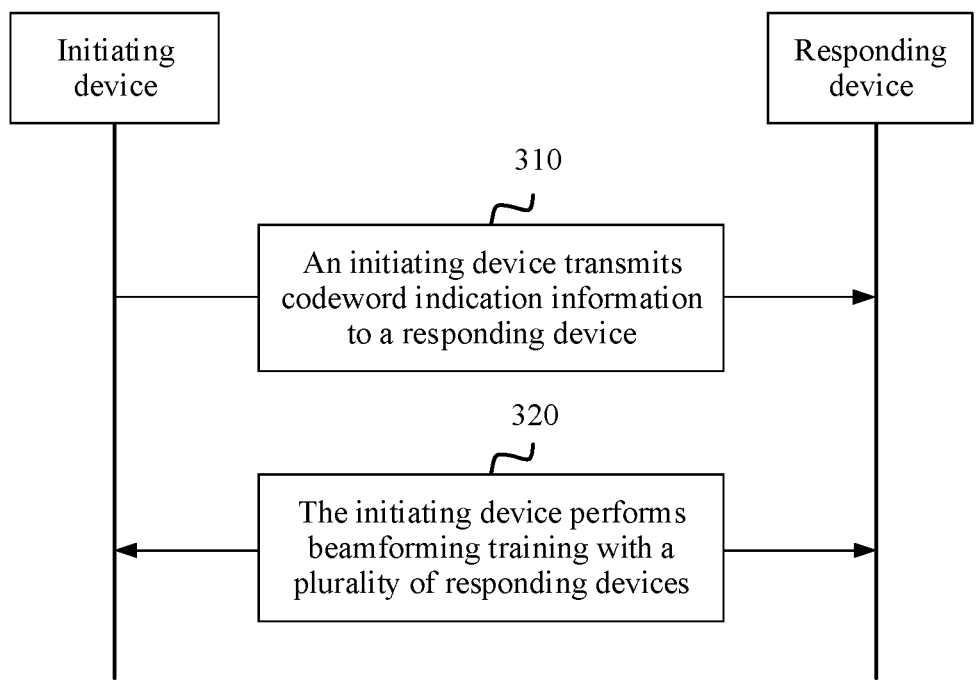
FIG. 3 is a schematic flowchart of a beamforming training method according to an embodiment of this application.

FIG. 3 is a schematic flowchart of a beamforming training method according to an embodiment of this application. The method shown in FIG. 3 may be applied to a WLAN system. The WLAN system may include an initiating device and a plurality of responding devices. In one embodiment, the method shown in FIG. 3 includes the following operations.

Operation 310. An initiating device transmits codeword indication information to a responding device.

In one embodiment, the initiating device transmits codeword indication information to each responding device in a plurality of responding devices, where codeword indication information received by a first responding device in the plurality of responding devices is used to indicate a first codeword assigned by the initiating device to the first responding device, the first responding device is any responding device in the plurality of responding devices, the first codeword is used to encode a beamforming training signal transmitted between the initiating device and the first responding device, and codewords assigned to different responding devices in the plurality of responding devices are orthogonal to each other.

Operation 320. The initiating device performs beamforming training with a plurality of responding devices.

In one embodiment, the initiating device performs beamforming training simultaneously with the plurality of responding devices based on a plurality of codewords assigned to the plurality of responding devices.

Therefore, in this embodiment of this application, the initiating device assigns an orthogonal codeword to each responding device, and when the initiating device performs beamforming training with different responding devices, different codewords may be used to encode beamforming signals. In this way, beamforming training is skillfully implemented between the initiating device and different responding devices. Because codewords of signals corresponding to different responding devices are different, the initiating device can perform beamforming training signal transmission simultaneously with the plurality of responding devices to further shorten time of beamforming training and improve efficiency of beamforming training in a multi-user scenario. In addition, in this embodiment of this application, signal collision that occurs when the plurality of responding devices perform training with the initiating device can be avoided.

It should be understood that, in operation 310, the initiating device may transmit the codeword indication information in a plurality of manners. For example, the initiating device may transmit the codeword indication information to a terminal device in a phase of beamforming training. The following describes different cases separately by using examples.

A first case: In an SSW feedback phase of an SLS phase, the initiating device assigns an orthogonal codeword to each responding device.

In one embodiment, in the SSW feedback phase of the SLS phase, the initiating device transmits a sector sweep feedback (SSW Feedback) frame to each responding device in the plurality of responding devices, where the sector sweep feedback frame carries the codeword indication information, and a sector sweep feedback frame transmitted to the first responding device is used to indicate a best transmit sector of the first responding device.

In this embodiment of this application, a PCP/AP assigns an orthogonal codeword to each STA in the SSW feedback phase of the SLS phase. Therefore, in this embodiment of this application, the initiating device can perform beamforming training simultaneously with the plurality of responding devices in subsequent beamforming training. In one embodiment, in subsequent processes of SSW ACK, BRP setup, BRP feedback in MID, and BRP feedback in BC, a plurality of STAs may perform information transmission simultaneously with the PCP/AP. This shortens time of performing beamforming training between the PCP/AP and the plurality of STAs, and can avoid collision caused by frame transmission when the plurality of STAs perform training simultaneously with the PCP/AP.

It should be understood that, actually performed beamforming training may include a BRP phase, or may not include a BRP phase. This is not limited in this embodiment of this application.

In one embodiment, the codeword indication information is carried in a reserved bit of a sector sweep feedback field of the sector sweep feedback frame.

Figure 4:
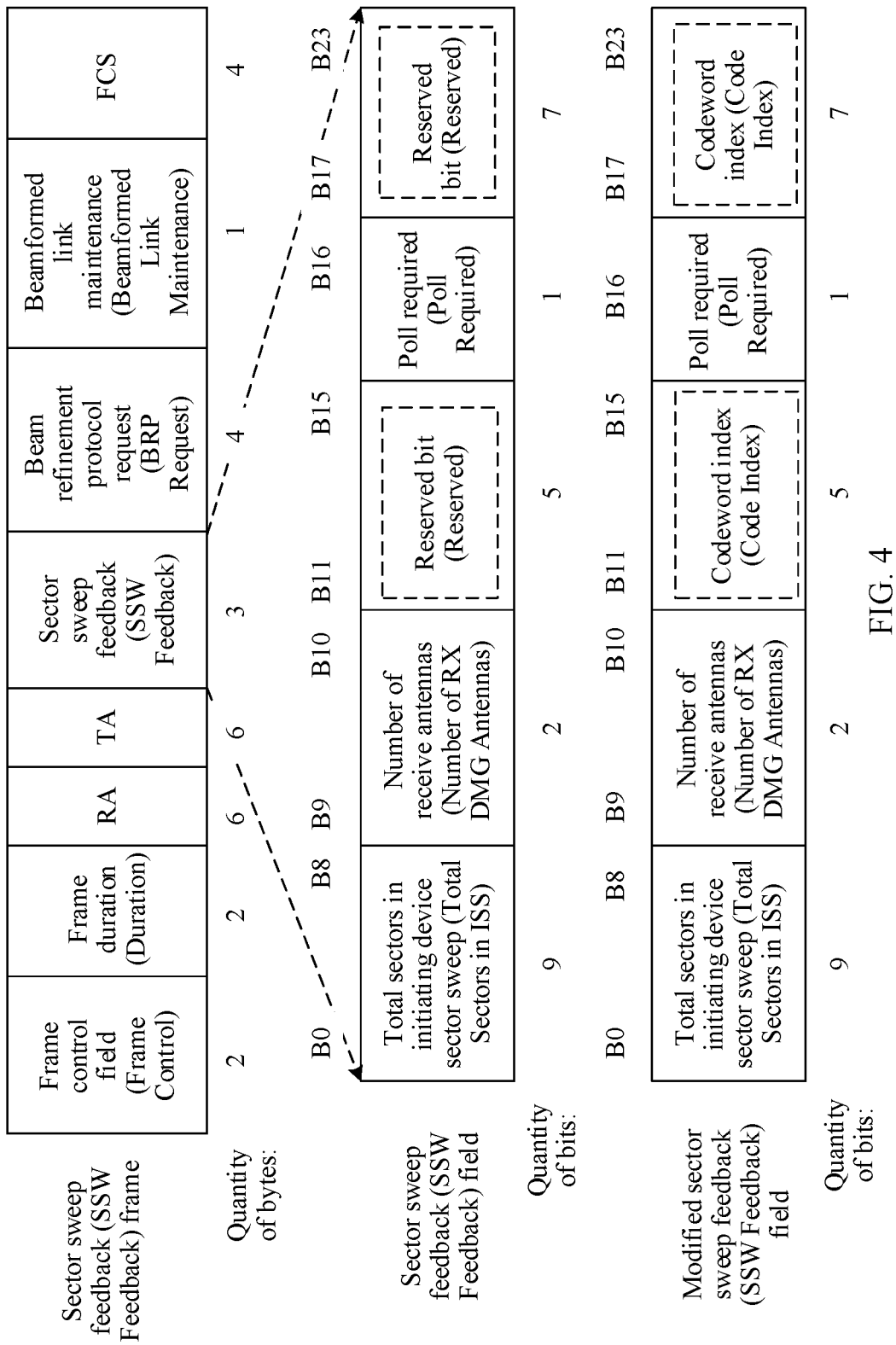
FIG. 4 is a schematic block diagram of an SSW feedback frame structure according to an embodiment of this application.

In one embodiment, a frame structure of the sector sweep feedback frame is shown in FIG. 4. The sector sweep feedback frame includes a frame control (Frame Control) field, a frame duration (Duration) field, a field indicating a destination address, that is, a receive end MAC address (RA) field, a field indicating a source address, that is, a transmit end address (TA) field, a sector sweep feedback (SSW Feedback) field, a beam refinement protocol request (BRP request) field, a beamformed link maintenance (Beamformed Link Maintenance) field, and a frame check sequence (FCS) field, where the SSW-feedback field includes a total sectors in initiating device sector sweep field in bit B0 to bit B8 (Total Sectors in ISS), a number of receive antennas (Number of RX DMG Antennas) field in bit B9 to bit B10, a reserved bit (Reserved) field in bit B11 to bit B15, a poll required (Poll Required) field in bit B16, and a reserved bit (Reserved) field in bit B17 to bit B23. In this embodiment of this application, the reserved bit (Reserved) field in bit B11 to bit B15 and/or the reserved bit (Reserved) field in bit B17 to bit B23 in the SSW-feedback field may be used to carry the codeword indication information, for example, a codeword index or a codeword sequence number (Code Index).

For example, in the WLAN system, 32 responding devices are associated with the initiating device. In this case, to distinguish codewords of the 32 responding devices, at least five bits (bits) are required for notifying codeword sequence numbers used by the responding devices. The five bits may be placed in positions (B11 to B15) of five bits reserved in the SSW feedback field of the SSW-feedback frame or may be placed in positions (B17 to B23) of seven bits reserved in the SSW feedback field of the SSW-feedback frame. If 128 responding devices are associated with the initiating device, seven bits are required for notifying a user of a used codeword sequence number. The seven bits may be placed in the positions (B17 to B23) of the seven bits reserved in the SSW feedback field of the SSW-feedback frame. When more responding devices are associated with the initiating device, more bits are required for distinguishing different codeword sequence numbers, and both the positions (B11 to B15) of the five bits and the positions (B17 to B23) of the seven bits reserved in the SSW feedback field may be used to distinguish codeword sequence numbers of different responding devices.

It should be understood that, an orthogonal codebook may be preset in this embodiment of this application. The orthogonal codebook may include a plurality of codewords that are orthogonal to each other. To be specific, the initiating device and the responding device may prestore all orthogonal codewords, that is, the codebook. The indication information may be used to indicate an index (or a sequence number), in the codebook, of a codeword corresponding to the responding device. Therefore, the responding device may search the codebook based on the index (or the sequence number) that is of the codeword in the codebook and indicated by the indication information, and determine the codeword corresponding to the responding device.

A specific form of the codebook is not limited in this embodiment of this application, as long as codewords of the responding devices can be orthogonal to each other. For example, Golay (Golay) sequences that are orthogonal to each other are set in this embodiment of this application, and Golay sequences of different users are orthogonal to each other.

Therefore, in this embodiment of this application, an offline-designed orthogonal codeword can be assigned to each responder by using codeword indication information carried in a reserved bit, without changing an existing MAC frame structure, and compatibility with the prior art is maintained.

It should be understood that, in the first case, the initiating device assigns a codeword to each responding device in the SSW feedback phase in the SLS phase. It should be understood that, a complete SLS phase may further include other phases. Before the SSW feedback phase, an I-TXSS phase and an R-TXSS phase are further included, and after the SSW feedback phase, an SSW ACK phase may be further included.

The following describes a complete process of the SLS phase in the first case.

Figure 5:
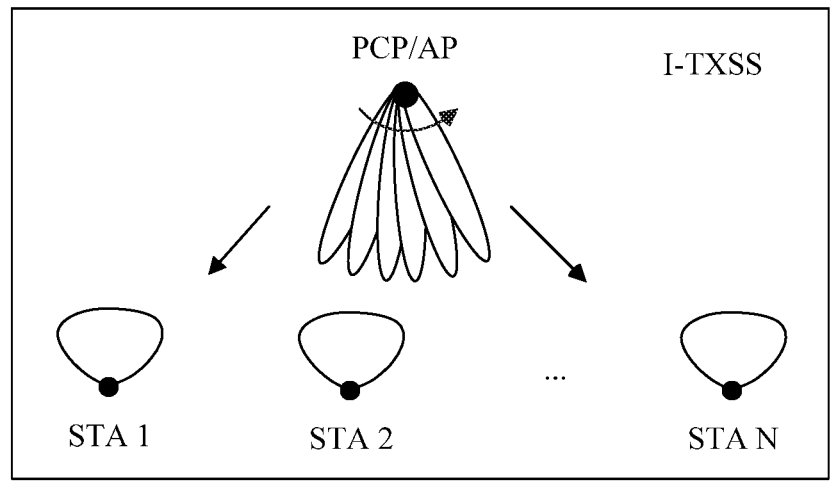
FIG. 5 is a schematic block diagram of an I-TXSS phase in beamforming training according to an embodiment of this application.
Figure 6:
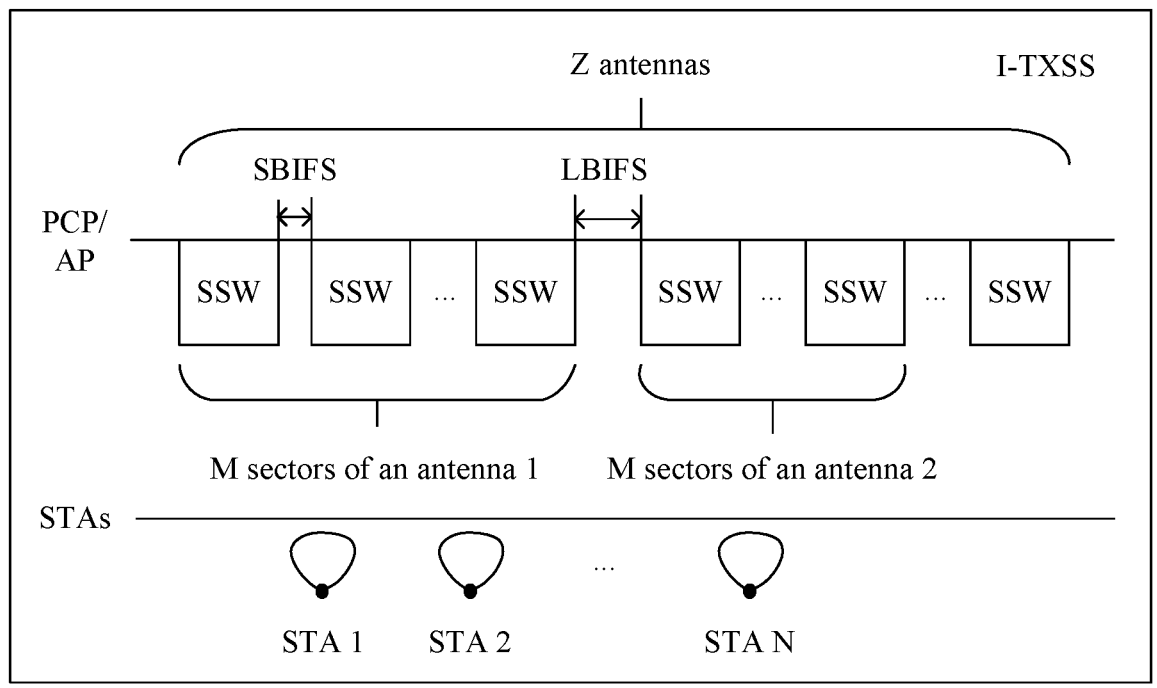
FIG. 6 is a time sequence block diagram of an I-TXSS phase in beamforming training according to an embodiment of this application.

In one embodiment, as shown in FIG. 5 and FIG. 6, in the I-TXSS phase, a transmit sector of the PCP/AP is trained in this process. The I-TXSS phase based on the orthogonal code in this embodiment of this application is the same as the I-TXSS phase in conventional 802.11ad. The PCP/AP transmits an SSW frame in each sector thereof, for example, a beacon frame to discover a STA. For example, the PCP/AP may include Z antennas, and each antenna transmits an SSW frame in sequence, where each of M sectors of an antenna 1 transmits an SSW frame in sequence, SSW frames transmitted by two sectors are separated by a short beamforming interframe spacing (Short Beamforming Interframe Spacing, SBIFS), and SSW frames transmitted by neighboring sectors between two antennas are separated by a long beamforming interframe spacing (Long Beamforming interframe Spacing, LBIFS). In the process, each of a STA 1, a STA 2, . . . , a STAN, receives, in quasi omnidirectional mode, the beacon frame transmitted by the PCP/AP. After the process is completed, each STA may obtain, based on receive quality of the received beacon frame transmitted from each sector of the PCP/AP, a list of transmit sectors sorted based on receive quality, of the PCP/AP for each STA.

Figure 7:
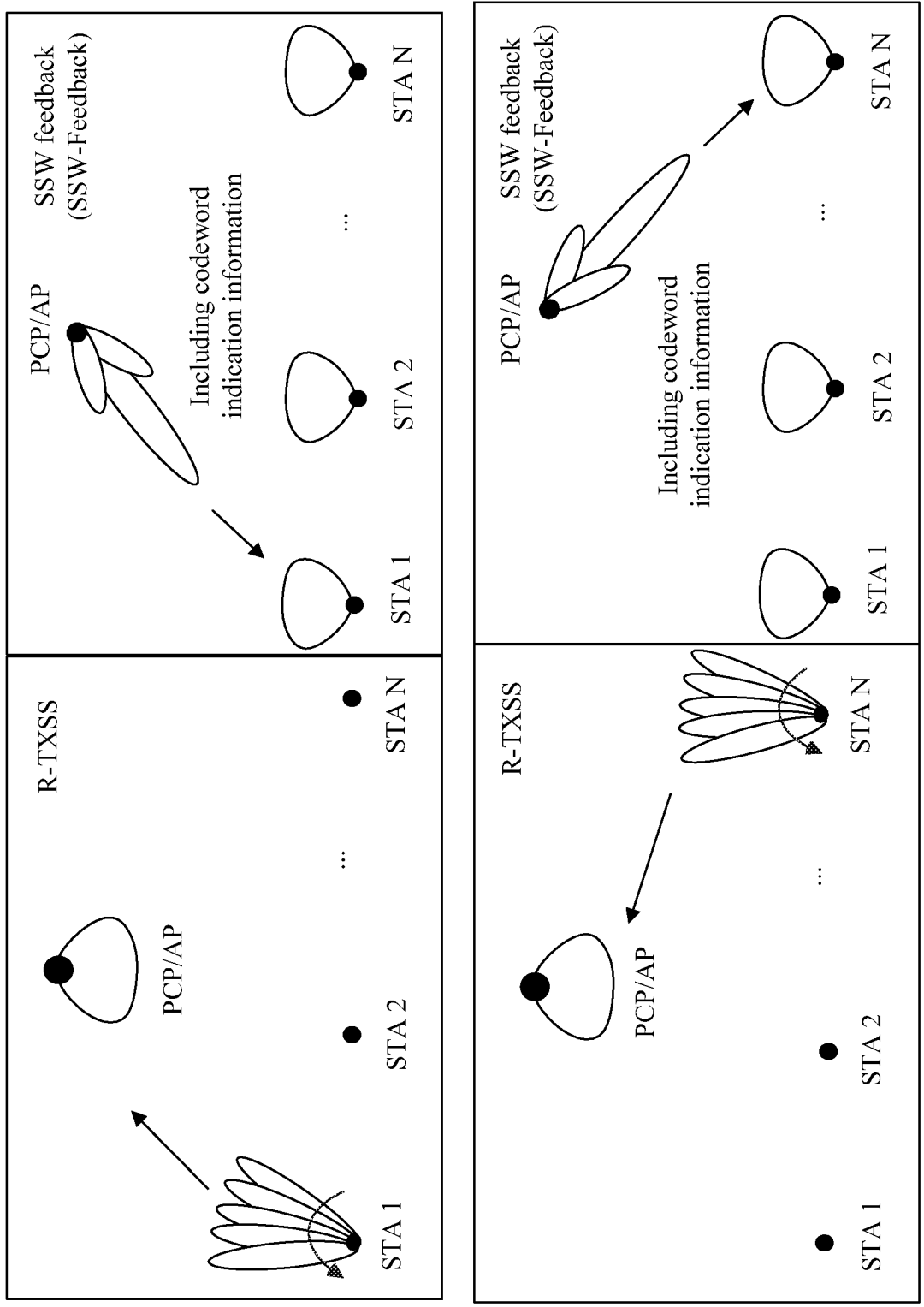
FIG. 7 is a schematic block diagram of R-TXSS and SSW feedback phases in beamforming training according to an embodiment of this application.
Figure 8:
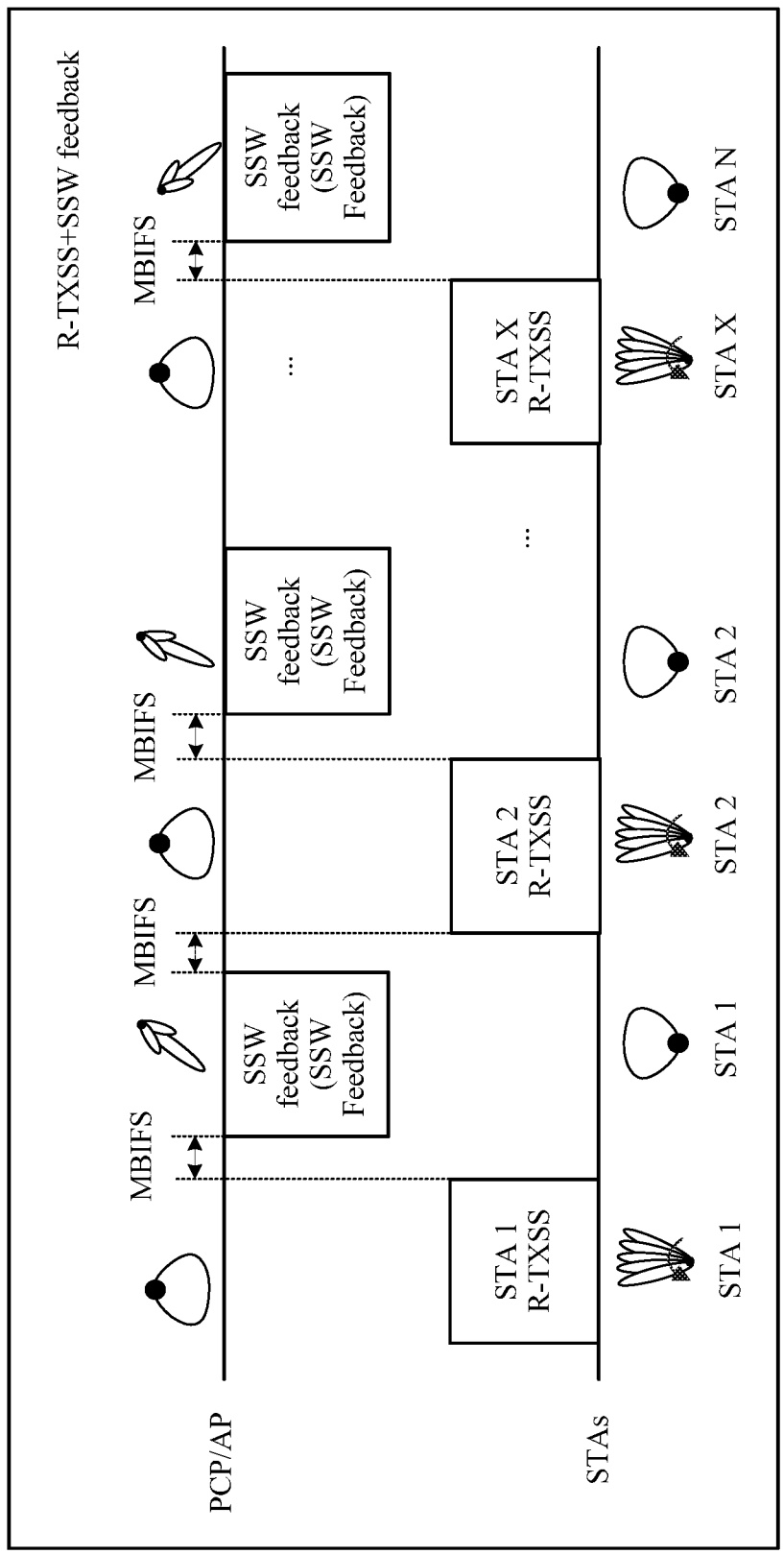
FIG. 8 is a time sequence block diagram of R-TXSS and SSW-feedback phases in beamforming training according to an embodiment of this application.

The R-TXSS process and the SSW-feedback training process are described with reference to FIG. 7 and FIG. 8.

R-TXSS phase: A transmit sector of each STA is trained in this process. The R-TXSS based on the orthogonal code in this embodiment of this application is the same as the R-TXSS in conventional 802.11ad. Each of the STA 1, the STA 2, . . . , the STA N, transmits an SSW frame in a sector thereof in directional mode. The PCP/AP receives, in quasi omnidirectional mode, the SSW frame transmitted by each STA. The SSW frame transmitted by each STA in the process includes an ID of a best transmit sector that is of the PCP/AP and is recorded by the STA in the I-TXSS process.

SSW feedback phase: After the SSW frame transmitted by each STA in the R-TXSS process is received by the PCP/AP correctly, as described in the first case, the PCP/AP feeds back an SSW-feedback frame to the STA, and indicates, in the SSW-feedback frame, an orthogonal codeword assigned to the STA. A direction of transmitting the SSW-feedback frame by the PCP/AP in the process is a direction of a best transmit sector that is of the PCP/AP and is indicated by the STA in the R-TXSS phase. In the process, the SSW-feedback frame includes an identifier ID of the best transmit sector of each STA in the R-TXSS phase. After each responder performs the R-TXSS phase with the initiator, the SSW feedback phase may be performed after a medium beamforming interframe spacing (Medium Beamforming Interframe Spacing, MBIFS).

SSW ACK phase: After the initiating device assigns a codeword to each responding device in the SSW feedback phase, the initiating device may perform, in the SSW ACK phase, beamforming training simultaneously with the plurality of responding devices based on the plurality of codewords assigned to the plurality of responding devices.

Correspondingly, operation 320 may include content of the SSW ACK phase, that is, the initiating device receives sector sweep acknowledgement (SSW ACK) frames simultaneously transmitted by the plurality of responding devices, where the initiating device receives a sector sweep acknowledgement frame encoded by using the first codeword and transmitted by the first responding device by using the best transmit sector, and the sector sweep acknowledgement frame transmitted by the first responding device is used to indicate a best transmit sector that is of the initiating device and corresponds to the first responding device.

Figure 9:
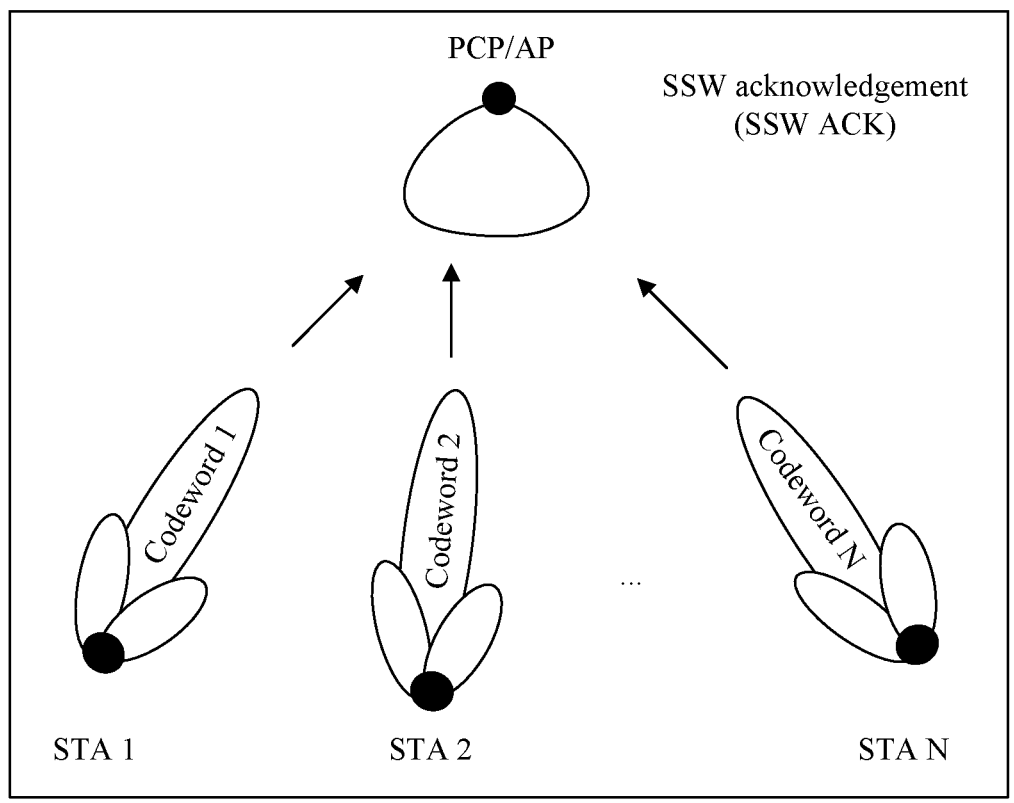
FIG. 9 is a schematic block diagram of an SSW ACK phase in beamforming training according to an embodiment of this application.
Figure 10:
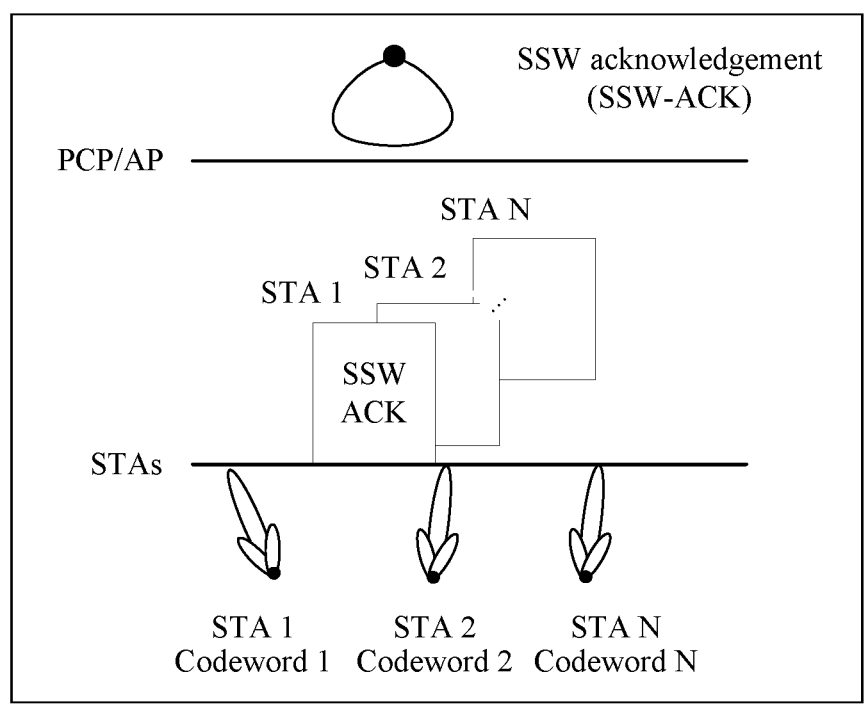
FIG. 10 is a time sequence block diagram of an SSW ACK phase in beamforming training according to an embodiment of this application.

In one embodiment, as shown in FIG. 9 and FIG. 10, in the SSW ACK phase of the SLS phase, each STA performs spectrum spreading on the SSW-ACK frame by using the orthogonal codeword assigned by the PCP/AP to each of the STA 1, the STA 2, . . . , the STA N in the SSW feedback phase, where the STA 1 to the STA N perform spectrum spreading on the SSW-ACK frames by using the codewords (code 1 to code N) respectively, and transmit the spectrum-spread SSW-ACK frames in best transmit sectors that are of the STAs and are indicated by the PCP/AP in the SSW-feedback process; and the PCP/AP receives the spectrum-spread SSW-ACK frames in quasi omnidirectional mode. Because different codewords are assigned to the SSW-ACK frames of the STAs, all the STAs in the process can return the SSW-ACK frames concurrently.

Therefore, in this embodiment of this application, the PCP/AP assigns an orthogonal codeword to each STA in the SSW feedback phase of the SLS phase. Therefore, all the responding device can return the SSW-ACK frames to the PCP/AP simultaneously, time of performing beamforming training between the PCP/AP and the plurality of STAs can be shortened, and signal collision that occurs when the plurality of responding devices perform training with the initiating device can be avoided.

It should be noted that, in operation 320, if the initiating device does not receive, within a first preset time interval, the sector sweep acknowledgement frame transmitted by the first responding device, the initiating device retransmits the sector sweep feedback frame to the first responding device; or if the initiating device receives, within the first preset time interval, the sector sweep acknowledgement frame transmitted by the first responding device, the initiating device transmits a first frozen frame to the first responding device, where the first frozen frame is used to instruct the first responding device to wait for the initiating device to receive a sector sweep acknowledgement frame transmitted by a second responding device in the plurality of responding devices, or the first frozen frame is used to indicate time that the first responding device spends waiting for the initiating device to transmit the sector sweep feedback frame to the second responding device until a maximum quantity of retransmission times is reached, where the initiating device does not receive, within the first preset time interval, the sector sweep acknowledgement frame transmitted by the second responding device.

Figure 11:
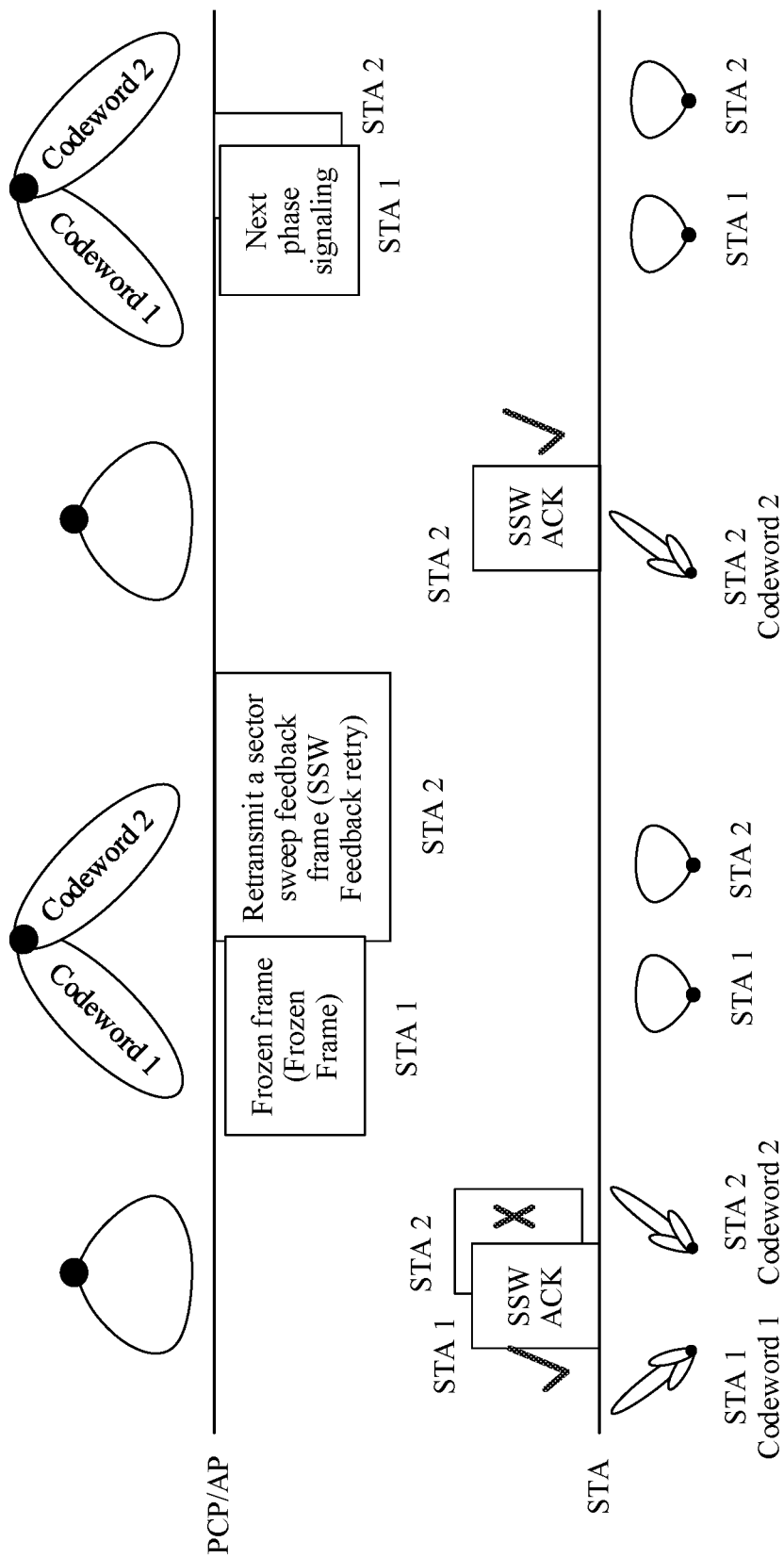
FIG. 11 is a schematic block diagram of a packet loss and retransmission process in beamforming training according to an embodiment of this application.

For example, as shown in FIG. 11, within the first preset time period, if the PCP/AP can receive a sector sweep acknowledgement (SSW ACK) frame transmitted by the STA 1, but does not receive a sector sweep acknowledgement frame transmitted by the STA 2, the initiating device retransmits the sector sweep feedback frame (SSW Feedback frame) to the STA 2, and transmits a first frozen frame (Frozen Frame) to the STA 1, where the first frozen frame is used to instruct the STA 1 to wait for the initiating device to receive the sector sweep acknowledgement frame transmitted by the STA 2, or the first frozen frame is used to indicate time that the STA 1 spends waiting for the initiating device to transmit the sector sweep feedback frame to the STA 2 until a maximum quantity of retransmission times is reached. After the initiating device receives the sector sweep acknowledgement frame transmitted by the STA 2, each STA transmits a next phase signaling (Next phase signaling) based on the codeword assigned to the STA. For example, the STA 1 uses the code 1, and the STA 2 uses the code 2.

It should be understood that, values of four reserved bits in a frame control field of the first frozen frame are one of the following:

0000, 0001, 1011, 1100, 1101, 1110, and 1111.

In one embodiment, as described above, the PCP/AP transmits a frozen frame (Frozen frame) in a direction of a STA that has received a correct reply, instructing the STA to wait. The PCP/AP still transmits an SSW feedback frame in a direction of a STA that has not received a correct reply.

Figure 12:
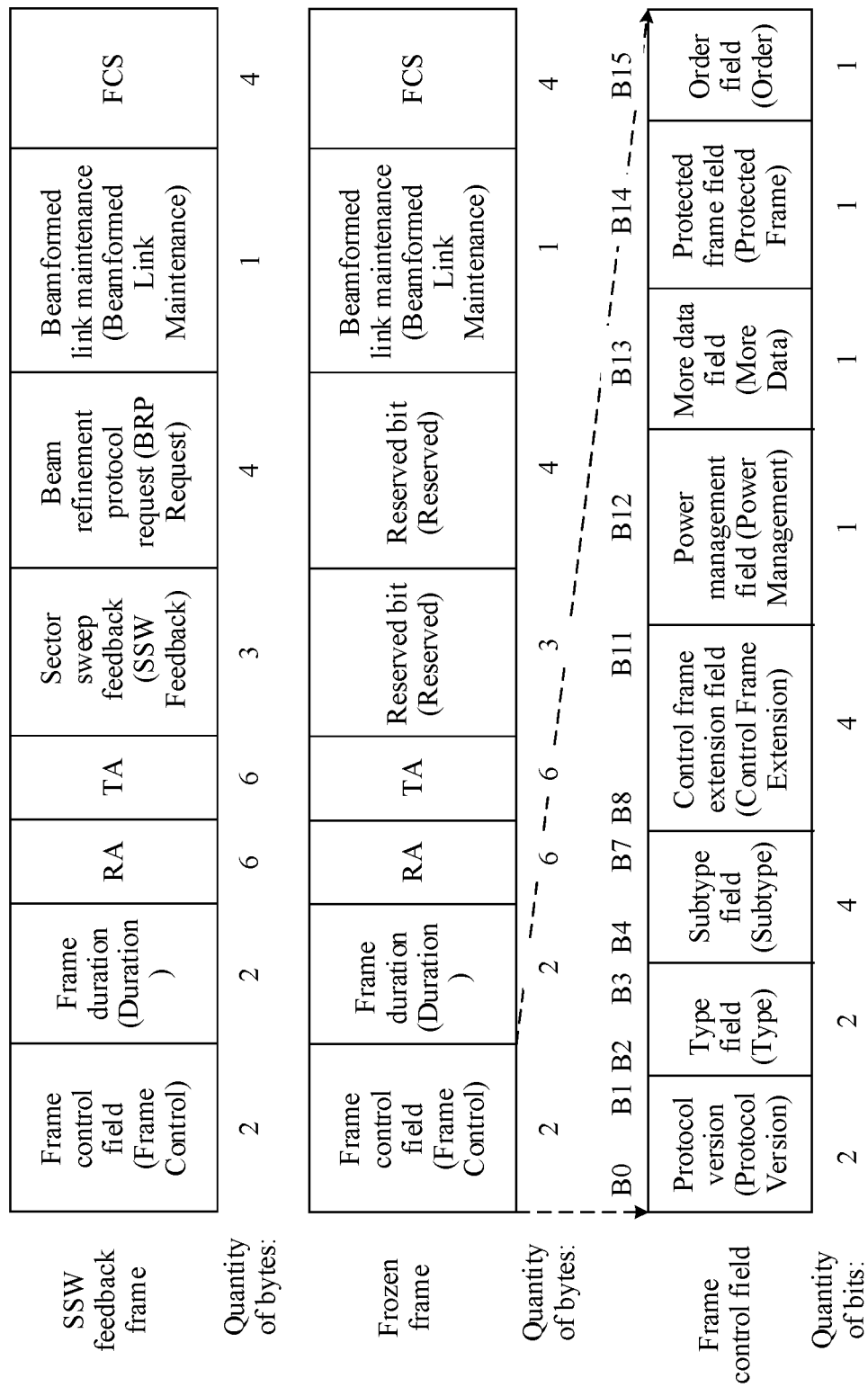
FIG. 12 is a schematic block diagram of a frozen frame structure according to an embodiment of this application.

In one embodiment, in this embodiment of this application, the frozen frame (Frozen frame) may be designed based on a structure of a sector sweep feedback frame (SSW-feedback frame). As shown in FIG. 12, the frozen frame in this embodiment of this application may include a frame control (Frame Control) field, a frame duration (Duration) field, a receive end MAC address (RA) field, a transmit end MAC address (TA) field, a reserved (Reserved) field corresponding to a sector sweep feedback (SSW Feedback) field in the SSW-feedback frame, a reserved (Reserved) field corresponding to a beam refinement request (BRP request) field in the SSW-feedback frame, a beamformed link maintenance (Beamformed Link Maintenance) field, and a frame check sequence (FCS) field.

In one embodiment, the frame control field is used to specify a type of a frame. The frame control field includes a protocol version (Protocol Version) field in bit B0 to bit B1, a type (Type) field in bit B2 to bit B3, a subtype (Subtype) field in bit B4 to bit B7, a control frame extension (Control Frame Extension) field in bit B8 to bit B11, a power management (Power Management) field in bit B12, a more data (More Data) field, a protected frame (Protected Frame) field, and an order (Order) field. As shown in the following Table 1, Table 1 shows a type value (Type value), a subtype value (Subtype value), a control frame extension field (Control Frame Extension value), and function description (Description) corresponding to the fields. As can be seen from Table 1, reserved bits are still reserved in the frame control field of the existing sector sweep feedback frame. In one embodiment, when values of B11, B10, B9, and B8 in the frame control field are 0000, 0001, 1011, 1100, 1101, 1110, and 1111, the bits are reserved bits. In this embodiment of this application, when values of B11, B10, B9, and B8 are any one of the foregoing values, the frame type may be specified as a frozen frame. For example, when values of B11, B10, B9, and B8 are 0001 in Table 1, it indicates a frozen frame.

TABLE 1

| Type value B3 B2 | Subtype value B7 B6 B5 B4 | Control Frame Extension value B11 B10 B9 B8 | Description |
|---|---|---|---|
| 01 | 0110 | 0000 | Reserved |
| 01 | 0110 | 0001 | Frozen |
| 01 | 0110 | 0010 | Poll |
| 01 | 0110 | 0011 | SPR |
| 01 | 0110 | 0100 | Grant |
| 01 | 0110 | 0101 | DMG CTS |
| 01 | 0110 | 0110 | DMG DTS |
| 01 | 0110 | 0111 | Grant ACK |
| 01 | 0110 | 1000 | SSW |
| 01 | 0110 | 1001 | SSW-Feedback |
| 01 | 0110 | 1010 | SSW-ACK |
| 01 | 0110 | 1011-1111 | Reserved |

Therefore, with respect to a possible packet loss in a MU-MIMO BFT process, in this embodiment of this application, a reserved field is used in the frame control field (Frame control field), and a new frozen frame type is designed to freeze a STA that has performed feedback. The PCP/AP transmits signaling only to a STA that has not performed feedback, without transmitting signaling to all STAs again. Therefore, resource overheads are reduced, and efficiency of beamforming training is improved.

The foregoing describes the whole process of the SLS phase in the first case. In one embodiment, in the first case, the beamforming training process in this embodiment of this application may further include a BRP phase. To be specific, beamforming training in this embodiment of this application may further include a BRP setup phase, and may further include a MID phase, and may further include a BC phase. Detailed descriptions are provided separately below.

Correspondingly, in another embodiment, that the initiating device performs beamforming training with the plurality of responding devices in operation 320 may include a BRP phase, that is, the initiating device transmits first BRP frames to the plurality of responding devices simultaneously, where the initiating device transmits, to the first responding device by using the best transmit sector that is of the initiating device and corresponds to the first responding device, a first BRP frame encoded by using the first codeword, and the first BRP frame transmitted to the first responding device is used by the first responding device to obtain beamforming training capability information of the initiating device; and the initiating device receives second BRP frames simultaneously transmitted by the plurality of responding devices, where the initiating device receives the second BRP frame encoded by using the first codeword and transmitted by the first responding device by using the best transmit sector of the first responding device, and the second BRP frame transmitted by the first responding device is used by the initiating device to obtain beamforming training capability information of the first responding device.

Figure 13:
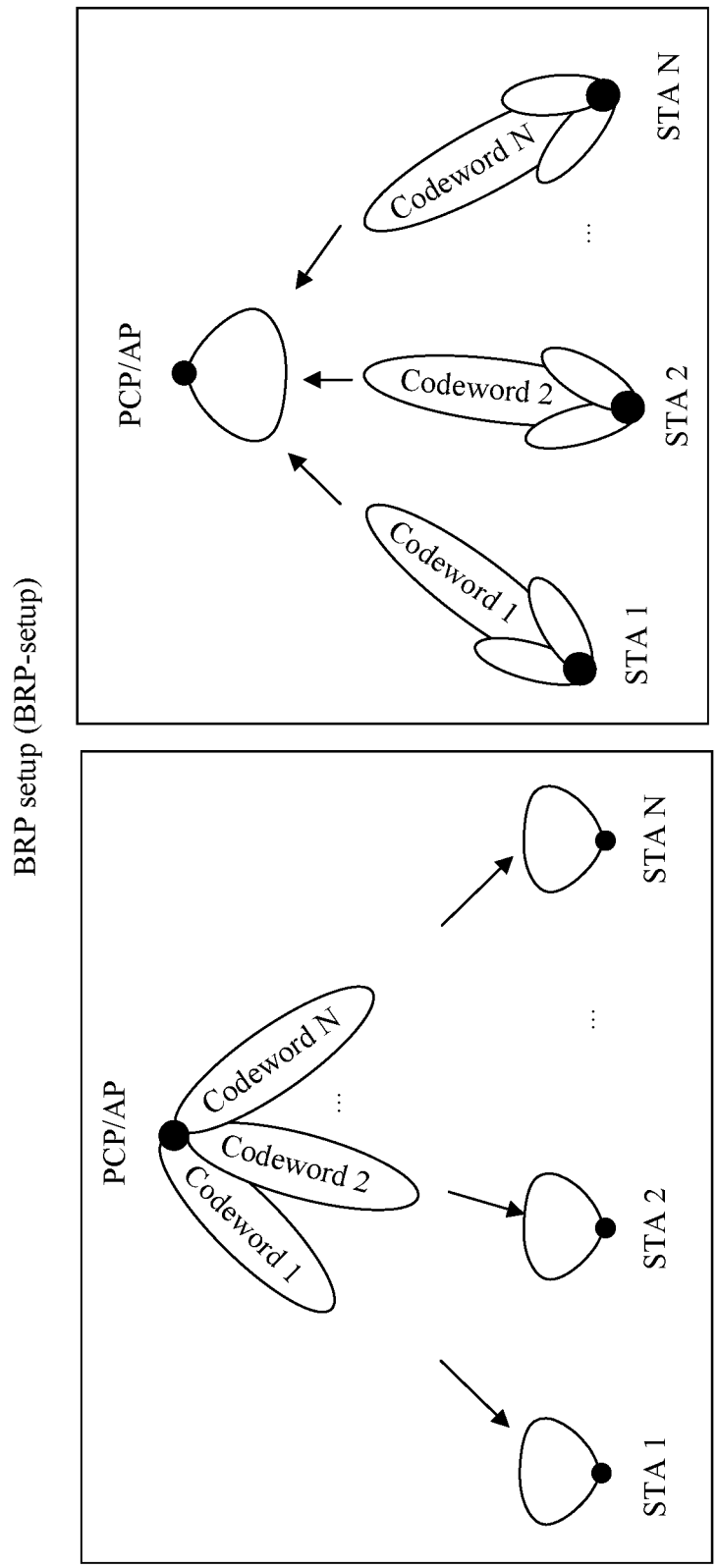
FIG. 13 is a schematic block diagram of a BRP setup phase in beamforming training according to an embodiment of this application.
Figure 14:
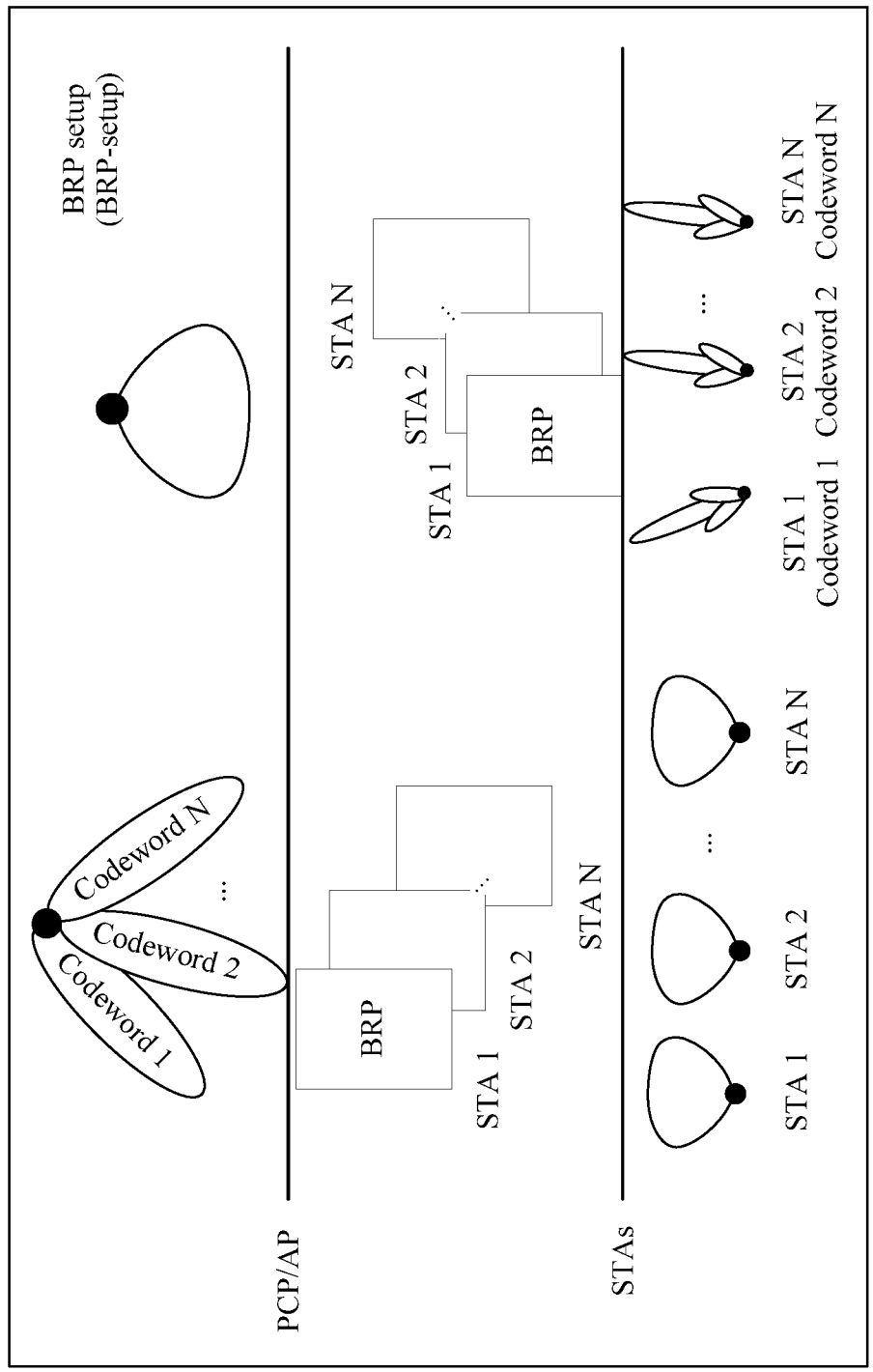
FIG. 14 is a time sequence block diagram of a BRP setup phase in beamforming training according to an embodiment of this application.

In one embodiment, as shown in FIG. 13 and FIG. 14, in the BRP setup phase, by using orthogonal codewords and a plurality of sectors of the PCP/AP, the PCP/AP may transmit BRP frames to the plurality of STAs: the STA 1, the STA 2, . . . , the STA N simultaneously in corresponding best transmit sectors, and the STAs receive the BRP frames of the PCP/AP in quasi omnidirectional mode; by using the orthogonal codes, all the STAs may return BRP frames to the PCP/AP simultaneously in best transmit sectors, and in this case, the PCP/AP receives, in quasi omnidirectional mode, the BRP frames transmitted by all the STAs.

Therefore, in this embodiment of this application, the PCP/AP assigns an orthogonal codeword to each STA in the SSW feedback phase of the SLS phase. In the BRP setup phase, the PCP/AP may transmit BRP frames to multiple users in a plurality of directions simultaneously by using a multi-antenna array; and each user may also return a BRP frame to the PCP/AP by using an orthogonal code. Therefore, time of performing beamforming training between the PCP/AP and the plurality of STAs can be shortened, and signal collision that occurs when the plurality of responding devices perform training with the initiating device can be avoided.

It should be noted that, in operation 320, if the initiating device does not receive, within a second preset time interval, the second BRP frame transmitted by the first responding device, the initiating device retransmits the first BRP frame to the first responding device; or if the initiating device receives, within the second preset time interval, the second BRP frame transmitted by the first responding device, the initiating device transmits a second frozen frame to the first responding device, where the second frozen frame is used to instruct the first responding device to wait for the initiating device to receive a second BRP frame transmitted by a third responding device in the plurality of responding devices, or the second frozen frame is used to indicate time that the first responding device spends waiting for the initiating device to transmit a first BRP frame to the third responding device until a maximum quantity of retransmission times is reached, where the initiating device does not receive, within the second preset time interval, the second BRP frame transmitted by the third responding device.

It should be understood that, a manner of transmitting the second frozen frame and a process of retransmitting the first BRP frame are similar to the manner of transmitting the first frozen frame and the process of retransmitting the sector sweep feedback frame shown in FIG. 10. Details are not described again herein to avoid repetition.

It should be understood that, the second preset time may be the same as or different from the first preset time. This is not limited in this embodiment of this application.

In one embodiment, values of four reserved bits in a frame control field of the second frozen frame are one of the following:

0000, 0001, 1011, 1100, 1101, 1110, and 1111.

For the second frozen frame in this embodiment of this application, refer to the descriptions about the first frozen frame. Details are not described again herein to avoid repetition.

Therefore, with respect to a possible packet loss in a MU-MIMO BFT process, in this embodiment of this application, a reserved field is used in the frame control field (Frame control field), and a new frozen frame type is designed to freeze a STA that has performed feedback. The PCP/AP transmits signaling only to a STA that has not performed feedback, without transmitting signaling to all STAs again. Therefore, resource overheads are reduced, and efficiency of beamforming training is improved.

In one embodiment, in the first case, the beamforming training process in this embodiment of this application may further include a MID phase. The following describes each phase in MID separately.

Figure 15:
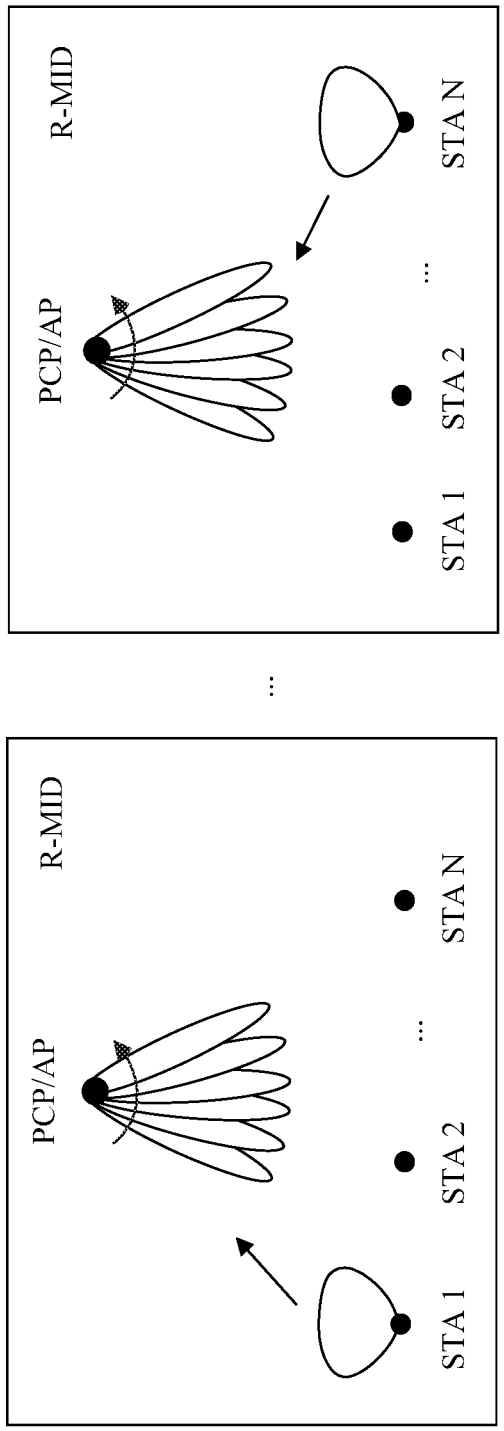
FIG. 15 is a schematic block diagram of an R-MID phase in beamforming training according to an embodiment of this application.
Figure 16:
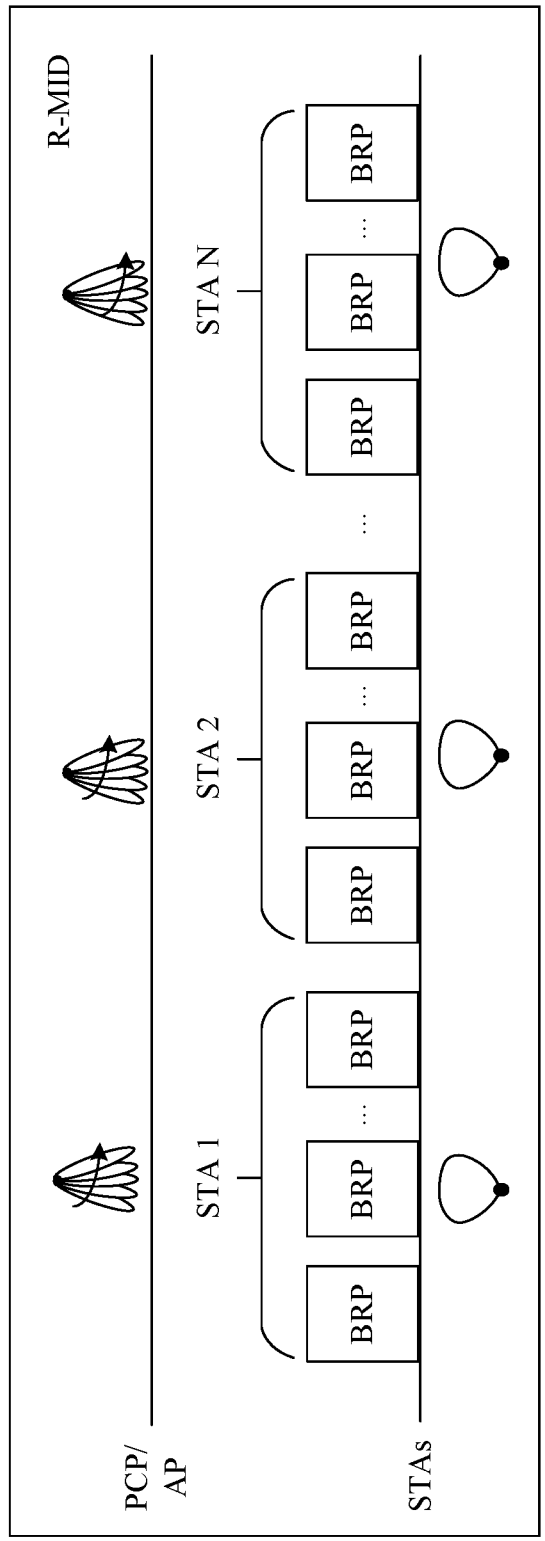
FIG. 16 is a time sequence block diagram of an R-MID phase in beamforming training according to an embodiment of this application.

R-MID phase: As shown in FIG. 15 and FIG. 16, in the R-MID phase, a receive sector of the PCP/AP is trained. This is the same as the R-MID process in 802.11ad. Each of the STA 1, the STA 2, . . . , the STA N completes R-MID process in sequence. The STA transmits a BRP frame in quasi omnidirectional mode; and the PCP/AP receives the BRP frame in a receive sector thereof in directional mode.

Figure 17:
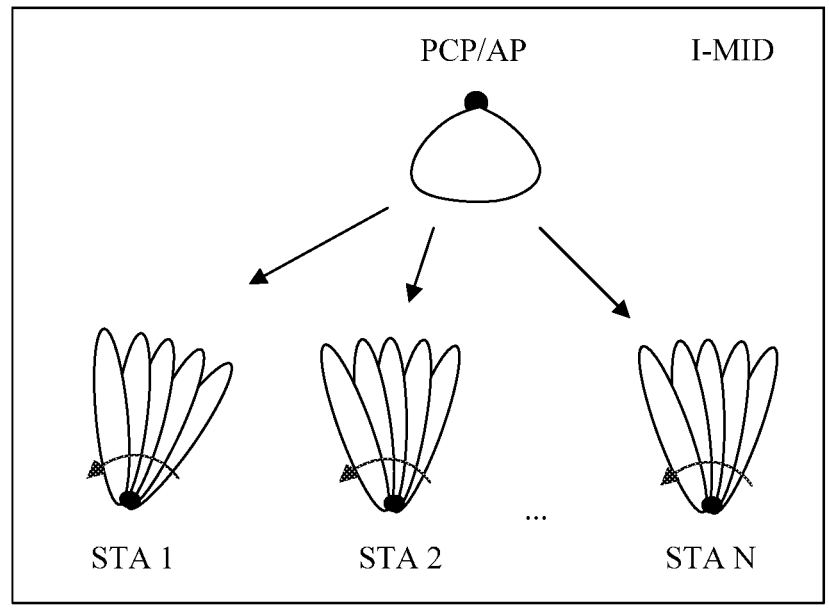
FIG. 17 is a schematic block diagram of an I-MID phase in beamforming training according to an embodiment of this application.
Figure 18:
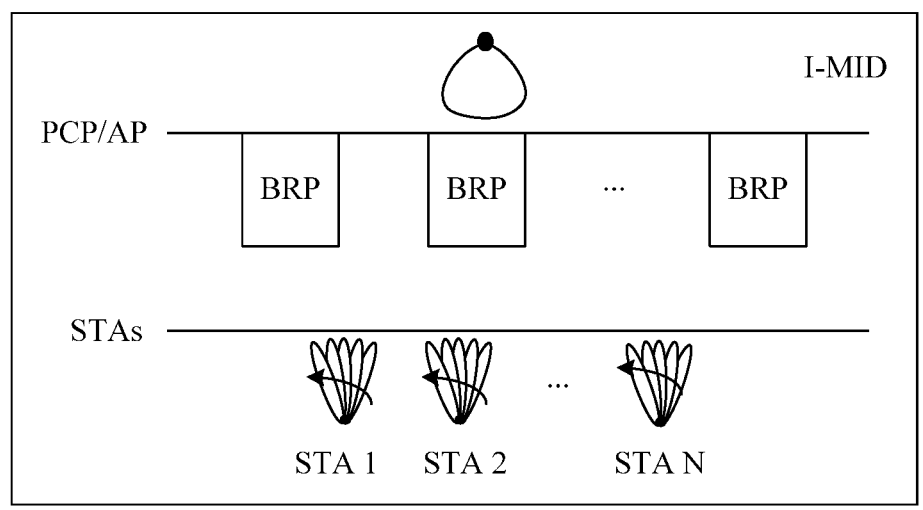
FIG. 18 is a time sequence block diagram of an I-MID phase in beamforming training according to an embodiment of this application.

I-MID phase: As shown in FIG. 17 and FIG. 18, in the I-MID phase, a receive sector of the STA is trained. This is the same as the I-MID process in 802.11ad. In the I-MID process, the PCP/AP transmits BRP frames in quasi omni-directional mode and lasts for a period of time; in this case, each of the STA 1, the STA 2, . . . , the STA N receives a BRP frame separately in a receive sector thereof; and after the process is completed, a list of receive sector IDs of each STA that are sorted based on receive quality may be obtained.

BRP-feedback in MID: After the initiating device assigns a codeword to each responding device in the SSW feedback phase, the initiating device may perform, in BRP-feedback after MID, beamforming training simultaneously with the plurality of responding devices based on the plurality of codewords assigned to the plurality of responding devices.

Correspondingly, in another embodiment, operation 320 may further include a BRP-feedback process in MID, that is, the initiating device receives first BRP feedback frames simultaneously transmitted by the plurality of responding devices, where the first responding device transmits, by using the best transmit sector of the first responding device, the first BRP feedback frame encoded by using the first codeword, and the first BRP feedback frame transmitted by the first responding device is used to indicate a best receive sector of the first responding device; and the initiating device transmits second BRP feedback frames to the plurality of responding devices simultaneously, where the initiating device transmits, to the first responding device by using the best transmit sector that is of the initiating device and corresponds to the first responding device, the second BRP feedback frame encoded by using the first codeword, where the second BRP feedback frame transmitted to the first responding device is used to indicate a best receive sector that is of the initiating device and corresponds to the first responding device.

Therefore, in this embodiment of this application, the PCP/AP assigns an orthogonal codeword to each STA in the SSW feedback phase of the SLS phase. In the BRP feedback phase of MID, the PCP/AP may transmit BRP feedback frames to the plurality of STAs simultaneously in a plurality of directions by using a multi-antenna array, to reduce transmission time and collision. Each STA may also return a BRP feedback frame to the PCP/AP by using an orthogonal code. This also greatly shortens transmission time and reduces collision. Therefore, in this embodiment of this application, time of performing beamforming training between the PCP/AP and the plurality of STAs can be shortened, and signal collision that occurs when the plurality of responding devices perform training with the initiating device can be avoided.

Figure 19:
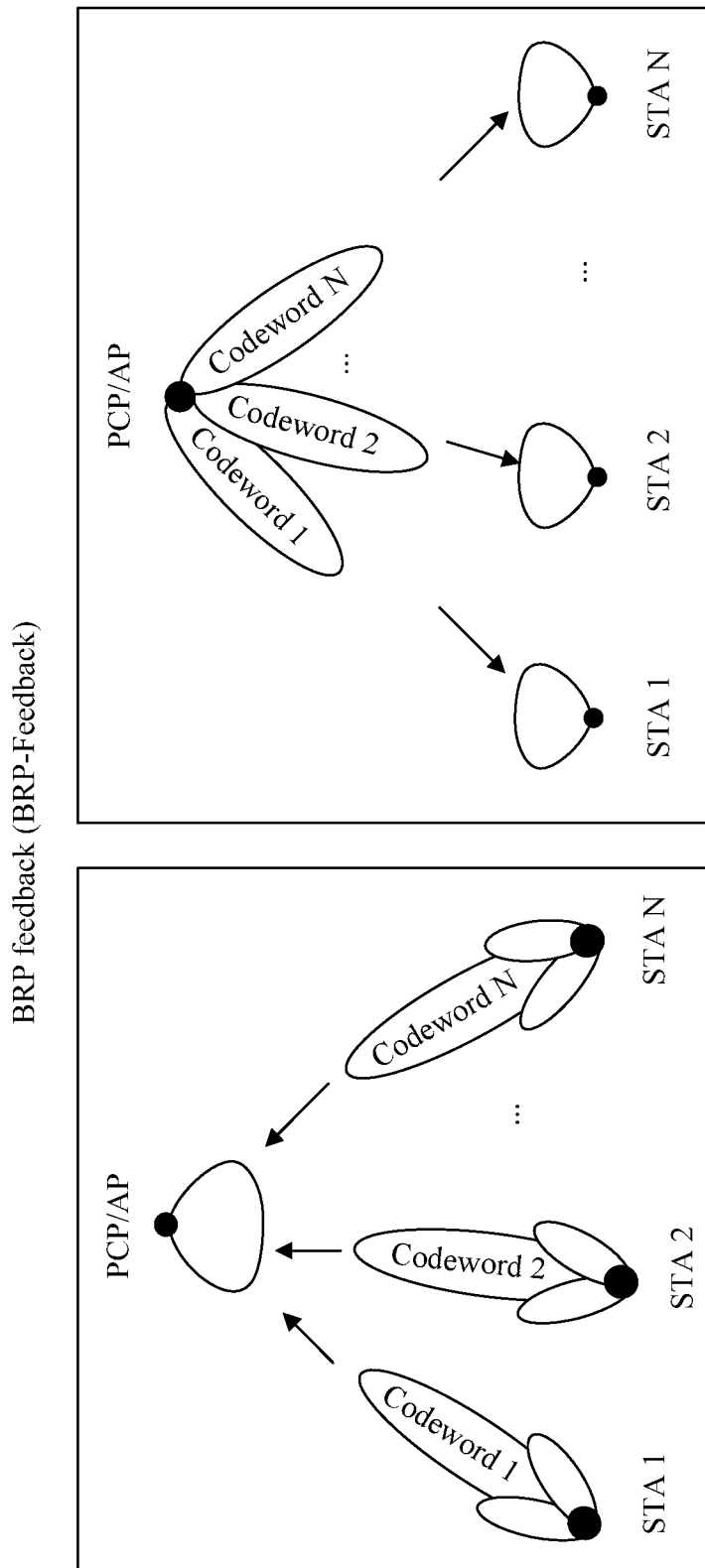
FIG. 19 is a schematic block diagram of a BRP feedback phase in MID in beamforming training according to an embodiment of this application.
Figure 20:
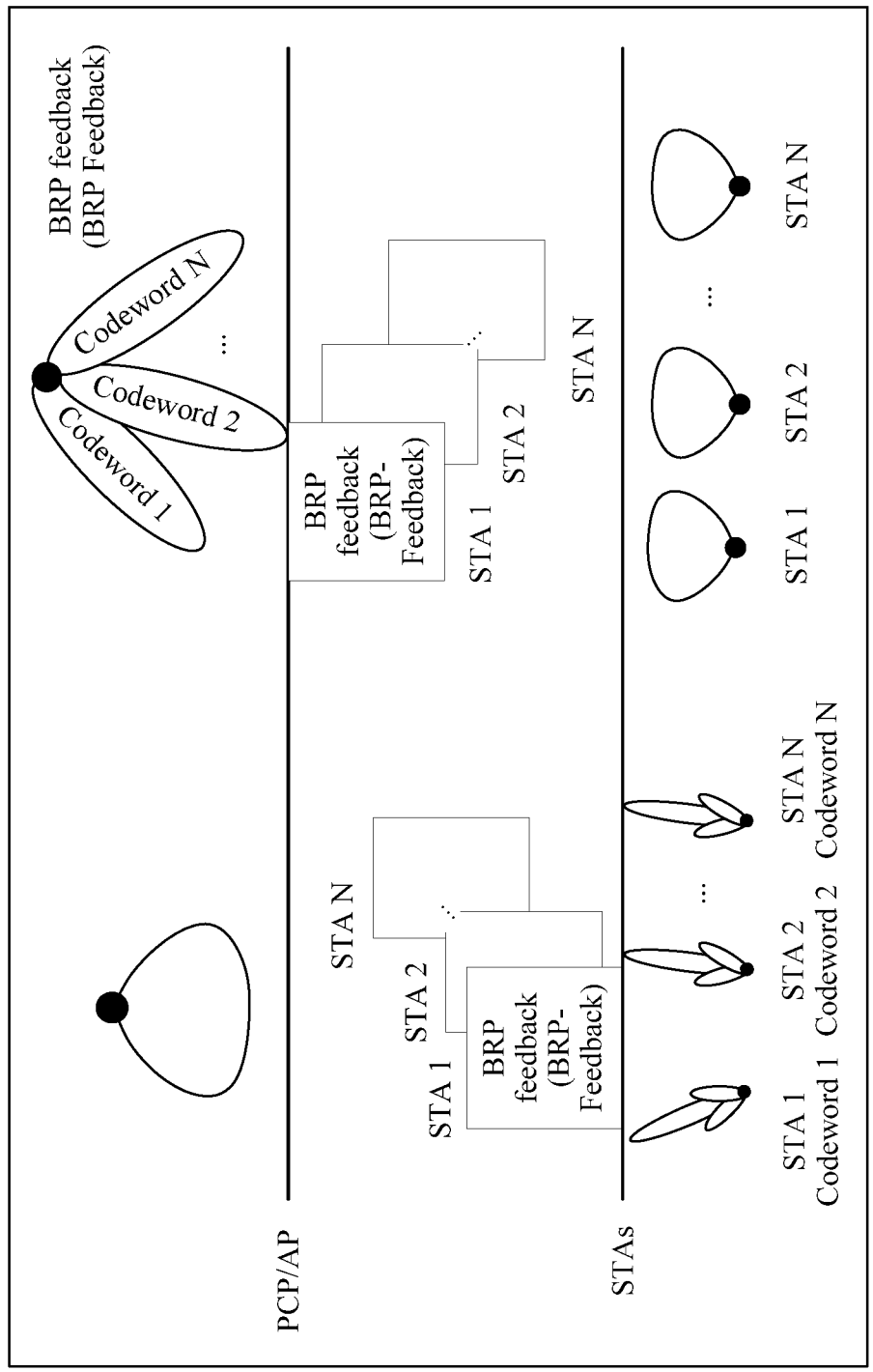
FIG. 20 is a time sequence block diagram of a BRP feedback phase in MID in beamforming training according to an embodiment of this application.

In one embodiment, as shown in FIG. 19 and FIG. 20, in the BRP-feedback process in MID, each of the STA 1, the STA 2, ..., the STA N may use, based on a codeword thereof, that is, code 1 to code N, the previously determined best transmit sector to simultaneously transmit a BRP-feedback frame to the initiator; and the initiator receives, in quasi omnidirectional mode, the BRP-feedback frame transmitted by each responder. The PCP/AP uses the orthogonal code and a plurality of transmit sectors of the PCP/AP, and may use the previously determined best transmit sector corresponding to each STA, to transmit a BRP-feedback frame to the plurality of STAs simultaneously; and each STA receives, in quasi omnidirectional mode, the BRP-feedback frame transmitted by the PCP/AP. By performing information interaction in the BRP-feedback process, the PCP/AP and the STA can know a list of receive sectors of each other that are sorted based on quality.

It should be noted that, in operation 320, if the initiating device does not receive, within a third preset time interval, an acknowledgement frame transmitted by the first responding device and used to indicate that the second BRP feedback frame has been received, the initiating device retransmits the second BRP feedback frame to the first responding device; or if the initiating device receives, within the third preset time interval, an acknowledgement frame transmitted by the first responding device and used to indicate that the second BRP feedback frame has been received, the initiating device transmits a third frozen frame to the first responding device, where the third frozen frame is used to instruct the first responding device to wait for the initiating device to receive an acknowledgement frame transmitted by a fourth responding device in the plurality of responding devices and used to indicate that the second BRP feedback frame has been received, or the third frozen frame is used to indicate time that the first responding device spends waiting for the initiating device to transmit the second BRP feedback frame to the fourth responding device until a maximum quantity of retransmission times is reached, where the initiating device does not receive, within the third preset time interval, the acknowledgement frame transmitted by the fourth responding device and used to indicate that the second BRP feedback frame has been received.

It should be understood that, a manner of transmitting the third frozen frame and a process of retransmitting the second BRP feedback frame are similar to the manner of transmitting the first frozen frame and the process of retransmitting the sector sweep feedback frame shown in FIG. 10. Details are not described again herein to avoid repetition.

It should be understood that, the third preset time may be the same as or different from the first preset time. This is not limited in this embodiment of this application.

In one embodiment, values of four reserved bits in a frame control field of the third frozen frame are one of the following:

0000, 0001, 1011, 1100, 1101, 1110, and 1111.

It should be understood that, for the third frozen frame in this embodiment of this application, refer to the descriptions about the first frozen frame. Details are not described again herein to avoid repetition.

Therefore, with respect to a possible packet loss in a MU-MIMO BFT process, in this embodiment of this application, a reserved field is used in the frame control field (Frame control field), and a new frozen frame type is designed to freeze a STA that has performed feedback. The PCP/AP transmits signaling only to a STA that has not performed feedback, without transmitting signaling to all STAs again. Therefore, resource overheads are reduced, and efficiency of beamforming training is improved.

In one embodiment, in the first case, the beamforming training process in this embodiment of this application may further include a BC phase. The following describes each phase in the BC phase separately.

Figure 21:
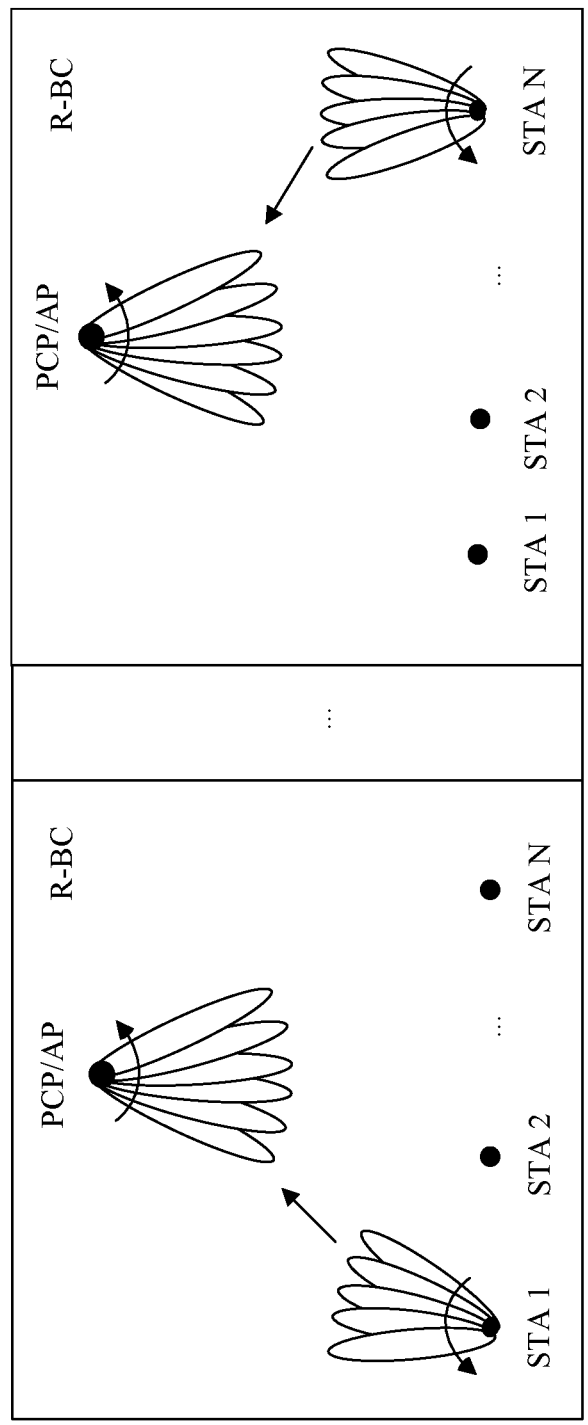
FIG. 21 is a schematic block diagram of an R-BC phase in beamforming training according to an embodiment of this application.
Figure 22:
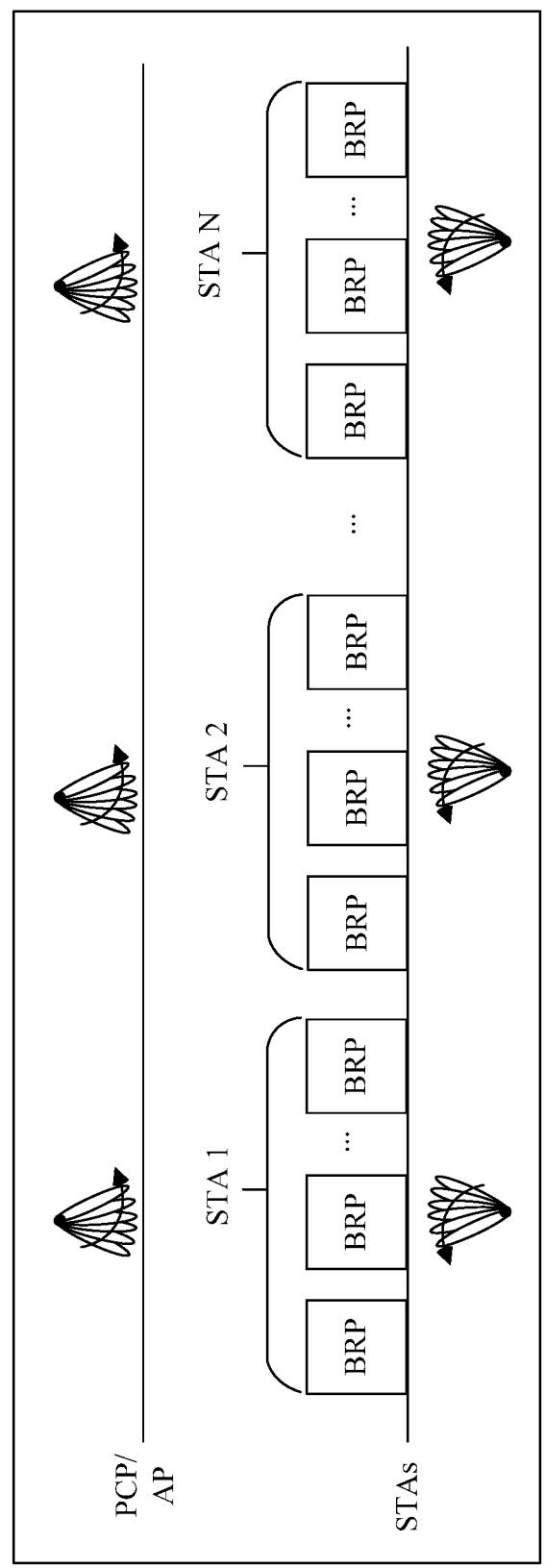
FIG. 22 is a time sequence block diagram of an R-BC phase in beamforming training according to an embodiment of this application.

R-BC phase: As shown in FIG. 21 and FIG. 22, the R-BC phase is the same as the R-BC process in 802.11ad. In one embodiment, in the R-BC process, each of the STA 1, the STA 2, ..., the STA N transmits a BRP frame in directional mode in a group of transmit sectors determined in the SLS phase; and the PCP/AP receives the BRP frame in directional mode in a group of receive sectors determined in the MID phase, and the PCP/AP may determine, based on receive quality, a group of best beam pairs from each STA to the PCP/AP.

Figure 23:
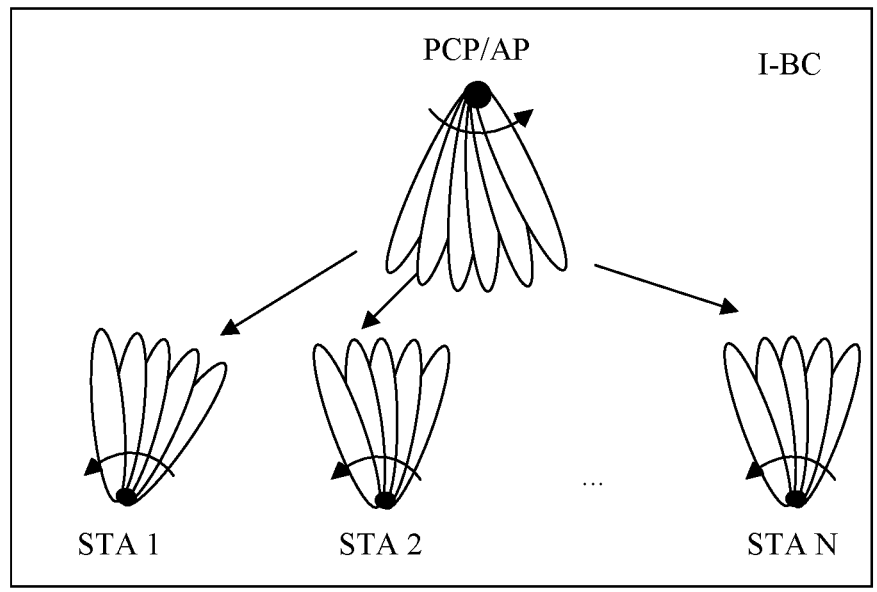
FIG. 23 is a schematic block diagram of an I-BC phase in beamforming training according to an embodiment of this application.
Figure 24:
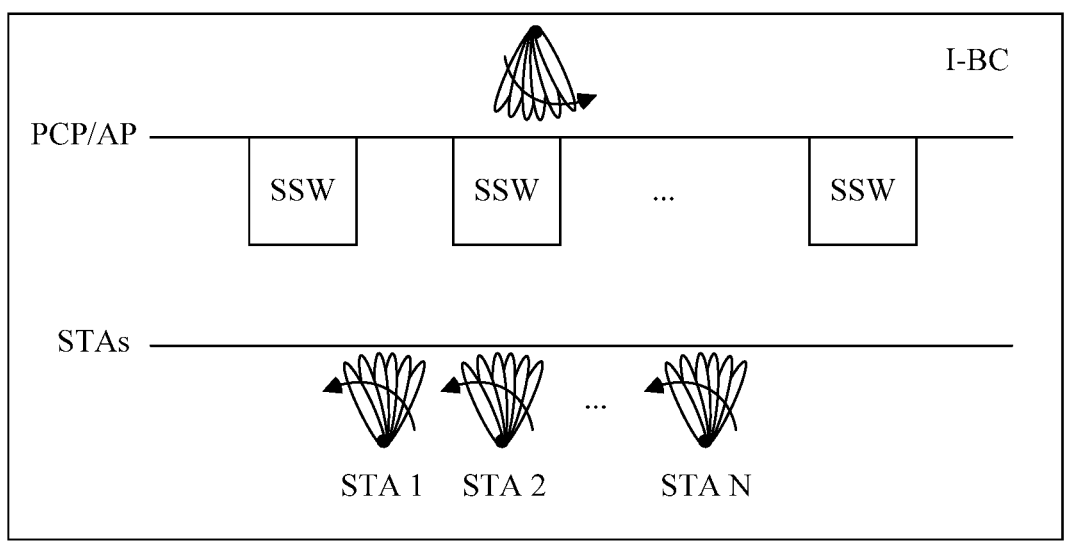
FIG. 24 is a time sequence block diagram of an I-BC phase in beamforming training according to an embodiment of this application.

I-BC phase: As shown in FIG. 23 and FIG. 24, the I-BC phase is the same as the I-BC process in 802.11ad. In one embodiment, in the I-BC process, the PCP/AP transmits a BRP frame in a group of transmit sectors determined in the SLS phase; and each of the STA 1, the STA 2, ..., the STA N receives the BRP frame in directional mode in a group of receive sectors determined in the MID phase, and may determine, based on receive quality, a group of best beam pairs from the PCP/AP to each STA.

BRP-feedback in BC: After the initiating device assigns a codeword to each responding device in the SSW feedback phase, the initiating device may perform, in the BRP feedback phase in BC, beamforming training simultaneously with the plurality of responding devices based on the plurality of codewords assigned to the plurality of responding devices.

Correspondingly, in another embodiment, operation 320 may further include a BRP-feedback process in BC, that is, the initiating device receives fourth BRP feedback frames simultaneously transmitted by the plurality of responding devices, where the first responding device transmits, by using the best transmit sector of the first responding device, the fourth BRP feedback frame encoded by using the first codeword, and the fourth BRP feedback frame transmitted by the first responding device is used to indicate a correspondence between a transmit sector of the initiating device and a receive sector of the first responding device; and the initiating device transmits fifth BRP feedback frames to the plurality of responding devices simultaneously, where the initiating device transmits, to the first responding device by using the best transmit sector that is of the initiating device and corresponds to the first responding device, the fifth BRP feedback frame encoded by using the first codeword, and the fifth BRP feedback frame transmitted to the first responding device is used to indicate a correspondence between a receive sector of the initiating device and a transmit sector of the first responding device.

Therefore, in this embodiment of this application, the PCP/AP assigns an orthogonal codeword to each STA in the SSW-feedback phase of the SLS phase. In the BRP-feedback phase of BC, the PCP/AP may transmit BRP feedback frames to the plurality of STAs simultaneously in a plurality of directions by using a multi-antenna array, to reduce transmission time and collision. Each STA may also return a BRP feedback frame to the PCP/AP simultaneously by using an orthogonal codeword. This also greatly shortens transmission time and reduces collision. Therefore, in this embodiment of this application, time of performing beamforming training between the PCP/AP and the plurality of STAs can be shortened, and signal collision that occurs when the plurality of responding devices perform training with the initiating device can be avoided.

Figure 25:
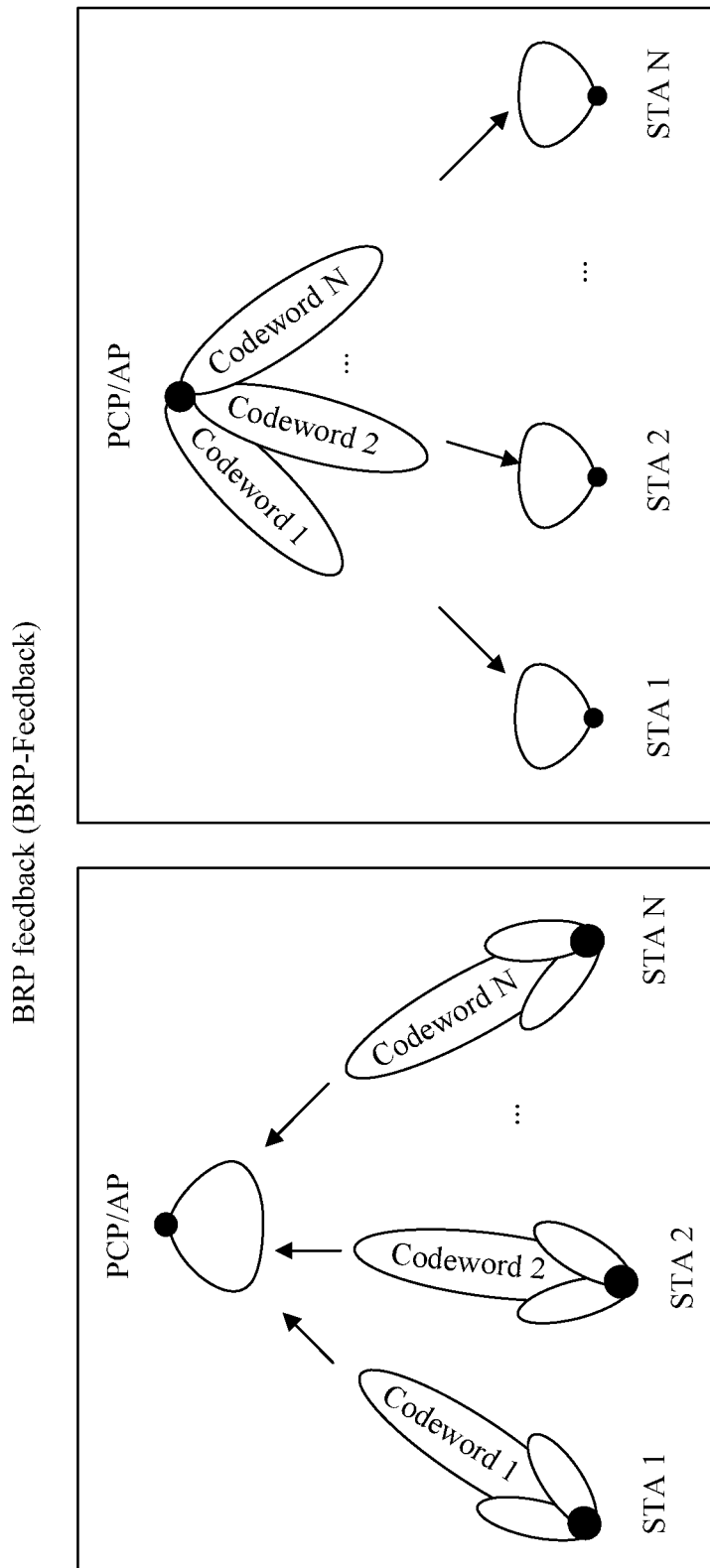
FIG. 25 is a schematic block diagram of a BRP feedback phase in BC in beamforming training according to an embodiment of this application.
Figure 26:
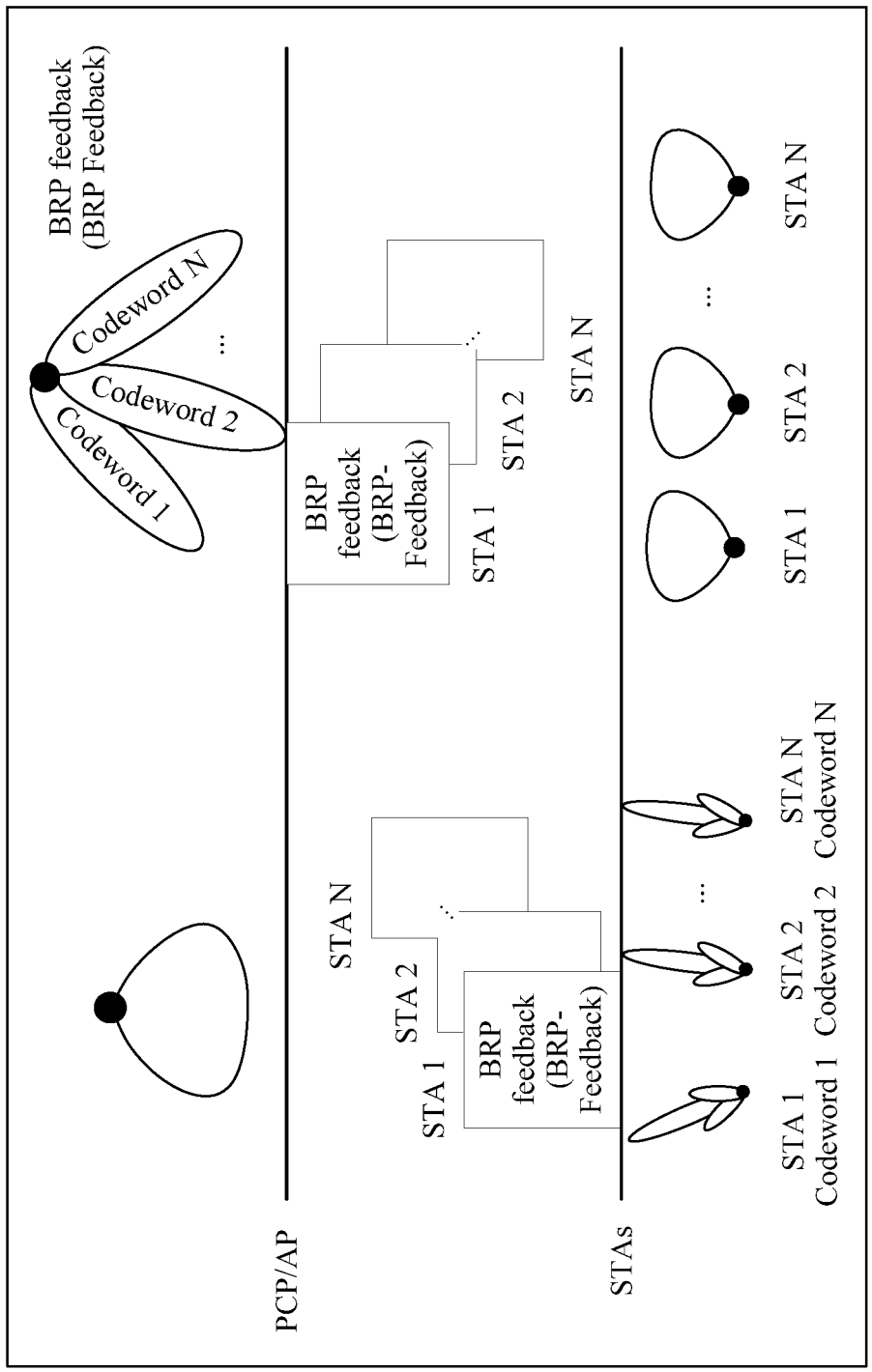
FIG. 26 is a time sequence block diagram of a BRP feedback phase in BC in beamforming training according to an embodiment of this application.

In one embodiment, as shown in FIG. 25 and FIG. 26, in the BRP-feedback process in BC, each of the STA 1, the STA 2, . . . , the STA N may use, based on a codeword thereof, that is, code 1 to code N, the previously determined best transmit sector to simultaneously transmit a BRP-feedback frame to the initiator, where the BRP-feedback frame indicates a list of downlink beam pairs sorted based on quality; and the initiator receives, in quasi omnidirectional mode, the BRP-feedback frame transmitted by each responder. The initiator uses the orthogonal code and a plurality of transmit sectors of the PCP/AP, and may use the previously determined best transmit sector corresponding to each responder, to transmit BRP-feedback to the plurality of STAs simultaneously, where the BRP-feedback frame indicates a list of uplink beam pairs sorted based on quality; and each responder receives, in quasi omnidirectional mode, the BRP-feedback frame transmitted by the initiator. By performing information interaction in the BRP-feedback process, the PCP/AP and the STA can both know uplink and downlink beam pairs sorted based on quality.

It should be noted that, in operation 320, if the initiating device does not receive, within a fourth preset time interval, an acknowledgement frame transmitted by the first responding device and used to indicate that the fifth BRP feedback frame has been received, the initiating device retransmits the fifth BRP feedback frame to the first responding device; or if the initiating device receives, within the fourth preset time interval, an acknowledgement frame transmitted by the first responding device and used to indicate that the fifth BRP feedback frame has been received, the initiating device transmits a fourth frozen frame to the first responding device, where the fourth frozen frame is used to instruct the first responding device to wait for the initiating device to receive an acknowledgement frame transmitted by a fifth responding device in the plurality of responding devices and used to indicate that the fifth BRP feedback frame has been received, or the fourth frozen frame is used to indicate time that the first responding device spends waiting for the initiating device to transmit the fifth BRP feedback frame to the fifth responding device until a maximum quantity of retransmission times is reached, where the initiating device does not receive, within the fourth preset time interval, the acknowledgement frame transmitted by the fifth responding device and used to indicate that the fifth BRP feedback frame has been received.

It should be understood that, a manner of transmitting the fourth frozen frame and a process of retransmitting the fifth BRP feedback frame are similar to the manner of transmitting the first frozen frame and the process of retransmitting the sector sweep feedback frame shown in FIG. 10. Details are not described again herein to avoid repetition.

It should be understood that, the fourth preset time may be the same as or different from the first preset time. This is not limited in this embodiment of this application.

In one embodiment, values of four reserved bits in a frame control field of the fourth frozen frame are one of the following:

0000, 0001, 1011, 1100, 1101, 1110, and 1111.

It should be understood that, for the fourth frozen frame in this embodiment of this application, refer to the descriptions about the first frozen frame. Details are not described again herein to avoid repetition.

Therefore, with respect to a possible packet loss in a MU-MIMO BFT process, in this embodiment of this application, a reserved field is used in the frame control field (Frame control field), and a new frozen frame type is designed to freeze a STA that has performed feedback. The PCP/AP transmits signaling only to a STA that has not performed feedback, without transmitting signaling to all STAs again. Therefore, resource overheads are reduced, and efficiency of beamforming training is improved.

The foregoing describes the first case of transmitting the codeword indication information in this embodiment of this application. That is, in the SSW-feedback phase of the SLS phase, the initiating device assigns an orthogonal codeword to each responding device.

The following describes a second case: In BRP feedback after MID, the initiating device assigns an orthogonal codeword to each responding device.

In one embodiment, in operation 310, the initiating device transmits a third BRP feedback frame to each responding device by using a best transmit sector that is of the initiating device and corresponds to each responding device, where the third BRP feedback frame carries the codeword indication information, and a third BRP feedback frame transmitted to the first responding device is used to indicate a best receive sector that is of the initiating device and corresponds to the first responding device.

In one embodiment, the codeword indication information is carried in a reserved bit of a sector sweep feedback field of the third BRP feedback.

It should be noted that, a specific solution to carrying the codeword indication information in the second case is similar to the solution in the first case, and is not described again herein to avoid repetition.

An SLS phase and a BRP setup phase in the second case may correspond to corresponding phases of beamforming training in existing 802.11ad, and are not described again herein to avoid repetition.

In addition, a BC process in the second case is similar to the BC process in the first case. For the BC process in the second case, refer to the corresponding description of the BC process in the first case. Details are not described again herein to avoid repetition.

In this embodiment of this application, a PCP/AP assigns an orthogonal codeword to each STA in the BRP feedback phase in MID. Therefore, in this embodiment of this application, the initiating device can perform beamforming training simultaneously with the plurality of responding devices in subsequent beamforming training. In one embodiment, in subsequent processes of BRP-feedback in MID and BRP-feedback in BC, a plurality of STAs may perform information transmission simultaneously with the PCP/AP. This shortens time of performing beamforming training between the PCP/AP and the plurality of STAs, and can avoid collision caused by frame transmission when the plurality of STAs perform training simultaneously with the PCP/AP.

The following describes a third case: In I-BC, the initiating device assigns an orthogonal codeword to each responding device.

In one embodiment, in operation 310, the initiating device transmits a third BRP frame to each responding device in the plurality of responding devices by using at least one transmit sector, where the third BRP frame carries the codeword indication information, and the third BRP frame transmitted to the first responding device is used by the first responding device to determine at least one best receive sector of the first responding device, and a correspondence between the at least one best receive sector and the at least one transmit sector of the initiating device.

In one embodiment, the codeword indication information is carried in a reserved bit of a sector sweep feedback field of the third BRP frame.

It should be noted that, a specific solution to carrying the codeword indication information in the third case is similar to the solution in the first case, and is not described again herein to avoid repetition.

In the third case, an SLS phase, a BRP setup phase, and a MID phase may correspond to corresponding phases of beamforming training in existing 802.11ad; in addition, a feedback process in IBC is similar to the feedback process in IBC. Details are not described again herein to avoid repetition.

In this embodiment of this application, a PCP/AP assigns an orthogonal codeword to each STA in the I-BC phase in BC. Therefore, in this embodiment of this application, the initiating device can perform beamforming training simultaneously with the plurality of responding devices in subsequent beamforming training. In one embodiment, in a subsequent BRP-feedback process in BC, a plurality of STAs may perform information transmission simultaneously with the PCP/AP. This shortens time of performing beamforming training between the PCP/AP and the plurality of STAs, and can avoid collision caused by frame transmission when the plurality of STAs perform training simultaneously with the PCP/AP.

The following describes a fourth case: In feedback after I-BC, the initiating device assigns an orthogonal codeword to each responding device.

In one embodiment, in operation 310, that the initiating device transmits codeword indication information to each responding device in a plurality of responding devices includes:

the initiating device transmits a sixth BRP feedback frame to each responding device by using a best transmit sector that is of the initiating device and corresponds to each responding device in the plurality of responding devices, where the sixth BRP feedback frame carries the codeword indication information, and the sixth BRP feedback frame transmitted to the first responding device is used to indicate a correspondence between a receive sector of the initiating device and a transmit sector of the first responding device.

In one embodiment, the codeword indication information is carried in a reserved bit of a sector sweep feedback field of the seventh BRP feedback.

It should be noted that, a specific solution to carrying the codeword indication information in the fourth case is similar to the solution in the first case, and is not described again herein to avoid repetition.

In the fourth case, an SLS phase, a BRP setup phase, a MID phase, and a BC phase may correspond to corresponding phases of beamforming training in existing 802.11ad. Details are not described again herein to avoid repetition.

In one embodiment, in another embodiment, operation 320 may include: the initiating device performs next beamforming training with each responding device by using a codeword of each responding device.

In one embodiment, a next beamforming training process in the fourth case is similar to the beamforming training process in the first case, and a difference lies in that, in an SSW feedback phase in the fourth case, the initiating device may transmit an SSW feedback frame simultaneously to the plurality of responding devices by using the best transmit sector corresponding to each responding device.

In this embodiment of this application, a PCP/AP assigns an orthogonal codeword to each STA in the feedback phase after I-BC. Therefore, in this embodiment of this application, the initiating device can perform beamforming training simultaneously with the plurality of responding devices in next beamforming training. This shortens time of performing beamforming training between the PCP/AP and the plurality of STAs, and can avoid collision caused by frame transmission when the plurality of STAs perform training simultaneously with the PCP/AP.

It should also be understood that, "first", "second", "third", and so on in this embodiment of this application are merely used to distinguish different responding devices or BRP frames transmitted between the initiating device and a responding device, but shall not be construed as a limitation to the protection scope of this application.

In this embodiment of this application, In one embodiment, the second responding device, the third responding device, and the fourth responding device may be a same responding device, or may be different responding devices. This is not limited in this embodiment of this application.

The foregoing describes the beamforming training method in the embodiments of this application in detail with reference to FIG. 1 to FIG. 26. It should be noted that, examples in FIG. 1 to FIG. 26 merely help a person skilled in the art understand the embodiments of this application, instead of limiting the embodiments of this application to the specific numeric values or specific scenarios shown in the examples. Obviously, a person skilled in the art may make various equivalent modifications or variations to the examples in FIG. 1 to FIG. 26. Such modifications or variations shall also fall within the scope of the embodiments of this application.

Figure 27:
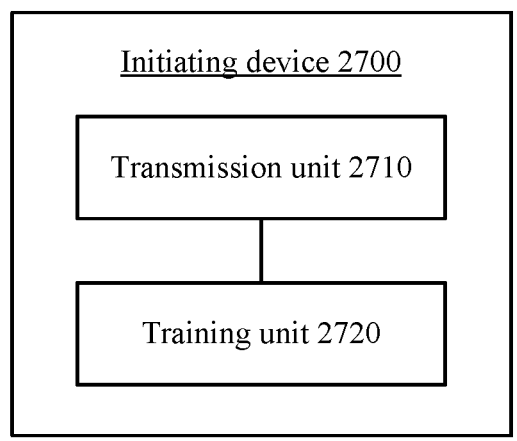
FIG. 27 is a schematic block diagram of an initiating device according to an embodiment of this application.
Figure 28:
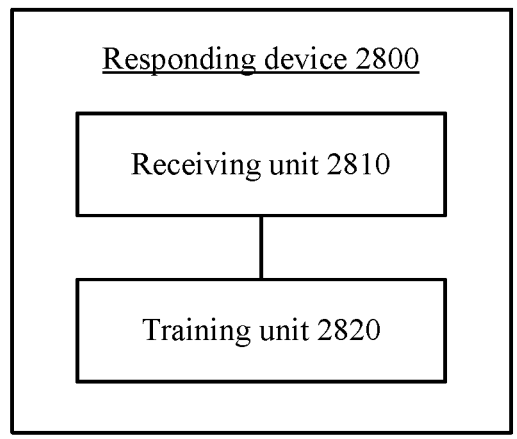
FIG. 28 is a schematic block diagram of a responding device according to an embodiment of this application.
Figure 29:
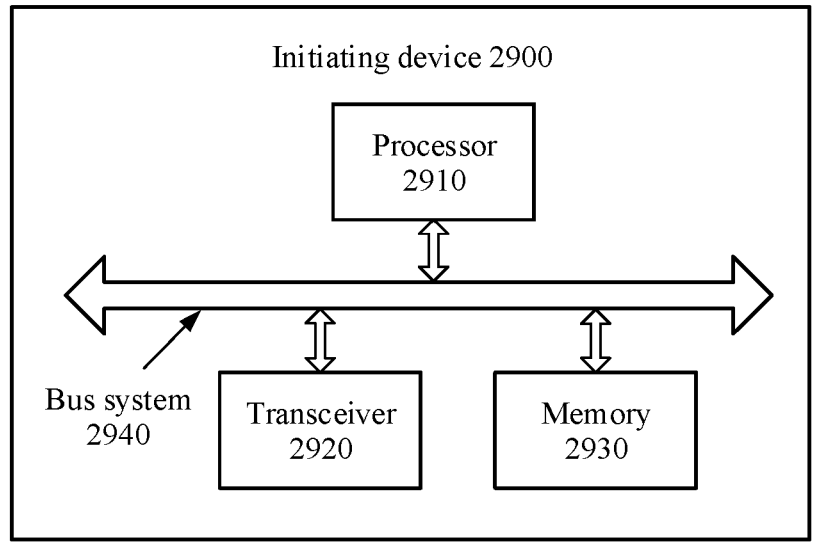
FIG. 29 is a schematic block diagram of an initiating device according to another embodiment of this application.
Figure 30:
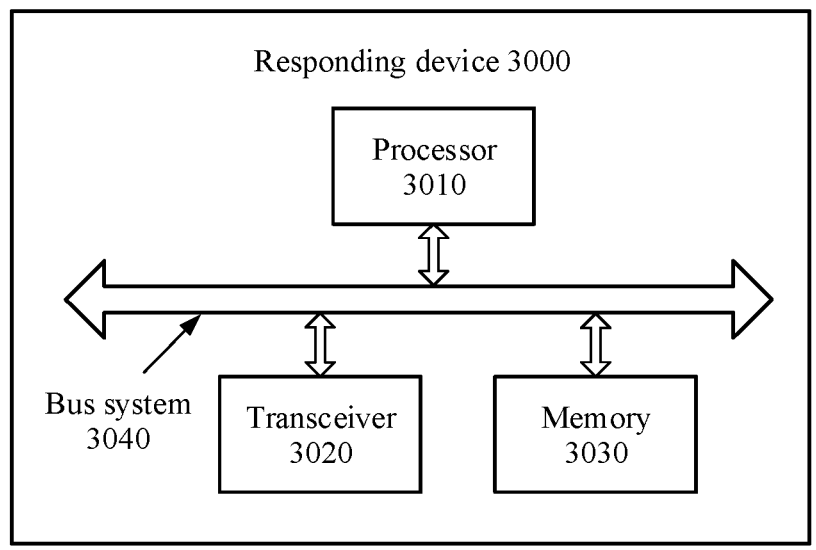
FIG. 30 is a schematic block diagram of a responding device according to another embodiment of this application.

The following describes an initiating device in an embodiment of this application with reference to FIG. 27 to FIG. 29, and describes a responding device in an embodiment of this application with reference to FIG. 28 to FIG. 30.

FIG. 27 is a schematic block diagram of an initiating device 2700 according to an embodiment of this application. As shown in FIG. 27, the initiating device 2700 includes:

a transmission unit 2710, configured to transmit codeword indication information to each responding device in a plurality of responding devices, where codeword indication information received by a first responding device in the plurality of responding devices is used to indicate a first codeword assigned by the initiating device to the first responding device, the first responding device is any responding device in the plurality of responding devices, the first codeword is used to encode a beamforming training signal transmitted between the initiating device and the first responding device, and codewords assigned to different responding devices in the plurality of responding devices are orthogonal to each other; and a training unit 2720, configured to perform beamforming training simultaneously with the plurality of responding devices based on a plurality of codewords assigned to the plurality of responding devices.

Therefore, in this embodiment of this application, the initiating device assigns an orthogonal codeword to each responding device, and when the initiating device performs beamforming training with different responding devices, different codewords may be used to encode beamforming signals. In this way, beamforming training is skillfully implemented between the initiating device and different responding devices. Because codewords of signals corresponding to different responding devices are different, the initiating device can perform beamforming training signal transmission simultaneously with the plurality of responding devices to further shorten time of beamforming training and improve efficiency of beamforming training in a multi-user scenario. In addition, in this embodiment of this application, signal collision that occurs when the plurality of responding devices perform training with the initiating device can be avoided.

In one embodiment, in another embodiment, the transmission unit 2710 is In one embodiment configured to transmit a sector sweep feedback frame to each responding device in the plurality of responding devices, where the sector sweep feedback frame carries the codeword indication information, and a sector sweep feedback frame transmitted to the first responding device is used to indicate a best transmit sector of the first responding device; and the training unit 2720 is in one embodiment configured to receive sector sweep acknowledgement frames simultaneously transmitted by the plurality of responding devices, where the training unit 2720 receives a sector sweep acknowledgement frame encoded by using the first codeword and transmitted by the first responding device by using the best transmit sector, and the sector sweep acknowledgement frame transmitted by the first responding device is used to indicate a best transmit sector that is of the initiating device and corresponds to the first responding device.

In one embodiment, in another embodiment, the codeword indication information is carried in a reserved bit of a sector sweep feedback field of the sector sweep feedback frame.

In one embodiment, in another embodiment, the training unit 2720 is further configured to retransmit the sector sweep feedback frame to the first responding device if the sector sweep acknowledgement frame transmitted by the first responding device is not received within a first preset time interval; or transmit a first frozen frame to the first responding device if the sector sweep acknowledgement frame transmitted by the first responding device is received within the first preset time interval, where the first frozen frame is used to instruct the first responding device to wait for the training unit 2720 to receive a sector sweep acknowledgement frame transmitted by a second responding device in the plurality of responding devices, or the first frozen frame is used to indicate time that the first responding device spends waiting for the training unit 2720 to transmit the sector sweep feedback frame to the second responding device until a maximum quantity of retransmission times is reached, where the training unit 2720 does not receive, within the first preset time interval, the sector sweep acknowledgement frame transmitted by the second responding device.

In one embodiment, in another embodiment, values of four reserved bits in a frame control field of the first frozen frame are one of the following:

0000, 0001, 1011, 1100, 1101, 1110, and 1111.

In one embodiment, in another embodiment, the training unit 2720 is further configured to transmit first BRP frames to the plurality of responding devices simultaneously, where the training unit 2720 transmits, to the first responding device by using the best transmit sector that is of the initiating device and corresponds to the first responding device, a first BRP frame encoded by using the first codeword, and the first BRP frame transmitted to the first responding device is used by the first responding device to obtain beamforming training capability information of the initiating device; and receive second BRP frames simultaneously transmitted by the plurality of responding devices, where the training unit 2720 receives the second BRP frame encoded by using the first codeword and transmitted by the first responding device by using the best transmit sector of the first responding device, and the second BRP frame transmitted by the first responding device is used by the initiating device to obtain beamforming training capability information of the first responding device.

In one embodiment, in another embodiment, the training unit 2720 is further configured to retransmit the first BRP frame to the first responding device if the second BRP frame transmitted by the first responding device is not received within a second preset time interval; or transmit a second frozen frame to the first responding device if the second BRP frame transmitted by the first responding device is received within the second preset time interval, where the second frozen frame is used to instruct the first responding device to wait for the training unit 2720 to receive a second BRP frame transmitted by a third responding device in the plurality of responding devices, or the second frozen frame is used to indicate time that the first responding device spends waiting for the training unit 2720 to transmit a first BRP frame to the third responding device until a maximum quantity of retransmission times is reached, where the training unit 2720 does not receive, within the second preset time interval, the second BRP frame transmitted by the third responding device.

In one embodiment, in another embodiment, values of four reserved bits in a frame control field of the second frozen frame are one of the following:

0000, 0001, 1011, 1100, 1101, 1110, and 1111.

In one embodiment, in another embodiment, the training unit 2720 is further configured to receive first BRP feedback frames simultaneously transmitted by the plurality of responding devices, where the first responding device transmits, by using the best transmit sector of the first responding device, the first BRP feedback frame encoded by using the first codeword, and the first BRP feedback frame transmitted by the first responding device is used to indicate a best receive sector of the first responding device; and transmit second BRP feedback frames to the plurality of responding devices simultaneously, where the training unit 2720 transmits, to the first responding device by using the best transmit sector that is of the initiating device and corresponds to the first responding device, the second BRP feedback frame encoded by using the first codeword, and the second BRP feedback frame transmitted to the first responding device is used to indicate a best receive sector that is of the initiating device and corresponds to the first responding device.

In one embodiment, in another embodiment, the training unit 2720 is further configured to retransmit the second BRP feedback frame to the first responding device if an acknowledgement frame transmitted by the first responding device and used to indicate that the second BRP feedback frame has been received is not received within a third preset time interval; or transmit a third frozen frame to the first responding device if an acknowledgement frame transmitted by the first responding device and used to indicate that the second BRP feedback frame has been received is received within the third preset time interval, where the third frozen frame is used to instruct the first responding device to wait for the training unit 2720 to receive an acknowledgement frame transmitted by a fourth responding device in the plurality of responding devices and used to indicate that the second BRP feedback frame has been received, or the third frozen frame is used to indicate time that the first responding device spends waiting for the training unit 2720 to transmit the second BRP feedback frame to the fourth responding device until a maximum quantity of retransmission times is reached, where the training unit 2720 does not receive, within the third preset time interval, the acknowledgement frame transmitted by the fourth responding device and used to indicate that the second BRP feedback frame has been received.

In one embodiment, in another embodiment, values of four reserved bits in a frame control field of the third frozen frame are one of the following:

0000, 0001, 1011, 1100, 1101, 1110, and 1111.

Alternatively, in another embodiment, the transmission unit 2710 is in one embodiment configured to transmit a third BRP feedback frame to each responding device by using a best transmit sector that is of the initiating device and corresponds to each responding device, where the third BRP feedback frame carries the codeword indication information, and a third BRP feedback frame transmitted to the first responding device is used to indicate a best receive sector that is of the initiating device and corresponds to the first responding device.

In one embodiment, in another embodiment, the codeword indication information is carried in a reserved bit of a sector sweep feedback field of the third BRP feedback.

Alternatively, in another embodiment, the transmission unit 2710 is in one embodiment configured to transmit a third BRP frame to each responding device in the plurality of responding devices by using at least one transmit sector, where the third BRP frame carries the codeword indication information, and the third BRP frame transmitted to the first responding device is used by the first responding device to determine at least one best receive sector of the first responding device, and a correspondence between the at least one best receive sector and the at least one transmit sector of the initiating device.

In one embodiment, in another embodiment, the codeword indication information is carried in a reserved bit of a sector sweep feedback field of the third BRP frame.

In one embodiment, in another embodiment, the training unit 2720 is In one embodiment configured to receive fourth BRP feedback frames simultaneously transmitted by the plurality of responding devices, where the first responding device transmits, by using the best transmit sector of the first responding device, the fourth BRP feedback frame encoded by using the first codeword, and the fourth BRP feedback frame transmitted by the first responding device is used to indicate a correspondence between a transmit sector of the initiating device and a receive sector of the first responding device; and transmit fifth BRP feedback frames to the plurality of responding devices simultaneously, where the initiating device transmits, to the first responding device by using the best transmit sector that is of the initiating device and corresponds to the first responding device, the fifth BRP feedback frame encoded by using the first codeword, and the fifth BRP feedback frame transmitted to the first responding device is used to indicate a correspondence between a receive sector of the initiating device and a transmit sector of the first responding device.

In one embodiment, in another embodiment, the training unit 2720 is further configured to retransmit the fifth BRP feedback frame to the first responding device if an acknowledgement frame transmitted by the first responding device and used to indicate that the fifth BRP feedback frame has been received is not received within a fourth preset time interval; or transmit a fourth frozen frame to the first responding device if an acknowledgement frame transmitted by the first responding device and used to indicate that the fifth BRP feedback frame has been received is received within the fourth preset time interval, where the fourth frozen frame is used to instruct the first responding device to wait for the training unit 2720 to receive an acknowledgement frame transmitted by a fifth responding device in the plurality of responding devices and used to indicate that the fifth BRP feedback frame has been received, or the fourth frozen frame is used to indicate time that the first responding device spends waiting for the training unit 2720 to transmit the fifth BRP feedback frame to the fifth responding device until a maximum quantity of retransmission times is reached, where the training unit 2720 does not receive, within the fourth preset time interval, the acknowledgement frame transmitted by the fifth responding device and used to indicate that the fifth BRP feedback frame has been received.

In one embodiment, in another embodiment, values of four reserved bits in a frame control field of the fourth frozen frame are one of the following:

0000, 0001, 1011, 1100, 1101, 1110, and 1111.

In one embodiment, in another embodiment, the transmission unit 2710 is in one embodiment configured to transmit a sixth BRP feedback frame to each responding device by using a best transmit sector that is of the initiating device and corresponds to each responding device in the plurality of responding devices, where the sixth BRP feedback frame carries the codeword indication information, and the sixth BRP feedback frame transmitted to the first responding device is used to indicate a correspondence between a receive sector of the initiating device and a transmit sector of the first responding device.

In one embodiment, in another embodiment, the codeword indication information is carried in a reserved bit of a sector sweep feedback field of the seventh BRP feedback.

It should be understood that, the initiating device 2700 shown in FIG. 27 can implement each process of the initiating device in the method embodiment in FIG. 3. Operations and/or functions of all modules in the initiating device 2700 are respectively intended to implement corresponding procedures in the method embodiment in FIG. 3. For details, refer to the descriptions in the foregoing method embodiment. To avoid repetition, detailed descriptions are omitted properly herein.

Therefore, in this embodiment of this application, the initiating device assigns an orthogonal codeword to each responding device, and when the initiating device performs beamforming training with different responding devices, different codewords may be used to encode beamforming signals. In one embodiment, in processes of SSW feedback, SSW ACK, BRP setup, BRP feedback in MID, and BRP feedback in BC, a plurality of STAs may perform information transmission simultaneously with a PCP/AP. In this way, beamforming training is skillfully implemented between the initiating device and different responding devices. Because codewords of signals corresponding to different responding devices are different, the initiating device can perform beamforming training signal transmission simultaneously with the plurality of responding devices to further shorten time of beamforming training and improve efficiency of beamforming training in a multi-user scenario. In addition, in this embodiment of this application, signal collision that occurs when the plurality of responding devices perform training with the initiating device can be avoided.

In addition, in this embodiment of this application, an offline-designed orthogonal codeword can be assigned to each responder by using a reserved bit of a BRP frame, without changing an existing MAC frame structure, and compatibility with the prior art is maintained.

Further, with respect to a possible packet loss in a MU-MIMO BFT process, in this embodiment of this application, a reserved field is used in the frame control field (Frame control field), and a new frozen frame type is designed to freeze a STA that has performed feedback. The PCP/AP transmits signaling only to a STA that has not performed feedback, without transmitting signaling to all STAs again. Therefore, resource overheads are reduced, and efficiency of beamforming training is improved.

FIG. 28 is a schematic block diagram of a responding device 2800 according to an embodiment of this application. The responding device 2800 may be a first responding device in a plurality of responding devices. As shown in FIG. 28, the responding device 2800 includes:

a receiving unit 2810, configured to receive codeword indication information transmitted by the initiating device, where the codeword indication information is used to indicate a first codeword assigned by the initiating device to the first responding device, the first responding device is any responding device in the plurality of responding devices, the first codeword is used to encode a beamforming training signal transmitted between the initiating device and the first responding device, and codewords assigned to different responding devices in the plurality of responding devices are orthogonal to each other; and a training unit 2820, configured to perform beamforming training with the initiating device based on the codeword assigned to the first responding device, where when the first responding device performs beamforming training with the initiating device, responding devices except the first responding device in the plurality of responding devices also perform beamforming training with the initiating device simultaneously based on the assigned codewords.

Therefore, in this embodiment of this application, the initiating device assigns an orthogonal codeword to each responding device, and when the initiating device performs beamforming training with different responding devices, different codewords may be used to encode beamforming signals. In this way, beamforming training is skillfully implemented between the initiating device and different responding devices. Because codewords of signals corresponding to different responding devices are different, the initiating device can perform beamforming training signal transmission simultaneously with the plurality of responding devices to further shorten time of beamforming training and improve efficiency of beamforming training in a multi-user scenario. In addition, in this embodiment of this application, signal collision that occurs when the plurality of responding devices perform training with the initiating device can be avoided.

In one embodiment, in another embodiment, the receiving unit 2810 is in one embodiment configured to receive a sector sweep feedback frame transmitted by the initiating device, where the sector sweep feedback frame carries the codeword indication information, and the sector sweep feedback frame received by the receiving unit 2810 is used to indicate a best transmit sector of the first responding device; and the training unit 2820 is in one embodiment configured to transmit, to the initiating device by using the best transmit sector, a sector sweep acknowledgement frame encoded by using the first codeword, where the sector sweep acknowledgement frame transmitted by the training unit 2820 is used to indicate a best transmit sector that is of the initiating device and corresponds to the first responding device.

In one embodiment, in another embodiment, the codeword indication information is carried in a reserved bit of a sector sweep feedback field of the sector sweep feedback frame.

In one embodiment, in another embodiment, the training unit 2820 is further configured to: if the initiating device does not receive, within a first preset time interval, the sector sweep acknowledgement frame transmitted by the training unit 2820, receive the sector sweep feedback frame retransmitted by the initiating device; or if the initiating device receives, within the first preset time interval, the sector sweep acknowledgement frame transmitted by the training unit 2820, receive a first frozen frame transmitted by the initiating device, where the first frozen frame is used to instruct the training unit 2820 to wait for the initiating device to receive a sector sweep acknowledgement frame transmitted by a second responding device in the plurality of responding devices, or the first frozen frame is used to indicate time that the training unit 2820 spends waiting for the initiating device to transmit the sector sweep feedback frame to the second responding device until a maximum quantity of retransmission times is reached, where the initiating device does not receive, within the first preset time interval, the sector sweep acknowledgement frame transmitted by the second responding device.

In one embodiment, in another embodiment, values of four reserved bits in a frame control field of the first frozen frame are one of the following:

0000, 0001, 1011, 1100, 1101, 1110, and 1111.

In one embodiment, in another embodiment, the training unit 2820 is further configured to receive a first BRP frame encoded by using the first codeword and transmitted by the initiating device by using the best transmit sector that is of the initiating device and corresponds to the first responding device, where the first BRP frame received by the training unit 2820 is used by the first responding device to obtain beamforming training capability information of the initiating device; and the first responding device transmits, to the initiating device by using the best transmit sector of the first responding device, the second BRP frame encoded by using the first codeword, where the second BRP frame transmitted by the first responding device is used by the initiating device to obtain beamforming training capability information of the first responding device.

In one embodiment, in another embodiment, the training unit 2820 is further configured to: if the initiating device does not receive, within a second preset time interval, the second BRP frame transmitted by the training unit 2820, receive, by the first responding device, the first BRP frame retransmitted by the initiating device; or if the initiating device receives, within the second preset time interval, the second BRP frame transmitted by the training unit 2820, receive a second frozen frame transmitted by the initiating device, where the second frozen frame is used to instruct the training unit 2820 to wait for the initiating device to receive a second BRP frame transmitted by a third responding device in the plurality of responding devices, or the second frozen frame is used to indicate time that the training unit 2820 spends waiting for the initiating device to transmit a first BRP frame to the third responding device until a maximum quantity of retransmission times is reached, where the initiating device does not receive, within the second preset time interval, the second BRP frame transmitted by the third responding device.

In one embodiment, in another embodiment, values of four reserved bits in a frame control field of the second frozen frame are one of the following:

0000, 0001, 1011, 1100, 1101, 1110, and 1111.

In one embodiment, in another embodiment, the training unit 2820 is further configured to transmit, to the initiating device by using the best transmit sector of the first responding device, a first BRP feedback frame encoded by using the first codeword, where the first BRP feedback frame is used to indicate a best receive sector of the first responding device; and receive a second BRP feedback frame encoded by using the first codeword and transmitted by the initiating device by using the best transmit sector that is of the initiating device and corresponds to the first responding device, where the second BRP feedback frame received by the training unit 2820 is used to indicate a best receive sector that is of the initiating device and corresponds to the first responding device.

In one embodiment, in another embodiment, the training unit 2820 is further configured to: if the initiating device does not receive, within a third preset time interval, an acknowledgement frame transmitted by the training unit 2820 and used to indicate that the second BRP feedback frame has been received, receive the second BRP feedback frame retransmitted by the initiating device; or if the initiating device receives, within the third preset time interval, an acknowledgement frame transmitted by the training unit 2820 and used to indicate that the second BRP feedback frame has been received, receive a third frozen frame transmitted by the initiating device, where the third frozen frame is used to instruct the training unit 2820 to wait for the initiating device to receive an acknowledgement frame transmitted by a fourth responding device in the plurality of responding devices and used to indicate that the second BRP feedback frame has been received, or the third frozen frame is used to indicate time that the training unit 2820 spends waiting for the initiating device to transmit the second BRP feedback frame to the fourth responding device until a maximum quantity of retransmission times is reached, where the initiating device does not receive, within the third preset time interval, the acknowledgement frame transmitted by the fourth responding device and used to indicate that the second BRP feedback frame has been received.

In one embodiment, in another embodiment, values of four reserved bits in a frame control field of the third frozen frame are one of the following:

0000, 0001, 1011, 1100, 1101, 1110, and 1111.

Alternatively, in another embodiment, the receiving unit 2810 is in one embodiment configured to receive a third BRP feedback frame transmitted by the initiating device by using a best transmit sector that is of the initiating device and corresponds to the first responding device, where the third BRP feedback frame carries the codeword indication information, and the third BRP feedback frame received by the first responding device is used to indicate a best receive sector that is of the initiating device and corresponds to the first responding device.

In one embodiment, in another embodiment, the codeword indication information is carried in a reserved bit of a sector sweep feedback field of the third BRP feedback.

Alternatively, in another embodiment, the receiving unit 2810 is in one embodiment configured to receive a third BRP frame transmitted by the initiating device by using at least one transmit sector, where the third BRP frame carries the codeword indication information, and the third BRP frame received by the receiving unit 2810 is used by the first responding device to determine at least one best receive sector of the first responding device, and a correspondence between the at least one best receive sector and the at least one transmit sector of the initiating device.

In one embodiment, in another embodiment, the codeword indication information is carried in a reserved bit of a sector sweep feedback field of the third BRP frame.

In one embodiment, in another embodiment, the training unit 2820 is configured to transmit, to the initiating device by using the best transmit sector of the first responding device, a fourth BRP feedback frame encoded by using the first codeword, where the fourth BRP feedback frame transmitted by the training unit 2820 is used to indicate a correspondence between a transmit sector of the initiating device and a receive sector of the first responding device; and receive a fifth BRP feedback frame encoded by using the first codeword and transmitted by the initiating device by using the best transmit sector that is of the initiating device and corresponds to the first responding device, where the fifth BRP feedback frame received by the training unit 2820 is used to indicate a correspondence between a receive sector of the initiating device and a transmit sector of the first responding device.

In one embodiment, in another embodiment, the training unit 2820 is further configured to: if the initiating device does not receive, within a fourth preset time interval, an acknowledgement frame transmitted by the first responding device and used to indicate that the fifth BRP feedback frame has been received, receive the fifth BRP feedback frame retransmitted by the initiating device; or if the initiating device receives, within the fourth preset time interval, an acknowledgement frame transmitted by the first responding device and used to indicate that the fifth BRP feedback frame has been received, receive a fourth frozen frame transmitted by the initiating device, where the fourth frozen frame is used to instruct the training unit 2820 to wait for the initiating device to receive an acknowledgement frame transmitted by a fifth responding device in the plurality of responding devices and used to indicate that the fifth BRP feedback frame has been received, or the fourth frozen frame is used to indicate time that the training unit 2820 spends waiting for the initiating device to transmit the fifth BRP feedback frame to the fifth responding device until a maximum quantity of retransmission times is reached, where the initiating device does not receive, within the fourth preset time interval, the acknowledgement frame transmitted by the fifth responding device and used to indicate that the fifth BRP feedback frame has been received.

In one embodiment, in another embodiment, values of four reserved bits in a frame control field of the fourth frozen frame are one of the following:

0000, 0001, 1011, 1100, 1101, 1110, and 1111.

Alternatively, in another embodiment, the receiving unit 2810 is in one embodiment configured to receive a sixth BRP feedback frame transmitted by the initiating device to the first responding device by using a best transmit sector that is of the initiating device and corresponds to the first responding device, where the sixth BRP feedback frame carries the codeword indication information, and the sixth BRP feedback frame received by the first responding device is used to indicate a correspondence between a receive sector of the initiating device and a transmit sector of the first responding device.

In one embodiment, in another embodiment, the codeword indication information is carried in a reserved bit of a sector sweep feedback field of the seventh BRP feedback.

It should be understood that, the responding device 2800 shown in FIG. 28 can implement each process of the responding device in the method embodiment in FIG. 3. Operations and/or functions of all modules in the responding device 2800 are respectively intended to implement corresponding procedures in the method embodiment in FIG. 3. For details, refer to the descriptions in the foregoing method embodiment. To avoid repetition, detailed descriptions are omitted properly herein.

Therefore, in this embodiment of this application, the initiating device assigns an orthogonal codeword to each responding device, and when the initiating device performs beamforming training with different responding devices, different codewords may be used to encode beamforming signals. In one embodiment, in processes of SSW feedback, SSW ACK, BRP setup, BRP feedback in MID, and BRP feedback in BC, a plurality of STAs may perform information transmission simultaneously with a PCP/AP. In this way, beamforming training is skillfully implemented between the initiating device and different responding devices. Because codewords of signals corresponding to different responding devices are different, the initiating device can perform beamforming training signal transmission simultaneously with the plurality of responding devices to further shorten time of beamforming training and improve efficiency of beamforming training in a multi-user scenario. In addition, in this embodiment of this application, signal collision that occurs when the plurality of responding devices perform training with the initiating device can be avoided.

In addition, in this embodiment of this application, an offline-designed orthogonal codeword can be assigned to each responder by using a reserved bit of a BRP frame, without changing an existing MAC frame structure, and compatibility with the prior art is maintained.

Further, with respect to a possible packet loss in a MU-MIMO BFT process, in this embodiment of this application, a reserved field is used in the frame control field (Frame control field), and a new frozen frame type is designed to freeze a STA that has performed feedback. The PCP/AP transmits signaling only to a STA that has not performed feedback, without transmitting signaling to all STAs again. Therefore, resource overheads are reduced, and efficiency of beamforming training is improved.

FIG. 29 is a schematic block diagram of an initiating device 2900 according to an embodiment of this application. As shown in FIG. 29, the initiating device 2900 includes a processor 2910 and a transceiver 2920. The processor 2910 is connected to the transceiver 2920. In one embodiment, the initiating device 2900 further includes a memory 2930, and the memory 2930 is connected to the processor 2910. Further In one embodiment, the initiating device 2900 may further include a bus system 2940. The processor 2910, the memory 2930, and the transceiver 2920 may be connected by the bus system 2940. The memory 2930 may be configured to store an instruction. The processor 2910 is configured to execute the instruction stored in the memory 2930, so as to control the transceiver 2920 to receive and transmit information or signals.

In one embodiment, the processor 2910 controls the transceiver 2920 to: transmit codeword indication information to each responding device in a plurality of responding devices, where codeword indication information received by a first responding device in the plurality of responding devices is used to indicate a first codeword assigned by the initiating device to the first responding device, the first responding device is any responding device in the plurality of responding devices, the first codeword is used to encode a beamforming training signal transmitted between the initiating device and the first responding device, and codewords assigned to different responding devices in the plurality of responding devices are orthogonal to each other; and perform beamforming training simultaneously with the plurality of responding devices based on a plurality of codewords assigned to the plurality of responding devices.

Therefore, in this embodiment of this application, the initiating device assigns an orthogonal codeword to each responding device, and when the initiating device performs beamforming training with different responding devices, different codewords may be used to encode beamforming signals. In this way, beamforming training is skillfully implemented between the initiating device and different responding devices. Because codewords of signals corresponding to different responding devices are different, the initiating device can perform beamforming training signal transmission simultaneously with the plurality of responding devices to further shorten time of beamforming training and improve efficiency of beamforming training in a multi-user scenario. In addition, in this embodiment of this application, signal collision that occurs when the plurality of responding devices perform training with the initiating device can be avoided.

It should be understood that, in this embodiment of this application, the processor 2910 may be a central processing unit (Central Processing Unit, "CPU" for short), or the processor 2910 may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like.

The memory 2930 may include a read-only memory and a random access memory, and provide an instruction and data to the processor 2910. A part of the memory 2930 may further include a non-volatile random access memory. For example, the memory 2930 may further store information of a device type.

The bus system 2940 may further include a power bus, a control bus, a status signal bus, and the like, in addition to a data bus. However, for clear description, various types of buses in the figure are marked as the bus system 2940.

In an implementation process, operations in the foregoing methods can be implemented by using a hardware integrated logical circuit in the processor 2910, or by using instructions in a form of software. The operations of the method disclosed with reference to the embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory 2930, and a processor 2910 reads information in the memory 2930 and completes the operations in the foregoing methods in combination with hardware of the processor. Details are not described again herein to avoid repetition.

In one embodiment, in another embodiment, the transceiver 2920 is in one embodiment configured to transmit a sector sweep feedback frame to each responding device in the plurality of responding devices, where the sector sweep feedback frame carries the codeword indication information, and a sector sweep feedback frame transmitted to the first responding device is used to indicate a best transmit sector of the first responding device; and the transceiver 2920 is in one embodiment configured to receive sector sweep acknowledgement frames simultaneously transmitted by the plurality of responding devices, where the transceiver 2920 receives a sector sweep acknowledgement frame encoded by using the first codeword and transmitted by the first responding device by using the best transmit sector, and the sector sweep acknowledgement frame transmitted by the first responding device is used to indicate a best transmit sector that is of the initiating device and corresponds to the first responding device.

In one embodiment, in another embodiment, the codeword indication information is carried in a reserved bit of a sector sweep feedback field of the sector sweep feedback frame.

In one embodiment, in another embodiment, the transceiver 2920 is further configured to retransmit the sector sweep feedback frame to the first responding device if the sector sweep acknowledgement frame transmitted by the first responding device is not received within a first preset time interval; or transmit a first frozen frame to the first responding device if the sector sweep acknowledgement frame transmitted by the first responding device is received within the first preset time interval, where the first frozen frame is used to instruct the first responding device to wait for the transceiver 2920 to receive a sector sweep acknowledgement frame transmitted by a second responding device in the plurality of responding devices, or the first frozen frame is used to indicate time that the first responding device spends waiting for the transceiver 2920 to transmit the sector sweep feedback frame to the second responding device until a maximum quantity of retransmission times is reached, where the transceiver 2920 does not receive, within the first preset time interval, the sector sweep acknowledgement frame transmitted by the second responding device.

In one embodiment, in another embodiment, values of four reserved bits in a frame control field of the first frozen frame are one of the following:

0000, 0001, 1011, 1100, 1101, 1110, and 1111.

In one embodiment, in another embodiment, the transceiver 2920 is further configured to transmit first BRP frames to the plurality of responding devices simultaneously, where the transceiver 2920 transmits, to the first responding device by using the best transmit sector that is of the initiating device and corresponds to the first responding device, a first BRP frame encoded by using the first codeword, and the first BRP frame transmitted to the first responding device is used by the first responding device to obtain beamforming training capability information of the initiating device; and receive second BRP frames simultaneously transmitted by the plurality of responding devices, where the transceiver 2920 receives the second BRP frame encoded by using the first codeword and transmitted by the first responding device by using the best transmit sector of the first responding device, and the second BRP frame transmitted by the first responding device is used by the initiating device to obtain beamforming training capability information of the first responding device.

In one embodiment, in another embodiment, the transceiver 2920 is further configured to retransmit the first BRP frame to the first responding device if the second BRP frame transmitted by the first responding device is not received within a second preset time interval; or transmit a second frozen frame to the first responding device if the second BRP frame transmitted by the first responding device is received within the second preset time interval, where the second frozen frame is used to instruct the first responding device to wait for the transceiver 2920 to receive a second BRP frame transmitted by a third responding device in the plurality of responding devices, or the second frozen frame is used to indicate time that the first responding device spends waiting for the transceiver 2920 to transmit a first BRP frame to the third responding device until a maximum quantity of retransmission times is reached, where the transceiver 2920 does not receive, within the second preset time interval, the second BRP frame transmitted by the third responding device.

In one embodiment, in another embodiment, values of four reserved bits in a frame control field of the second frozen frame are one of the following:

0000, 0001, 1011, 1100, 1101, 1110, and 1111.

In one embodiment, in another embodiment, the transceiver 2920 is further configured to receive first BRP feedback frames simultaneously transmitted by the plurality of responding devices, where the first responding device transmits, by using the best transmit sector of the first responding device, the first BRP feedback frame encoded by using the first codeword, and the first BRP feedback frame transmitted by the first responding device is used to indicate a best receive sector of the first responding device; and transmit second BRP feedback frames to the plurality of responding devices simultaneously, where the transceiver 2920 transmits, to the first responding device by using the best transmit sector that is of the initiating device and corresponds to the first responding device, the second BRP feedback frame encoded by using the first codeword, and the second BRP feedback frame transmitted to the first responding device is used to indicate a best receive sector that is of the initiating device and corresponds to the first responding device.

In one embodiment, in another embodiment, the transceiver 2920 is further configured to retransmit the second BRP feedback frame to the first responding device if an acknowledgement frame transmitted by the first responding device and used to indicate that the second BRP feedback frame has been received is not received within a third preset time interval; or transmit a third frozen frame to the first responding device if an acknowledgement frame transmitted by the first responding device and used to indicate that the second BRP feedback frame has been received is received within the third preset time interval, where the third frozen frame is used to instruct the first responding device to wait for the transceiver 2920 to receive an acknowledgement frame transmitted by a fourth responding device in the plurality of responding devices and used to indicate that the second BRP feedback frame has been received, or the third frozen frame is used to indicate time that the first responding device spends waiting for the transceiver 2920 to transmit the second BRP feedback frame to the fourth responding device until a maximum quantity of retransmission times is reached, where the transceiver 2920 does not receive, within the third preset time interval, the acknowledgement frame transmitted by the fourth responding device and used to indicate that the second BRP feedback frame has been received.

In one embodiment, in another embodiment, values of four reserved bits in a frame control field of the third frozen frame are one of the following:

0000, 0001, 1011, 1100, 1101, 1110, and 1111.

Alternatively, in another embodiment, the transceiver 2920 is in one embodiment configured to transmit a third BRP feedback frame to each responding device by using a best transmit sector that is of the initiating device and corresponds to each responding device, where the third BRP feedback frame carries the codeword indication information, and a third BRP feedback frame transmitted to the first responding device is used to indicate a best receive sector that is of the initiating device and corresponds to the first responding device.

In one embodiment, in another embodiment, the codeword indication information is carried in a reserved bit of a sector sweep feedback field of the third BRP feedback.

Alternatively, in another embodiment, the transceiver 2920 is in one embodiment configured to transmit a third BRP frame to each responding device in the plurality of responding devices by using at least one transmit sector, where the third BRP frame carries the codeword indication information, and the third BRP frame transmitted to the first responding device is used by the first responding device to determine at least one best receive sector of the first responding device, and a correspondence between the at least one best receive sector and the at least one transmit sector of the initiating device.

In one embodiment, in another embodiment, the codeword indication information is carried in a reserved bit of a sector sweep feedback field of the third BRP frame.

In one embodiment, in another embodiment, the transceiver 2920 is in one embodiment configured to receive fourth BRP feedback frames simultaneously transmitted by the plurality of responding devices, where the first responding device transmits, by using the best transmit sector of the first responding device, the fourth BRP feedback frame encoded by using the first codeword, and the fourth BRP feedback frame transmitted by the first responding device is used to indicate a correspondence between a transmit sector of the initiating device and a receive sector of the first responding device; and transmit fifth BRP feedback frames to the plurality of responding devices simultaneously, where the initiating device transmits, to the first responding device by using the best transmit sector that is of the initiating device and corresponds to the first responding device, the fifth BRP feedback frame encoded by using the first codeword, and the fifth BRP feedback frame transmitted to the first responding device is used to indicate a correspondence between a receive sector of the initiating device and a transmit sector of the first responding device.

In one embodiment, in another embodiment, the transceiver 2920 is further configured to retransmit the fifth BRP feedback frame to the first responding device if an acknowledgement frame transmitted by the first responding device and used to indicate that the fifth BRP feedback frame has been received is not received within a fourth preset time interval; or transmit a fourth frozen frame to the first responding device if an acknowledgement frame transmitted by the first responding device and used to indicate that the fifth BRP feedback frame has been received is received within the fourth preset time interval, where the fourth frozen frame is used to instruct the first responding device to wait for the transceiver 2920 to receive an acknowledgement frame transmitted by a fifth responding device in the plurality of responding devices and used to indicate that the fifth BRP feedback frame has been received, or the fourth frozen frame is used to indicate time that the first responding device spends waiting for the transceiver 2920 to transmit the fifth BRP feedback frame to the fifth responding device until a maximum quantity of retransmission times is reached, where the transceiver 2920 does not receive, within the fourth preset time interval, the acknowledgement frame transmitted by the fifth responding device and used to indicate that the fifth BRP feedback frame has been received.

In one embodiment, in another embodiment, values of four reserved bits in a frame control field of the fourth frozen frame are one of the following:

0000, 0001, 1011, 1100, 1101, 1110, and 1111.

In one embodiment, in another embodiment, the transceiver 2920 is in one embodiment configured to transmit a sixth BRP feedback frame to each responding device by using a best transmit sector that is of the initiating device and corresponds to each responding device in the plurality of responding devices, where the sixth BRP feedback frame carries the codeword indication information, and the sixth BRP feedback frame transmitted to the first responding device is used to indicate a correspondence between a receive sector of the initiating device and a transmit sector of the first responding device.

In one embodiment, in another embodiment, the codeword indication information is carried in a reserved bit of a sector sweep feedback field of the seventh BRP feedback.

It should be understood that, the initiating device 2900 shown in FIG. 29 can implement each process of the initiating device in the method embodiment in FIG. 3. Operations and/or functions of all modules in the initiating device 2900 are respectively intended to implement corresponding procedures in the method embodiment in FIG. 3. For details, refer to the descriptions in the foregoing method embodiment. To avoid repetition, detailed descriptions are omitted properly herein.

Therefore, in this embodiment of this application, the initiating device assigns an orthogonal codeword to each responding device, and when the initiating device performs beamforming training with different responding devices, different codewords may be used to encode beamforming signals. In one embodiment, in processes of SSW feedback, SSW-ACK, BRP-setup, BRP-feedback in MID, and BRP-feedback in BC, a plurality of STAs may perform information transmission simultaneously with a PCP/AP. In this way, beamforming training is skillfully implemented between the initiating device and different responding devices. Because codewords of signals corresponding to different responding devices are different, the initiating device can perform beamforming training signal transmission simultaneously with the plurality of responding devices to further shorten time of beamforming training and improve efficiency of beamforming training in a multi-user scenario. In addition, in this embodiment of this application, signal collision that occurs when the plurality of responding devices perform training with the initiating device can be avoided.

In addition, in this embodiment of this application, an offline-designed orthogonal codeword can be assigned to each responder by using a reserved bit of a BRP frame, without changing an existing MAC frame structure, and compatibility with the prior art is maintained.

Further, with respect to a possible packet loss in a MU-MIMO BFT process, in this embodiment of this application, a reserved field is used in the frame control field (Frame control field), and a new frozen frame type is designed to freeze a STA that has performed feedback. The PCP/AP transmits signaling only to a STA that has not performed feedback, without transmitting signaling to all STAs again. Therefore, resource overheads are reduced, and efficiency of beamforming training is improved.

FIG. 30 is a schematic block diagram of a responding device 3000 according to an embodiment of this application. As shown in FIG. 30, the responding device 3000 includes a processor 3010 and a transceiver 3020. The processor 3010 is connected to the transceiver 3020. In one embodiment, the responding device 3000 further includes a memory 3030, and the memory 3030 is connected to the processor 3010. Further In one embodiment, the responding device 3000 may further include a bus system 3040. The processor 3010, the memory 3030, and the transceiver 3020 may be connected by the bus system 3040. The memory 3030 may be configured to store an instruction. The processor 3010 is configured to execute the instruction stored in the memory 3030, so as to control the transceiver 3020 to receive and transmit information or signals.

In one embodiment, the processor 3010 controls the transceiver 3020 to: receive codeword indication information transmitted by the initiating device, where the codeword indication information is used to indicate a first codeword assigned by the initiating device to the first responding device, the first responding device is any responding device in the plurality of responding devices, the first codeword is used to encode a beamforming training signal transmitted between the initiating device and the first responding device, and codewords assigned to different responding devices in the plurality of responding devices are orthogonal to each other; and perform beamforming training with the initiating device based on the codeword assigned to the first responding device, where when the first responding device performs beamforming training with the initiating device, responding devices except the first responding device in the plurality of responding devices also perform beamforming training with the initiating device simultaneously based on the assigned codewords.

Therefore, in this embodiment of this application, the initiating device assigns an orthogonal codeword to each responding device, and when the initiating device performs beamforming training with different responding devices, different codewords may be used to encode beamforming signals. In this way, beamforming training is skillfully implemented between the initiating device and different responding devices. Because codewords of signals corresponding to different responding devices are different, the initiating device can perform beamforming training signal transmission simultaneously with the plurality of responding devices to further shorten time of beamforming training and improve efficiency of beamforming training in a multi-user scenario. In addition, in this embodiment of this application, signal collision that occurs when the plurality of responding devices perform training with the initiating device can be avoided.

It should be understood that, in this embodiment of this application, the processor 3010 may be a central processing unit (Central Processing Unit, "CPU" for short), or the processor 3010 may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like.

The memory 3030 may include a read-only memory and a random access memory, and provide an instruction and data to the processor 3010. A part of the memory 3030 may further include a non-volatile random access memory. For example, the memory 3030 may further store information of a device type.

The bus system 3040 may further include a power bus, a control bus, a status signal bus, and the like, in addition to a data bus. However, for clear description, various types of buses in the figure are marked as the bus system 3040.

In an implementation process, operations in the foregoing methods can be implemented by using a hardware integrated logical circuit in the processor 3010, or by using instructions in a form of software. The operations of the method disclosed with reference to the embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory 3030, and a processor 3010 reads information in the memory 3030 and completes the operations in the foregoing methods in combination with hardware of the processor. Details are not described again herein to avoid repetition.

In one embodiment, in another embodiment, the transceiver 3020 is in one embodiment configured to receive a sector sweep feedback frame transmitted by the initiating device, where the sector sweep feedback frame carries the codeword indication information, and the sector sweep feedback frame received by the transceiver 3020 is used to indicate a best transmit sector of the first responding device; and the transceiver 3020 is in one embodiment configured to transmit, to the initiating device by using the best transmit sector, a sector sweep acknowledgement frame encoded by using the first codeword, where the sector sweep acknowledgement frame transmitted by the transceiver 3020 is used to indicate a best transmit sector that is of the initiating device and corresponds to the first responding device.

In one embodiment, in another embodiment, the codeword indication information is carried in a reserved bit of a sector sweep feedback field of the sector sweep feedback frame.

In one embodiment, in another embodiment, the transceiver 3020 is further configured to: if the initiating device does not receive, within a first preset time interval, the sector sweep acknowledgement frame transmitted by the transceiver 3020, receive the sector sweep feedback frame retransmitted by the initiating device; or if the initiating device receives, within the first preset time interval, the sector sweep acknowledgement frame transmitted by the transceiver 3020, receive a first frozen frame transmitted by the initiating device, where the first frozen frame is used to instruct the transceiver 3020 to wait for the initiating device to receive a sector sweep acknowledgement frame transmitted by a second responding device in the plurality of responding devices, or the first frozen frame is used to indicate time that the transceiver 3020 spends waiting for the initiating device to transmit the sector sweep feedback frame to the second responding device until a maximum quantity of retransmission times is reached, where the initiating device does not receive, within the first preset time interval, the sector sweep acknowledgement frame transmitted by the second responding device.

In one embodiment, in another embodiment, values of four reserved bits in a frame control field of the first frozen frame are one of the following:

0000, 0001, 1011, 1100, 1101, 1110, and 1111.

In one embodiment, in another embodiment, the transceiver 3020 is further configured to receive a first BRP frame encoded by using the first codeword and transmitted by the initiating device by using the best transmit sector that is of the initiating device and corresponds to the first responding device, where the first BRP frame received by the transceiver 3020 is used by the first responding device to obtain beamforming training capability information of the initiating device; and the first responding device transmits, to the initiating device by using the best transmit sector of the first responding device, the second BRP frame encoded by using the first codeword, where the second BRP frame transmitted by the first responding device is used by the initiating device to obtain beamforming training capability information of the first responding device.

In one embodiment, in another embodiment, the transceiver 3020 is further configured to: if the initiating device does not receive, within a second preset time interval, the second BRP frame transmitted by the transceiver 3020, receive, by the first responding device, the first BRP frame retransmitted by the initiating device; or if the initiating device receives, within the second preset time interval, the second BRP frame transmitted by the transceiver 3020, receive a second frozen frame transmitted by the initiating device, where the second frozen frame is used to instruct the transceiver 3020 to wait for the initiating device to receive a second BRP frame transmitted by a third responding device in the plurality of responding devices, or the second frozen frame is used to indicate time that the transceiver 3020 spends waiting for the initiating device to transmit a first BRP frame to the third responding device until a maximum quantity of retransmission times is reached, where the initiating device does not receive, within the second preset time interval, the second BRP frame transmitted by the third responding device.

In one embodiment, in another embodiment, values of four reserved bits in a frame control field of the second frozen frame are one of the following:

0000, 0001, 1011, 1100, 1101, 1110, and 1111.

In one embodiment, in another embodiment, the transceiver 3020 is further configured to transmit, to the initiating device by using the best transmit sector of the first responding device, a first BRP feedback frame encoded by using the first codeword, where the first BRP feedback frame is used to indicate a best receive sector of the first responding device; and receive a second BRP feedback frame encoded by using the first codeword and transmitted by the initiating device by using the best transmit sector that is of the initiating device and corresponds to the first responding device, where the second BRP feedback frame received by the transceiver 3020 is used to indicate a best receive sector that is of the initiating device and corresponds to the first responding device.

In one embodiment, in another embodiment, the transceiver 3020 is further configured to: if the initiating device does not receive, within a third preset time interval, an acknowledgement frame transmitted by the transceiver 3020 and used to indicate that the second BRP feedback frame has been received, receive the second BRP feedback frame retransmitted by the initiating device; or if the initiating device receives, within the third preset time interval, an acknowledgement frame transmitted by the transceiver 3020 and used to indicate that the second BRP feedback frame has been received, receive a third frozen frame transmitted by the initiating device, where the third frozen frame is used to instruct the transceiver 3020 to wait for the initiating device to receive an acknowledgement frame transmitted by a fourth responding device in the plurality of responding devices and used to indicate that the second BRP feedback frame has been received, or the third frozen frame is used to indicate time that the transceiver 3020 spends waiting for the initiating device to transmit the second BRP feedback frame to the fourth responding device until a maximum quantity of retransmission times is reached, where the initiating device does not receive, within the third preset time interval, the acknowledgement frame transmitted by the fourth responding device and used to indicate that the second BRP feedback frame has been received.

In one embodiment, in another embodiment, values of four reserved bits in a frame control field of the third frozen frame are one of the following:

0000, 0001, 1011, 1100, 1101, 1110, and 1111.

Alternatively, in another embodiment, the transceiver 3020 is in one embodiment configured to receive a third BRP feedback frame transmitted by the initiating device by using a best transmit sector that is of the initiating device and corresponds to the first responding device, where the third BRP feedback frame carries the codeword indication information, and the third BRP feedback frame received by the first responding device is used to indicate a best receive sector that is of the initiating device and corresponds to the first responding device.

In one embodiment, in another embodiment, the codeword indication information is carried in a reserved bit of a sector sweep feedback field of the third BRP feedback.

Alternatively, in another embodiment, the transceiver 3020 is in one embodiment configured to receive a third BRP frame transmitted by the initiating device by using at least one transmit sector, where the third BRP frame carries the codeword indication information, and the third BRP frame received by the transceiver 3020 is used by the first responding device to determine at least one best receive sector of the first responding device, and a correspondence between the at least one best receive sector and the at least one transmit sector of the initiating device.

In one embodiment, in another embodiment, the codeword indication information is carried in a reserved bit of a sector sweep feedback field of the third BRP frame.

In one embodiment, in another embodiment, the transceiver 3020 is configured to transmit, to the initiating device by using the best transmit sector of the first responding device, a fourth BRP feedback frame encoded by using the first codeword, where the fourth BRP feedback frame transmitted by the transceiver 3020 is used to indicate a correspondence between a transmit sector of the initiating device and a receive sector of the first responding device; and receive a fifth BRP feedback frame encoded by using the first codeword and transmitted by the initiating device by using the best transmit sector that is of the initiating device and corresponds to the first responding device, where the fifth BRP feedback frame received by the transceiver 3020 is used to indicate a correspondence between a receive sector of the initiating device and a transmit sector of the first responding device.

In one embodiment, in another embodiment, the transceiver 3020 is further configured to: if the initiating device does not receive, within a fourth preset time interval, an acknowledgement frame transmitted by the first responding device and used to indicate that the fifth BRP feedback frame has been received, receive the fifth BRP feedback frame retransmitted by the initiating device; or if the initiating device receives, within the fourth preset time interval, an acknowledgement frame transmitted by the first responding device and used to indicate that the fifth BRP feedback frame has been received, receive a fourth frozen frame transmitted by the initiating device, where the fourth frozen frame is used to instruct the transceiver 3020 to wait for the initiating device to receive an acknowledgement frame transmitted by a fifth responding device in the plurality of responding devices and used to indicate that the fifth BRP feedback frame has been received, or the fourth frozen frame is used to indicate time that the transceiver 3020 spends waiting for the initiating device to transmit the fifth BRP feedback frame to the fifth responding device until a maximum quantity of retransmission times is reached, where the initiating device does not receive, within the fourth preset time interval, the acknowledgement frame transmitted by the fifth responding device and used to indicate that the fifth BRP feedback frame has been received.

In one embodiment, in another embodiment, values of four reserved bits in a frame control field of the fourth frozen frame are one of the following:

0000, 0001, 1011, 1100, 1101, 1110, and 1111.

Alternatively, in another embodiment, the transceiver 3020 is in one embodiment configured to receive a sixth BRP feedback frame transmitted by the initiating device to the first responding device by using a best transmit sector that is of the initiating device and corresponds to the first responding device, where the sixth BRP feedback frame carries the codeword indication information, and the sixth BRP feedback frame received by the first responding device is used to indicate a correspondence between a receive sector of the initiating device and a transmit sector of the first responding device.

In one embodiment, in another embodiment, the codeword indication information is carried in a reserved bit of a sector sweep feedback field of the seventh BRP feedback.

It should be understood that, the responding device 3000 shown in FIG. 30 can implement each process of the responding device in the method embodiment in FIG. 3. Operations and/or functions of all modules in the responding device 3000 are respectively intended to implement corresponding procedures in the method embodiment in FIG. 3. For details, refer to the descriptions in the foregoing method embodiment. To avoid repetition, detailed descriptions are omitted properly herein.

Therefore, in this embodiment of this application, the initiating device assigns an orthogonal codeword to each responding device, and when the initiating device performs beamforming training with different responding devices, different codewords may be used to encode beamforming signals. In one embodiment, in processes of SSW feedback, SSW-ACK, BRP-setup, BRP-feedback in MID, and BRP-feedback in BC, a plurality of STAs may perform information transmission simultaneously with a PCP/AP. In this way, beamforming training is skillfully implemented between the initiating device and different responding devices. Because codewords of signals corresponding to different responding devices are different, the initiating device can perform beamforming training signal transmission simultaneously with the plurality of responding devices to further shorten time of beamforming training and improve efficiency of beamforming training in a multi-user scenario. In addition, in this embodiment of this application, signal collision that occurs when the plurality of responding devices perform training with the initiating device can be avoided.

In addition, in this embodiment of this application, an offline-designed orthogonal codeword can be assigned to each responder by using a reserved bit of a BRP frame, without changing an existing MAC frame structure, and compatibility with the prior art is maintained.

Further, with respect to a possible packet loss in a MU-MIMO BFT process, in this embodiment of this application, a reserved field is used in the frame control field (Frame control field), and a new frozen frame type is designed to freeze a STA that has performed feedback. The PCP/AP transmits signaling only to a STA that has not performed feedback, without transmitting signaling to all STAs again. Therefore, resource overheads are reduced, and efficiency of beamforming training is improved.

It should be understood that, "an embodiment" or "an embodiment" mentioned in the whole specification means that particular features, structures, or characteristics related to the embodiment are included in at least one embodiment of this application. Therefore, "in an embodiment" or "in an embodiment" appearing throughout the specification does not refer to a same embodiment. In addition, these particular features, structures, or characteristics may be combined in one or more embodiments by using any appropriate manner. It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined according to A. However, it should also be understood that determining A according to B does not mean that B is determined according to A only; that is, B may also be determined according to A and/or other information.

A person of ordinary skill in the art may be aware that, in combination with the examples described in the embodiments disclosed in this specification, units and algorithm operations may be implemented by electronic hardware, computer software, or a combination thereof. To clearly describe the interchangeability between the hardware and the software, the foregoing has generally described compositions and operations of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments in this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

With descriptions of the foregoing implementations, a person skilled in the art may clearly understand that this application may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and disc (disc) used by this application includes a compact disc CD, a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely example embodiments of the technical solutions of this application, but is not intended to limit the protection scope of this application. Any modification, equivalent replacement, or improvement made without departing from the spirit and principle of this application shall fall within the protection scope of this application.

What is claimed is:

1. A beamforming training method, comprising:
   transmitting, by an initiating device, codeword indication information to each responding device in a plurality of responding devices, including transmitting a sector sweep feedback frame to each responding device in the plurality of responding devices, wherein the sector sweep feedback frame carries the codeword indication information, and a sector sweep feedback frame transmitted to the first responding device is used to indicate a best transmit sector of the first responding device, wherein codeword indication information received by a first responding device in the plurality of responding devices is used to indicate a first codeword assigned by the initiating device to the first responding device, the first responding device is any responding device in the plurality of responding devices, the first codeword is used to encode a beamforming training signal transmitted between the initiating device and the first responding device, and codewords assigned to different responding devices in the plurality of responding devices are orthogonal to each other; and
   performing, by the initiating device, beamforming training simultaneously with the plurality of responding devices based on a plurality of codewords assigned to the plurality of responding devices including:
      receiving, by the initiating device, sector sweep acknowledgement frames simultaneously transmitted by the plurality of responding devices, wherein the initiating device receives a sector sweep acknowledgement frame encoded by using the first codeword and transmitted by the first responding device by using the best transmit sector, and the sector sweep acknowledgement frame transmitted by the first responding device is used to indicate a best transmit sector that is of the initiating device and corresponds to the first responding device.

2. The method according to claim 1, wherein
the codeword indication information is carried in a reserved bit of a sector sweep feedback field of the sector sweep feedback frame.

3. The method according to claim 1, wherein the performing, by the initiating device, beamforming training simultaneously with the plurality of responding devices further comprises:
   if the initiating device does not receive, within a first preset time interval, the sector sweep acknowledgement frame transmitted by the first responding device, retransmitting, by the initiating device, the sector sweep feedback frame to the first responding device; or
   if the initiating device receives, within a first preset time interval, the sector sweep acknowledgement frame transmitted by the first responding device, transmitting, by the initiating device, a first frozen frame to the first responding device, wherein the first frozen frame is used to instruct the first responding device to wait for the initiating device to receive a sector sweep acknowledgement frame transmitted by a second responding device in the plurality of responding devices, or the first frozen frame is used to indicate time that the first responding device spends waiting for the initiating device to transmit a sector sweep feedback frame to a second responding device until a maximum quantity of retransmission times is reached, wherein the initiating device does not receive, within the first preset time interval, the sector sweep acknowledgement frame transmitted by the second responding device.

4. The method according to claim 3, wherein values of four reserved bits in a frame control field of the first frozen frame are one of the following: 0000, 0001, 1011, 1100, 1101, 1110, and 1111.

5. A beamforming training method, comprising:
receiving, by a first responding device in a plurality of responding devices, codeword indication information transmitted by an initiating device, including receiving a sector sweep feedback frame transmitted by the initiating device, wherein the sector sweep feedback frame carries the codeword indication information, and the sector sweep feedback frame received by the first responding device is used to indicate a best transmit sector of the first responding device, wherein the codeword indication information is used to indicate a first codeword assigned by the initiating device to the first responding device, the first responding device is any responding device in the plurality of responding devices, the first codeword is used to encode a beamforming training signal transmitted between the initiating device and the first responding device, and codewords assigned to different responding devices in the plurality of responding devices are orthogonal to each other; and
performing, by the first responding device, beamforming training with the initiating device based on the codeword assigned to the first responding device, wherein when the first responding device performs beamforming training with the initiating device, responding devices except the first responding device in the plurality of responding devices also perform beamforming training with the initiating device simultaneously based on the assigned codewords, wherein the performing, by the first responding device, beamforming training with the initiating device comprises:
transmitting, by the first responding device to the initiating device by using the best transmit sector, a sector sweep acknowledgement frame encoded by using the first codeword, wherein the sector sweep acknowledgement frame transmitted by the first responding device is used to indicate a best transmit sector that is of the initiating device and corresponds to the first responding device.

6. The method according to claim 5, wherein the codeword indication information is carried in a reserved bit of a sector sweep feedback field of the sector sweep feedback frame.

7. The method according to claim 5, wherein the performing, by the first responding device, beamforming training with the initiating device further comprises:
if the initiating device does not receive, within a first preset time interval, the sector sweep acknowledgement frame transmitted by the first responding device, receiving, by the first responding device, the sector sweep feedback frame retransmitted by the initiating device; or
if the initiating device receives, within a first preset time interval, the sector sweep acknowledgement frame transmitted by the first responding device, receiving, by the first responding device, a first frozen frame transmitted by the initiating device, wherein the first frozen frame is used to instruct the first responding device to wait for the initiating device to receive a sector sweep acknowledgement frame transmitted by a second responding device in the plurality of responding devices, or the first frozen frame is used to indicate time that the first responding device spends waiting for the initiating device to transmit the sector sweep feedback frame to the second responding device until a maximum quantity of retransmission times is reached, wherein the initiating device does not receive, within the first preset time interval, the sector sweep acknowledgement frame transmitted by the second responding device.

8. The method according to claim 7, wherein values of four reserved bits in a frame control field of the first frozen frame are one of the following: 0000, 0001, 1011, 1100, 1101, 1110, and 1111.

9. An initiating device, comprising:
a processor and a transceiver, the processor is communicatively connected to the transceiver and is configured to execute instructions to control the transceiver to:
transmit codeword indication information to each responding device in a plurality of responding devices, including transmitting a sector sweep feedback frame to each responding device in the plurality of responding devices, wherein the sector sweep feedback frame carries the codeword indication information, and a sector sweep feedback frame transmitted to the first responding device is used to indicate a best transmit sector of the first responding device, wherein codeword indication information received by a first responding device in the plurality of responding devices is used to indicate a first codeword assigned by the initiating device to the first responding device, the first responding device is any responding device in the plurality of responding devices, the first codeword is used to encode a beamforming training signal transmitted between the initiating device and the first responding device, and codewords assigned to different responding devices in the plurality of responding devices are orthogonal to each other, wherein the transceiver is configured to receive sector sweep acknowledgement frames simultaneously transmitted by the plurality of responding devices, wherein the transceiver is configured to receive a sector sweep acknowledgement frame encoded by using the first codeword and transmitted by the first responding device by using the best transmit sector, and the sector sweep acknowledgement frame transmitted by the first responding device is used to indicate a best transmit sector that is of the initiating device and corresponds to the first responding device; and
perform beamforming training simultaneously with the plurality of responding devices based on a plurality of codewords assigned to the plurality of responding devices.

10. The initiating device according to claim 9, wherein the codeword indication information is carried in a reserved bit of a sector sweep feedback field of the sector sweep feedback frame.

11. The initiating device according to claim 9 wherein the transceiver is further configured to retransmit the sector sweep feedback frame to the first responding device if the sector sweep acknowledgement frame transmitted by the first responding device is not received within a first preset time interval; or the transceiver is further configured to transmit a first frozen frame to the first responding device if the sector sweep acknowledgement frame transmitted by the first responding device is received within the first preset time interval, wherein the first frozen frame is used to instruct the first responding device to wait for the training unit to receive a sector sweep acknowledgement frame transmitted by a second responding device in the plurality of responding devices, or the first frozen frame is used to indicate time that the first responding device spends waiting for the transceiver to transmit the sector sweep feedback frame to the second responding device until a maximum quantity of retransmission times is reached, wherein the transceiver does not receive, within the first preset time interval, the sector sweep acknowledgement frame transmitted by the second responding device.

12. The initiating device according to claim 11, wherein values of four reserved bits in a frame control field of the first frozen frame are one of the following:
0000, 0001, 1011, 1100, 1101, 1110, and 1111.

13. A responding device comprising: a processor and a transceiver, and the processor is communicatively connected to the transceiver, and the processor is configured to execute instructions to control the transceiver to:

receive codeword indication information transmitted by the initiating device, wherein the codeword indication information is used to indicate a first codeword assigned by the initiating device to the responding device, including receiving a sector sweep feedback frame transmitted by the initiating device, wherein the sector sweep feedback frame carries the codeword indication information, and the sector sweep feedback frame received by the first responding device is used to indicate a best transmit sector of the first responding device, wherein the responding device is a first responding device in a plurality of responding devices, the first responding device is any responding device in the plurality of responding devices, the first codeword is used to encode a beamforming training signal transmitted between the initiating device and the first responding device, and codewords assigned to different responding devices in the plurality of responding devices are orthogonal to each other; and perform beamforming training with the initiating device based on the codeword assigned to the first responding device, wherein when the first responding device performs beamforming training with the initiating device, responding devices except the first responding device in the plurality of responding devices also perform beamforming training with the initiating device simultaneously based on the assigned codewords, wherein the transceiver is configured to transmit, to the initiating device by using the best transmit sector, a sector sweep acknowledgement frame encoded by using the first codeword, wherein the sector sweep acknowledgement frame transmitted by the transceiver is used to indicate a best transmit sector that is of the initiating device and corresponds to the first responding device.

14. The responding device according to claim 13, wherein the codeword indication information is carried in a reserved bit of a sector sweep feedback field of the sector sweep feedback frame.

15. The responding device according to claim 13, wherein the transceiver is further configured to:

if the initiating device does not receive, within a first preset time interval, the sector sweep acknowledgement frame transmitted by the transceiver, receive the sector sweep feedback frame retransmitted by the initiating device; or if the initiating device receives, within the first preset time interval, the sector sweep acknowledgement frame transmitted by the transceiver, receive a first frozen frame transmitted by the initiating device, wherein the first frozen frame is used to instruct the transceiver to wait for the initiating device to receive a sector sweep acknowledgement frame transmitted by a second responding device in the plurality of responding devices, or the first frozen frame is used to indicate time that the transceiver spends waiting for the initiating device to transmit the sector sweep feedback frame to the second responding device until a maximum quantity of retransmission times is reached, wherein the initiating device does not receive, within the first preset time interval, the sector sweep acknowledgement frame transmitted by the second responding device.

16. The responding device according to claim 15, wherein values of four reserved bits in a frame control field of the first frozen frame are one of the following:
0000, 0001, 1011, 1100, 1101, 1110, and 1111.

* * * * *